United States Patent [19]
Mori et al.

[11] Patent Number: 5,995,802
[45] Date of Patent: Nov. 30, 1999

[54] IMAGE FORMING APPARATUS

[75] Inventors: Hirotaka Mori; Ryo Ando, both of Ebina, Japan

[73] Assignee: Fuji Xerox Co., Ltd., Tokyo, Japan

[21] Appl. No.: 08/886,357

[22] Filed: Jul. 1, 1997

[30] Foreign Application Priority Data

Jul. 8, 1996 [JP] Japan .................................. 8-178318
Nov. 22, 1996 [JP] Japan .................................. 8-312119

[51] Int. Cl.$^6$ .................................................. G03G 15/00
[52] U.S. Cl. ........................... 399/394; 399/49; 399/66; 399/72; 399/167; 399/301; 347/116
[58] Field of Search ........................... 399/49, 72, 66, 399/167, 165, 301, 302, 303, 308, 318, 319; 347/116; 226/15–17, 24, 27, 28, 34, 42

[56] References Cited

U.S. PATENT DOCUMENTS

| | | | |
|---|---|---|---|
| 5,373,355 | 12/1994 | Ando et al. | 399/301 |
| 5,444,525 | 8/1995 | Takahashi et al. | 399/76 |
| 5,457,518 | 10/1995 | Ashikaga et al. | 399/28 |
| 5,510,885 | 4/1996 | Mori et al. | 399/28 |
| 5,523,823 | 6/1996 | Ashikaga et al. | 399/28 |
| 5,550,625 | 8/1996 | Takamatsu et al. | 399/301 |
| 5,587,771 | 12/1996 | Mori et al. | 347/116 X |
| 5,689,764 | 11/1997 | Fukuchi et al. | 399/75 |
| 5,742,867 | 4/1998 | Kodama | 399/49 |
| 5,768,671 | 6/1998 | Komiya et al. | 399/301 |
| 5,778,280 | 7/1998 | Komiya et al. | 399/49 |
| 5,802,422 | 9/1998 | Hokari | 399/301 X |
| 5,881,346 | 3/1999 | Mori et al. | 399/301 |
| 5,887,125 | 3/1999 | Takano et al. | 347/116 X |

FOREIGN PATENT DOCUMENTS

A-1-281468  11/1989  Japan .
A-2-311086  12/1990  Japan .
A-5-289455  11/1993  Japan .
A-6-253151  9/1994   Japan .

*Primary Examiner*—Matthew S. Smith
*Attorney, Agent, or Firm*—Oliff & Berridge, PLC

[57] ABSTRACT

An image forming apparatus which forms toner images of different colors by at least one image forming device with a rotatably driven image bearing member, and forms a picture by transferring the different colored toner images formed by the image forming device onto an image transfer medium supported on a rotatably driven endless bearing member, or directly onto the endless bearing member, the image forming apparatus wherein a latent image writing position on the image bearing member being angularly spaced by approximately 180° from an image transfer position including:

a pattern detecting mechanism for detecting a color misregistration detecting pattern formed on the endless bearing member; and a drive control mechanism for individually controlling rotation speeds of rotary members, such as the image bearing member and the endless bearing member, so as to suppress a periodical rotation variation by using detecting information of a vibration component on the periodical rotation variation, which is obtained from detecting signals derived from the pattern detecting mechanism.

21 Claims, 42 Drawing Sheets

FIG. 11A

IN CASE OF C = 3Hz
(BOTH VIBRATION COMPONENT A AND B ARE NOT NEGLIGIBLE)

| A (Hz) | B (Hz) | SAMPLING FREQUENCY (Hz) |
|---|---|---|
| 50 | 25 | 25 |
| 50 | 30 | 10 |
| 30 | 20 | 10 |

FIG. 11B

VIBRATION COMPONENT B IS NEGLIGIBLE COMPARED TO A, C

| A (Hz) | C (Hz) | SAMPLING FREQUENCY (Hz) |
|---|---|---|
| 50 | 5 | 50, 25 |
| 20 | 3 | 20, 10 |
| 5 | 0.5 | 5, 2.5 |

IMAGE FORMING APPARATUS

BACKGROUND OF THE INVENTION

The present invention generally relates to a registration control system for detecting and correcting color misregistration of the images of different colors formed by a plural number of image forming means in a multi-image forming apparatus having a plural number of image forming means, such as a tandem color copying machine or a color printer or an image forming apparatus of the type in which a plural number of images of different colors formed by at least one image forming means are transferred onto a transfer belt, a sheet or an intermediate image transfer medium on a transfer belt, to thereby form a color image. Particularly, the invention relates to an image forming apparatus capable of reducing color misregistration caused by such rotary means as photoreceptor drums of the image forming means and a transfer belt. More particularly, the invention relates to an image forming apparatus capable of reducing an image distortion caused by rotary means, such as photoreceptor drums and a transfer belt, in a black/white image forming apparatus.

Recently, conversion of black/white documents used in offices into color documents rapidly progresses. The image forming apparatus, which handles those color documents, for example, copying machines, printers and facsimile machines, have also rapidly increase their number. In recent office work, there is a tendency of high quality and high speed. With this tendency, the performances of high picture quality and high speed are frequently required for those color document processing apparatuses. To satisfy such a requirement, called tandem color image forming apparatuses have been proposed and some of them have come into practical use and marketed as products. In this type of the apparatus, image forming units are respectively used for the colors, for example, black (K), yellow (Y), magenta (M) and cyan (C). Color images formed by these image forming units are superimposedly transferred onto an image transfer medium or an intermediate image transfer medium being transported, to thereby form a color image.

An example of the tandem image forming apparatus will be described. As shown in FIG. 43, the apparatus includes four image forming units, a black (K) image forming unit 200K for forming a black image, a yellow (Y) image forming unit 200Y for forming a yellow image, a magenta (M) image forming unit 200M for forming a magenta image, and a cyan (C) image forming unit 200C for forming a cyan image. These four image forming units 200K, 200Y, 200M and 200C are horizontally arranged at fixed spatial intervals. An endless transfer belt 202 as a transfer-medium bearing means is disposed under and along the linear array of the black, yellow, magenta and cyan image forming units 200K, 200Y, 200M and 200C. The transfer belt 202 transfers a transfer sheet 201 to the image transferring positions of the image forming units 200K, 200Y, 200M and 200C while electrostatically attracting the transfer sheet 201 thereto.

The constructions of the image forming units 200K, 200Y, 200M and 200C are substantially the same. The units 200K, 200Y, 200M and 200C sequentially form toner images of black, yellow, magenta and cyan, The units 200K, 200Y, 200M and 200C have photoreceptor drums 203, respectively. The surface of the photoreceptor drum 203 is uniformly charged by a primary charging scorotron 204, and exposed to and scanned with an image forming laser beam 205 in accordance with image information. As a result, a latent electrostatic image is formed on the surface of the photoreceptor drum. In the image forming units 200K, 200Y, 200M and 200C, developing units 206 included therein develop the latent images into visual color images with color toner particles of black, yellow, magenta and cyan, respectively. Those toner images are charged by pre-transfer chargers 207, and sequentially and superimposedly transferred onto the transfer sheet 201 that is attracted onto the transfer belt 202 by the charging by transfer chargers 208. The transfer sheet 201 bearing the color toner image consisting of color toner images of black, yellow, magenta and cyan is separated from the transfer belt 202, and subjected to a fixing process by a fixing unit, not shown, to thereby form a color image.

In the figure, reference numeral 209 designates a photoreceptor cleaner; 210, a photoreceptor discharging lamp; 213, a transfer belt cleaner; and 214, a pre-cleaning processing corotron.

The thus constructed tandem image forming apparatus can form a color image at very high speed since a plural number of image forming units are used for forming one image. Where images are formed at high speed, the positioning of the images formed by the image forming units, i.e., registration (abbreviated frequently as regi.) of the color images, frequently loses its exactness. The result is deterioration of the image quality. In this respect, it is difficult to satisfy the requirement of obtaining both high image quality and high image forming speed. The color misregistration is due to the fact that when the temperature within the image forming apparatus varies and an external force is applied to the apparatus, the positions and the sizes of the image forming units per se and the component parts of the image forming units minutely vary. The in-machine temperature variation and the external force application are things inevitable. In ordinary work, for example, removal of jamming, parts exchanging in maintenance, and moving of the machine, an external force is inevitably applied to the apparatus.

As disclosed in the Unexamined Japanese Patent Application Publication No. Hei. 1-281468, for example, there is an proposal of an image forming apparatus which includes a plural number of image forming portions each for forming a visual image defined by image information of an original document (referred simply to as an original frequently hereafter) and a position detecting mark or indicia, and mark detecting means for detecting the position detecting mark formed by each image forming portion and transferred onto a moving member, whereby control of the image forming portions is carried out on the basis of a detecting signal output from the mark detecting means so as to correct an offset of the transferred image misregistered.

A case where the misregistration correcting technique is applied to the called tandem color image forming apparatus shown in FIG. 43 will be described. As shown in FIG. 44, by the four image forming units 200K, 200Y, 200M and 200C of black, yellow, magenta and cyan, color misregistration detecting patterns 220K, 220Y, 220M and 220C, are formed on the transfer belt 202 while being arranged at fixed spatial intervals in the advancing direction of the transfer belt, and color misregistration detecting patterns 221K, 221Y, 221M and 221C are further formed on the transfer belt 202 while being arranged at other fixed spatial intervals in the direction orthogonal to the belt advancing direction. The color misregistration detecting patterns 220K, 220Y, 220M and 220C, and 221K, 221Y, 221M and 221C are sampled in such a way that a line photo sensing device 222, for example, a CCD sensor, including a linear array of a number of photo sensing pixels senses transmitting light emitted from a light emitting device 223 and transmitted through those patterns. The spatial intervals of those color misregistration detecting patterns 220K, 220Y, 220M and 220C, and 221K, 221Y, 221M and 221C are calculated using data gathered by the sampling. The positions and the image forming timings of the image forming units 200K, 200Y, 200M and 200C are corrected by making the calculated intervals equal to the predetermined reference values, to thereby realize a high image quality. The color misregistration detecting patterns 220K, 220Y, 220M and 220C, and 221K, 221Y, 221M and 221C formed on the transfer belt 202 are removed by the transfer belt cleaner 213 after the sampling.

In the color image forming apparatus thus constructed and operated, the following problem arises when the color misregistration detecting patterns are formed on the seam 202a of the transfer belt 202, and some amount of toner of the patterns is left there after insufficient removal by the transfer belt cleaner 213. In the next color image forming process, the residual toner attaches to the reverse side of the transfer sheet 201 held on and carried by the transfer belt 202, to stain the reverse side of the transfer sheet. A minute step is present at the seam 202a of the transfer belt 202. Therefore, it frequently happens that a density of the color misregistration detecting patterns 220 and 221 is varied or the patterns are discontinuous at the seam of the belt. The density variation or the discontinuity of the color misregistration detecting pattern leads to an error in the pattern detection by the line photo sensing device 222.

A sampling correcting method is already proposed by the Applicant of the present patent application (the Unexamined Japanese Patent Application Publication No. Hei. 6-253151). In controlling an image sampling correction process by the registration basis control means of the multi-image forming apparatus, a sampling start point of sampling control means and a sampling width are set, a misregistration measuring pattern is generated repeatedly, and sampling data or arithmetic processing data are added up to obtain a pattern position. An accuracy of detecting the misregistration measuring pattern is improved by, for example, setting the sampling start point of the sampling control means and the sampling width.

The sampling correcting method detects and corrects a color misregistration whose the size and orientation are fixed (referred to as a DC color misregistration), which results from minute variations of the positions and the sizes of the image forming units per se and the component parts in the image forming units, which are caused by an in-machine temperature variation and the application of an external force to the machine.

In addition to the DC color misregistration, there is another type of color misregistration (referred to as an AC color misregistration) whose magnitude and orientation periodically vary. The AC color misregistration is caused by rotation variations of the rotary means, such as the photoreceptor drums and the belt drive roll. The sampling correcting method mentioned above cannot handle the AC color misregistration and further cannot detect the AC color misregistration.

Actually, to cope with this problem, the conventional color image forming apparatus detects a variation of rotation of the rotary means, such as the photoreceptor drum and the belt drive roll, by an encoder attached to the rotary shaft of the photoreceptor drum, for example, and applies a detecting variation of rotation to the related drive motor in a feed forward or a feedback manner, to thereby reduce the variation of rotation.

Even if the control to reduce the rotation variation of the photoreceptor drum in accordance with detecting information derived from the encoder is carried out, other factors cause the AC color misregistration, which deteriorates the image quality. Example of those other factors are an eccentricity of the photoreceptor drum surface caused by the drums per se or its mounting portions, and in some constructions, an eccentricity caused by clearance errors of the rotary shafts of some of the photoreceptor drums, the belt drive roll, and the like. Thus, in the conventional art, the AC vibration component is not contained in an object to be controlled.

The applicant of the present patent application already proposes a unique image forming apparatus as a solution to the problem under discussion (the Japanese Patent Application No. Hei. 7-301381). The proposed apparatus succeeds in considerably reducing the image quality deterioration ensuing from the AC color misregistration caused by the above-mentioned factors by adjusting at least one of the rotation phases of each of the rotary means, such as the photoreceptor drum and the belt drive roll.

The inventor in the above-mentioned patent application explicated the fact that, as shown in FIG. 45A, in the conventional color image forming apparatus, the AC vibration component on one turn of the photoreceptor drum of each image forming unit varies over a fixed region (an image transfer region corresponding to the length of one circumference of each color photoreceptor drum) on the transfer belt, and the waveforms of the profiles representative of the variations of the AC vibration components of the photoreceptor drums are not uniform in phase among the photoreceptor drums. Judging from the fact, it is estimated that in the case of the photoreceptor drums of two colors, K color (black) and Y color (yellow), a phase difference between the waveforms of the profiles of the variations of the AC vibration components of those drums, produces color misregistration as shown in FIG. 45B.

In the invention of that patent application, color misregistration detecting patterns are formed on the transfer belt, periodical rotation phases are picked up from the pattern detecting information, and the rotation phases of the photoreceptor drums, for example, are adjusted by rotation phase adjusting means. In this way, the adverse affects by the rotation variations that will appear on the image are considerably reduced. More specifically, the rotation phase of the K photoreceptor drum is used as a reference phase, and the rotation phases of the photoreceptor drums of the remaining three colors are adjusted on the basis of the reference phase. Actually, the variations of the AC vibration components of the photoreceptor drums, which are not uniform in phase among the drums as shown in FIG. 45A, are actually arranged to be uniform through the rotation phase adjustment, as shown in FIG. 46A. Particularly in this case, the AC vibration components of the respective photoreceptor drums are uniform also in amplitude among the drums. Therefore, the AC color misregistration is completely removed. The AC color misregistration of the K and Y photoreceptor drums, which are caused by the eccentricity of the photoreceptor drums, for example, are reduced to 0 as shown in FIG. 46B.

In the image forming apparatus of the patent application, in case where the waveforms representative of the profiles of the variations of the AC vibration components of the circumferences of the photoreceptor drums of the image forming units are not uniform in phase and amplitude among the drums as shown in FIGS. 47A and 47B, when the rotation phases of the photoreceptor drums are adjusted as in the above-mentioned manner, the vibrations of the AC vibration components of the circumferences of the photoreceptor drums over an image transfer region on the transfer belt are arranged to be uniform in phase among the drums as shown in FIG. 48A. In this case, the amplitudes d of the variations of the AC color misregistration of the K and Y photoreceptor drums are equal to each other (d1=d1). Therefore, the sum of those variations of the AC color misregistration is reduced to zero or thereabout. The amplitudes of the variations of the AC color misregistration of the K and M or K and C photoreceptor drums are different from each other. Therefore, the sum of those variations of the AC color misregistration is d1–d2. In other words, the AC color misregistration represented by the difference of (d1–d2) is left after the rotation phase adjustment.

The AC color misregistration arising from the difference between the AC vibration components of those two colors appears on the image as a color misregistration of a perceivable level, to thereby deteriorate the image quality.

If a fine line image, which is formed by superimposing a plural number of colors, suffers from such a color misregistration, the fine line blurs. In a character image formed on a colored white (not white of the sheet) ground, voids appear around the contour of a character. The edge of a colored image area is slightly colored with a color (e.g., magenta or cyan) different from the color of the image area. A seam between the colored image areas looks like a stripe of a different color or a void appears at the seam. In a color ground area, a density periodically varies to form a repeat of bands, viz., a called banding phenomenon occurs.

The inventors of the present patent application found that the following factors causes the AC vibration component, and hence color misregistration and magnification error (image distortion). When the belt drive roll is eccentric, a speed of the moving transfer belt (or the intermediate transfer belt) varies at the transfer points confronted with the photoreceptor drum or a magnification of the image varies in the moving direction of the belt. When the thickness of the transfer belt (or the intermediate transfer belt) per se is not uniform over its length, the belt moves at a varying speed. Specifically, when a thick part of the transfer belt reaches the belt drive roll, the speed of the moving belt is increased. When a thin part of the transfer belt reaches there, the belt speed is decreased. The belt speed periodically varies during a time period of one turn of the belt, resulting in an AC like vibration component. This AC vibration component causes color misregistration or image distortion which appears every one-turn period and every time the thick part of the belt passes the drive roll.

SUMMARY OF THE INVENTION

For the above background reasons, the present invention is to provide an image forming apparatus which can properly and satisfactorily suppress a periodical rotation variation of a rotary means, which is caused by eccentricities of the photoreceptor drum, the transfer drum, the intermediate transfer drum and the like, the eccentricities being caused by the rotary means per se or their mounting portions and clearance errors of the rotary shafts of the rotary means, and caused by the belt thickness variation.

Another object of the present invention is to provide a black and white image forming apparatus which can properly and satisfactorily suppress a periodical rotation variation of a rotary means, which is caused by eccentricities of the photoreceptor drum, the transfer drum, the intermediate transfer drum and the like, the eccentricities being caused by the rotary means per se or their mounting portions and clearance errors of the rotary shafts of the rotary means, and caused by the belt thickness variation.

An image forming apparatus of aspect 1 of the present invention, as shown in FIGS. 42A to 42C, forms a monocolor toner image by an image forming means with a rotatably driven image bearing means 6, and forms a picture by transferring the monocolor toner image formed by the image forming means onto an image transfer medium 14 transported by a roll pair an image transfer medium carried on an endless bearing means 150,151 or directly onto the endless bearing means 150,151. In the image forming apparatus, a latent image writing position SP on the image bearing means 6 is angularly spaced by approximately 180° from an image transfer position TP. The image forming apparatus includes:

pattern detecting means 70 for detecting an image misregistration detecting pattern formed on the image transfer medium 14 or the endless bearing means 150,151; and drive control means 58,86 for individually controlling a rotation speed of a rotary means, such as the image bearing means 6 or the endless bearing means 150,151 so as to suppress a periodical rotation variation of the rotary means by using detecting information of a vibration component on the periodical rotation variation, which is obtained from detecting signals derived from the pattern detecting means 70.

An image forming apparatus of aspect 2, as shown in FIG. 1, forms toner images of different colors by at least one image forming means 02K, 02Y, 02M, 02C with a rotatably driven image bearing means 01K, 01Y, 01M, 01K, and forms a picture by transferring the different colored toner images formed by transferring the image forming means 02K, 02Y, 02M, 02C onto an image transfer medium 04 supported on a rotatably driven endless bearing means 03, or directly onto the endless bearing means 03. In the image forming apparatus, a latent image writing position SP on the image bearing means 01K, 01Y, 01M, 01K is angularly spaced by approximately 180° from an image transfer position TP. The image forming apparatus includes: pattern detecting means 07 for detecting a color misregistration detecting pattern formed on the endless bearing means 03; and drive control means 08K, 08Y, 08M, 08K for individually controlling rotation speeds of rotary means, such as the image bearing means 01K, 01Y, 01M, 01K and the endless bearing means 03, so as to suppress a periodical rotation variation by using detecting information of a vibration component on the periodical rotation variation, which is obtained from detecting signals derived from the pattern detecting means 07.

The image forming apparatus of aspect 1 or 2 is arranged so as to individually control the rotation speed of the rotary means for suppressing a periodical rotation variation of the rotary means by using detecting information (amplitudes and phases of an AC vibration component) on the periodical rotation variation, which is obtained through the detection of the component detecting patterns formed on the endless bearing means, not by detecting information on a rotation state derived from encoders attached to the shaft of the rotary means. Therefore, the apparatus can perfectly eliminate an AC color misregistration component or an AC image distortion caused by an amplitude difference of the AC vibration components, which possibly occurs between or among a plural number of rotary bodies. Therefore, it is possible to satisfactorily suppress a periodical rotation variation of a rotary means, which is caused by eccentricities of the photoreceptor drum, the transfer drum, the intermediate transfer drum and the like, the eccentricities being caused by the rotary means per se or their mounting portions and clearance errors of the rotary shafts of the rotary means, and caused by the belt thickness variation. The rotation drive means for each rotary means may be a stepping motor able to finely adjust a rotation speed of the rotary body individually and every minute time unit.

In the image forming apparatus of aspect 1 or 2, the phase difference between the latent image writing position SP and the transfer position TP on the image bearing means 01 is 180°±45°.

If the phase difference is so set, a periodical rotation variation of each rotary means may be suppressed to a tolerable degree. To perfectly suppress the periodical rotation variation, the phase difference is more preferably 180°±30°, ideally 180°.

In the image forming apparatus, detecting information of the vibration component on the periodical rotation variation of a given rotary means, which is detected by the pattern detecting means 07, is multiplied by approximately ½ and phased inverted, and the resultant is superimposed on a control quantity in drive control means 08 of the rotary means or other rotary means, thereby suppressing the periodical rotation variation of the rotary means.

A periodical rotation variation of each rotary means can properly be reduced when the phase difference between the latent image writing position SP and the transfer position TP on the image bearing means 01 is 180°±45°. Normally, the detecting information of a rotary means that is detected by the pattern detecting means is input to the drive control means of the rotary means as an object to be detected, for the control purposes. In some cases, the detecting information is input to the drive control means of another rotary means which is different from the rotary means as the detected object.

The image forming apparatus further comprises phase/amplitude detecting means 06 for detecting the phase and amplitude of a vibration component on a periodical rotation variation which is detected by the pattern detecting means 07, whereby a control by the drive control means 08 is carried out according to the phase and amplitude information of the vibration component derived from the phase/amplitude detecting means 06.

The drive control means 08 is arranged so as to finely and individually adjust a speed of a corresponding rotary means, to thereby reduce the amplitude of a vibration component of each rotary means (01M, 01C, 03).

In this case, the amplitudes of the vibration components of the rotary means are all reduced to zero. Therefore, it is possible to readily and reliably prevent the occurrence of an AC color misregistration component and an image distortion, which are caused by the phases and the amplitudes of an AC vibration component as the source of the periodical rotation variation.

In the image forming apparatus, the drive control means individually and finely adjusts rotation speeds of a corresponding rotary means so as to align the phases and amplitudes of the rotation components of the rotary means with those of a reference rotary means.

In this case, the phases and amplitudes of the rotation components of the rotary means are aligned with those of a reference rotary means. Therefore, the apparatus can readily prevent the occurrence of an AC color misregistration component that is caused by the phases and amplitudes of the AC vibration component.

In the image forming apparatus, the image bearing means is a photoreceptor drum or a photoreceptor belt, the endless bearing means is either a transfer-medium transport drum or a transfer-medium transport belt or either an intermediate transfer drum or an intermediate transfer belt, and an object to be speed controlled by the drive control means is any one of the drive shaft of the image bearing means and the drive shaft of the endless bearing means.

The image forming apparatus of aspect 1 or 2 may be arranged such that a periodical rotation variation of the endless bearing means 03 is suppressed through a control by the drive control means 08 of the image bearing means 01.

In this case, the periodical rotation variation of the endless bearing means may readily be suppressed in such a simple manner that a speed of the image bearing means is finely adjusted in consideration with a periodical rotation speed of the endless bearing means.

When the endless bearing means is a belt-like bearing means, the periodical rotation variation of the belt-like bearing means consists of one or more the following vibrations: 1) a vibration caused by an eccentricity of the image bearing means or its mounting portion or caused by its drive roll or drive gear, 2) a vibration caused by an eccentricity of the drive roll of the belt-like bearing means or its drive gear, and 3) a speed variation caused by the nonuniform thickness of the belt-like bearing means.

The periodical rotation variation of the belt-like bearing means is a simple variation as any of those three variations or a composite variation as a combination of those variations. Therefore, the periodical rotation variation may be suppressed by controlling at least one of those types of periodical rotation variation the drive control means of the image bearing means as described above.

When the periodical rotation variation of the endless bearing means is controlled through the control by the image bearing means, the vibration component on the periodical rotation variation of the endless bearing means 03, which is detected by the pattern detecting means 07, is multiplied by approximately ½ and phased inverted, and the resultant is superimposed on a control quantity in drive control means 08 of the image bearing means 01, thereby suppressing the periodical rotation variation of the endless bearing member 03.

Even when the endless bearing means 03 is a transfer drum or a transfer belt, this control efficiently suppresses the periodical rotation variation of it.

In this image forming apparatus, when the image bearing means 01 is a photoreceptor drum, and the endless bearing means 03 is either a transfer-medium transport drum or an intermediate transfer belt, the diameter of the drive roll of the transfer-medium transport drum or the intermediate transfer belt 03 is 1/(2N−1) (N:natural number) the diameter of the photoreceptor drum.

In the image forming apparatus of aspect 1 or 2, the rotation speed control for suppressing the periodical rotation variation is a feed forward control.

In this case, before an image forming operation, a periodical rotation variation is suppressed by using detecting information on a periodical rotation variation obtained by detecting a color misregistration detecting pattern, and as a result, deterioration of the picture quality owing to an AC color misregistration is minimized.

The rotation speed control for suppressing the periodical rotation variation may be combined with a feedback control based on the detection of a rotation state of the drive shaft of each of the image bearing means and the endless bearing means.

In this case, an AC vibration component of high frequencies generated in accordance with a rotation state of the rotary means can be removed through the feedback control based on the detecting information derived from the encoder and the like. The detection and the control of the color misregistration pattern are performed after removal of the high frequency AC vibration component. Therefore, an AC vibration component of low frequencies may be detected easily and precisely, and a proper control based on the detecting information is secured.

The detection of the color misregistration detecting pattern for suppressing the periodical rotation variation and the control based on the detecting information are executed for the rotary means in the order of the lengths of the rotation periods of the rotary means.

In this control, the AC vibration components of low frequencies, which are dependent on the rotary means, are first removed. Therefore, the detection of the rotary-means dependent AC vibration components of high frequencies which follows the removal of the low frequency AC vibration component is easy and precise.

In the image forming apparatus of aspect 1 or 2, a vibration component on a periodical rotation variation based on detecting information of the color misregistration fine adjustment detecting pattern is extracted every time a DC color misregistration correction cycle, to thereby obtain a variation quantity of the vibration component, and when the variation quantity exceeds a predetermined value, a control based on the detecting information of the color misregistration fine adjustment detecting pattern is carried out.

In this control, a phenomenon giving rise to the AC vibration component (periodical rotation variation) accidentally occurs, if occurs, can be periodically monitored. Further, when a variation quantity of such an AC vibration component reaches a level, not negligible, it can be suppressed properly by executing the control based on the detecting information of the color misregistration fine adjustment detection pattern.

The image forming apparatus may be constructed such that when the variation quantity exceeds a predetermined value, the control of the rotation speed for suppressing the periodical rotation variation is carried out in accordance with the detecting information of the color misregistration fine adjustment detecting pattern.

Here, the wording "the control of the rotation speed for suppressing the periodical rotation variation is carried out in accordance with the detecting information of the color misregistration fine adjustment detecting pattern." means that when a detection accuracy of the AC vibration component extracted from the DC component detection fine adjustment pattern is comparable with a detection accuracy of the AC vibration component extracted from the AC component fine adjustment pattern, the control (correction) for suppressing the periodical rotation variation is immediately carried out on the basis of the detecting information of the DC component detection fine adjustment pattern. When the detection accuracy is poor, any of the following methods is employed. In a first method, only when the variation quantity is larger than the expected detection accuracy (data resolution) degradation, the control for suppressing the periodical rotation variation is carried out on the basis of the detecting information of the AC color misregistration detecting pattern. In a second method, that control is not executed, and the AC vibration component data obtained are disposed in the form of fail or warning.

When the mentioned control is used, there is no need of executing the detecting cycle based on the AC component detecting patterns, although the detection accuracy is somewhat deteriorated. Further, a quick start of executing the control for suppressing the periodical rotation variation is possible.

In the image forming apparatus, the color misregistration detecting pattern for suppressing the periodical rotation variation is detected and a control based on its detecting information is carried out, and then the control based on a rotation speed for suppressing the periodical rotation variation is carried out again in accordance with the detecting information of the color misregistration fine adjustment detecting pattern.

In this case, it is not denied that a down time where the image forming process is not carried out increases, but a reliable and high precision correction is ensured.

In the image forming apparatus of aspect 1 or 2, the fine adjustment of the rotation speed by the drive control means 08 is carried out at any of the following timings: when the power switch is turned on, after the jamming is removed, when the image bearing means or the endless bearing means and their drive rolls is detached or attached again or after maintenance, every tome a predetermined time elapses, when a temperature variation exceeds a predetermined value, after the image forming apparatus is moved from its installed location or is vibrated, and when an image offset of the image forming apparatus exceeds a predetermined value.

In the above image forming apparatus, when the fine adjustment of the rotation speed by the drive control means 08 is carried out when the image bearing means or the endless bearing means and their drive rolls is exchanged, detached or attached again or after maintenance, a sequence of control operations for the fine adjustment is forcibly started by a manual instruction by a service man or automatically started when the power switch is turned on.

In the above image forming apparatus, when a plural number of rotatably driven rotary means are used, those rotary means are classified into groups of rotary means using criteria which consists of 1) a condition that the amplitudes of the eccentric components, which are present at both sides of the photoreceptor drums when viewed in the axial direction, are below a predetermined value, and 2) another condition that the eccentric components have the amplitudes within a predetermined value and the same phases.

In this case, when a rotary means is replaced with a new one, the new rotary means is selected from the same type of the group of rotary means to which the old rotary means belongs. Therefore, the new rotary means has substantially the same mechanical features as of the old one. The amplitudes or the amplitudes and phases of the eccentric components of those rotary means are coincident with each other. Therefore, the AC color misregistration may be suppressed to a predetermined level or smaller by merely performing the rotation phase adjustment and the control for suppressing the periodical rotation variation in accordance with the known detecting information. The new and assembled rotary means provides an image quality comparable in quality with that by the old rotary means.

BRIEF DESCRIPTION OF THE DRAWINGS

FIGS. 11A and 11B are tables showing the relationships of frequencies of rotation variations and sampling frequencies.

DETAILED DESCRIPTION OF THE PREFERRED EMBODIMENTS

The preferred embodiments of the present invention will be described in details.

Embodiment 1

Figure 2:
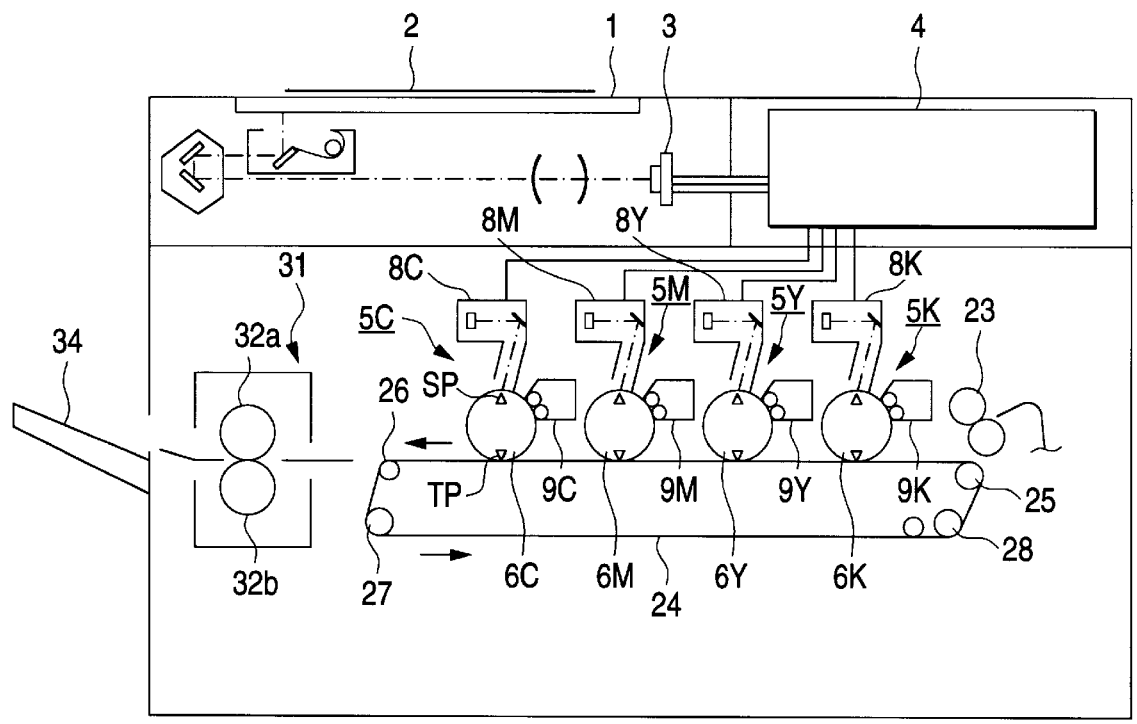
FIG. 2 is a schematic view showing an embodiment of a digital color copying machine according to the present invention.

FIG. 2 is a view showing an overall construction of a digital color copying machine as one form of an image forming apparatus according to the present invention.

<Outline of the Image Forming Apparatus>

In FIG. 2, an image depicted on an original document that is located on a platen glass 1 is read and converted into analog image signals of R, G and B by an image scanner with a color CCD sensor 3 which operates in cooperation with an optical system including a light source, a scanning mirror and the like. The RGB analog image signals derived from the color CCD sensor 3 enter an image processing unit 4 which in turn converts these image signals into image signals of K, Y, M and C and temporarily stores the converted ones in a memory included in the image processing unit 4.

The image processing unit 4 successively outputs the image data of the respective colors to image forming units 5K, 5Y, 5M and 5C of black (K), yellow (Y), magenta (M) and cyan (C). Laser beams LB that are emitted from ROSs 8K, BY, 8M and 8C of those image forming units scan the surfaces of photoreceptor drums 6K, 6Y, 6M and 6C, to thereby form latent electrostatic images thereon. A position on the surface of each photoreceptor drum 6 where is exposed to the laser beam LB is generally called a latent image write position (referred frequently to as an exposure point). The latent images formed on the photoreceptor drums 6K, 6Y, 6M and 6C are developed into toner images of colors, black (K), yellow (Y), magenta (M) and cyan (C).

Figure 3:
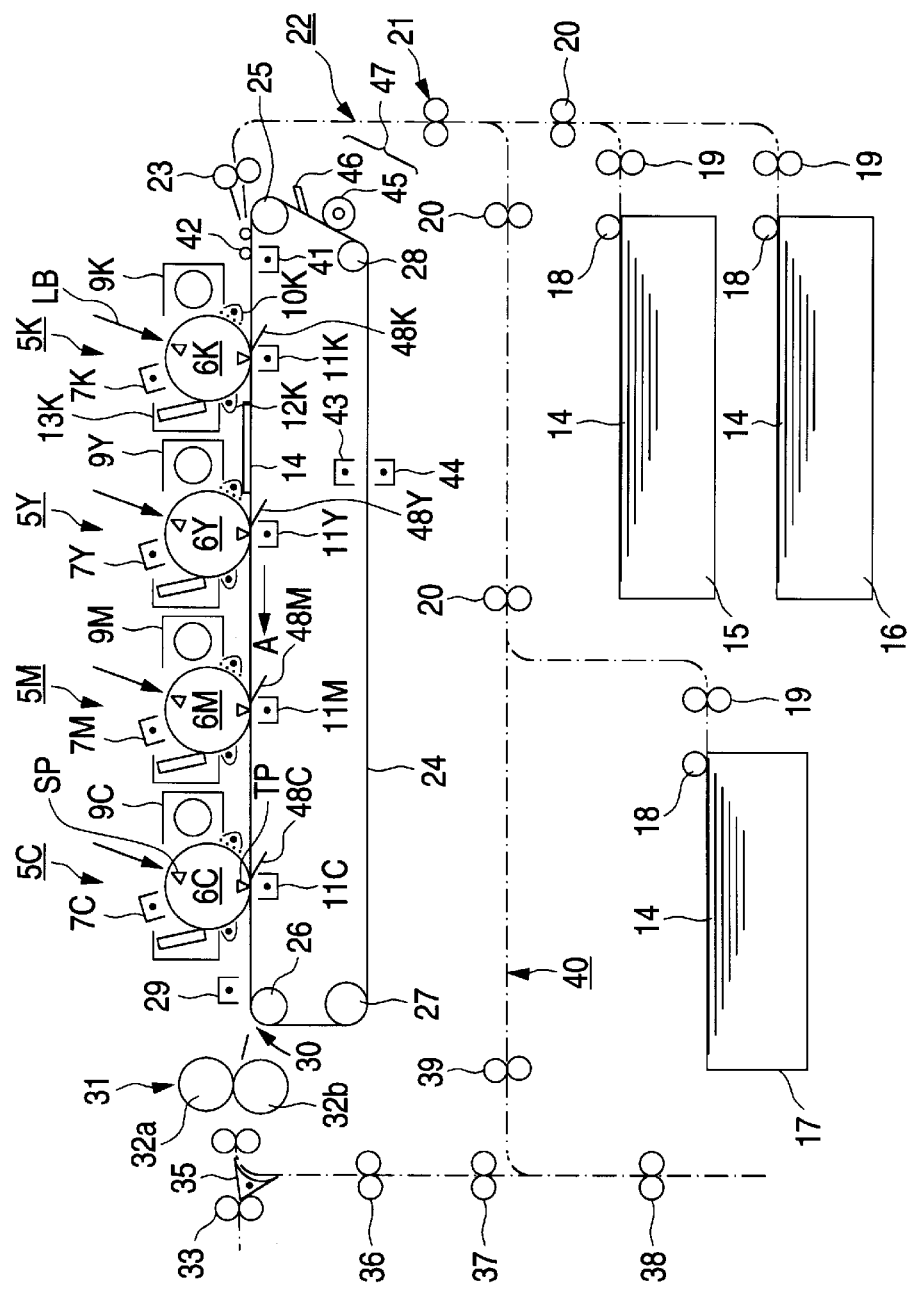
FIG. 3 is a view showing a key portion of the digital color copying machine of FIG. 2.

An image receiving sheet 14 onto which the color toner images are to be transferred from the photoreceptor drums 6K, 6Y, 6M and 6C, as shown in FIG. 3, is picked up from one of sheet supplying cassettes 15, 16 and 17 containing transferring sheets of different sizes, and transported through a sheet transport path 22 including a feed roller 18, sheet transport roller pairs 19, 20 and 21. The image receiving sheet 14 supplied from any of the sheet supplying cassettes 15, 16 and 17 is transported onto a transfer belt 24 as an endless image bearing means by a registration roll pair 23 driven to turn at a preset timing. The transfer belt 24 is wound around an arrangement of a drive roll 25, a stripping roll 26, a tension roll 27 and an idle roll 28. The transfer belt 24 is turned in a circulating manner at a constant speed in the arrow direction by the drive roll 25, which is driven by a drive motor (e.g., a stepping motor), not shown, of the good constant speed performance. The transfer belt 24 is formed in a manner that a flexible synthetic resin film made of PET, for example, is formed into a band, and both ends of the resin band is bonded together by a suitable means, for example, welding, into an endless belt.

The sheet feeding timing and the image writes timing are set so that the lead edge of the image receiving sheet 14 transported by the transfer belt 24 and the lead edge of an image on the first photoreceptor drum 6K by the first image forming unit 5K simultaneously arrive at the transfer point TP located at the lowest point of the first photoreceptor drum 6K. At the transfer point TP, a visual image is transferred from the first photoreceptor drum 6K onto the image receiving sheet 14 by a transfer corotron 11K. Then, the image receiving sheet 14 is moved forward to reach a transfer point TP right under the photoreceptor drum 6Y. At the transfer point TP right under the photoreceptor drum 6Y, a visual image is transferred from the photoreceptor drum 6Y onto the image receiving sheet 14 as it was done at the station of the first photoreceptor drum 6K. The image receiving sheet 14 having received all of the visual images arrives at a point near to the stripping roll 26 and is discharged by a stripping discharging corotron 29, and is stripped off the transfer belt 24 by the stripping roll 26 of a small radius of curvature and a stripping pawl 30. Thereafter, the image receiving sheet 14 having all four tandem color images transferred thereonto in a superimposed manner is fixed by a heating roll 32a and a pressure roll 32b of a fixing unit 31. In this way, a multi-colored image is copied.

When a full colored image is copied on both sides of the image receiving sheet 14, the image receiving sheet 14 having a full colored image already on one side of the sheet is moved to a switch plate 35, not to a discharging roll pair 33 (without being discharged outside by the discharging roll pair 33). The advancing direction of the copy sheet is turned downward and transported through a shee t transport path 40 including sheet transport roll pairs 36, 37, 38, and 39, and the like, and is transported again to the transfer belt 24 by way of the paper transport path 22 in a state that the copy sheet is turned upside down. A color image is formed on the reverse side of the sheet 14 by a similar process to the above one.

The four image forming units 5K, 5Y, 5M and 5C, as shown in FIG. 3, are substantially the same in construction. In those four image forming units 5K, 5Y, 5M and 5C sequentially form black, yellow, magenta and cyan toner images at preset timings. The image forming units 5K, 5Y, 5M and 5C, respectively, are provided with the photoreceptor drums 6K, 6Y, 6M and 6C. After the surfaces of those photoreceptor drums 6K, 6Y, 6M and 6C are uniformly charged by primary charging scorotrons 7K, 7Y, 7M and 7C, the drum surfaces are exposed, at predetermined exposure points SP, to and scanned with image forming laser beams LB emitted from the ROSs 8K, 8Y, 8M and 8C in accordance with the image data. As a result, latent electrostatic images of the respective colors are formed on the drum surfaces. The latent images formed on the surfaces of the photoreceptor drums 6K, 6Y, 6M and 6C, respectively, are developed into visual images of black, yellow, magenta and black toner particles by developing units 9K, 9Y, 9M and 9C. These toner images are charged by pre-transfer chargers 10K, 10Y, 10M and 10C prior to transfer points TP as the lowest points of the photoreceptor drums 6K, 6Y, 6M and 6C. Then, the toner images are sequentially transferred onto the transfer belt 24 having been charged by transfer chargers 11K, 11Y, 11M and 11C and held on the transfer belt 24. The image receiving sheet 14 having the black-yellow-magenta-cyan toned image transferred thereon is stripped off the transfer belt 24, and subjected to a fixing process by the fixing unit 31 as already stated. In this way, a color image is copied.

The image receiving sheet 14 is supplied from any of the sheet supplying cassettes 15, 16 and 17, and transferred onto the transfer belt 24 at a preset timing by the registration roll pair 23, and held on the transfer belt 24 with the aid of a sheet holding charger 41 and a charging roll 42.

After the process of transferring all four tandem color images is completed, the photoreceptor drums 6K, 6Y, 6M and 6C are discharged by before-cleaning dischargers 12K, 12Y, 12M and 12C, and toner particles left on the drums are removed by cleaners 13K, 13Y, 13M, and 13C, and ready for the next image forming process.

After the image receiving sheet 14 is stripped off the transfer belt 24, the belt is discharged by a pair of belt discharging corotrons 43 and 44, and toner particles and paper dust that are left on the surface of the transfer belt 24 are removed by a cleaning unit 47 including a rotary brush 45 and a blade 46.

Figure 4:
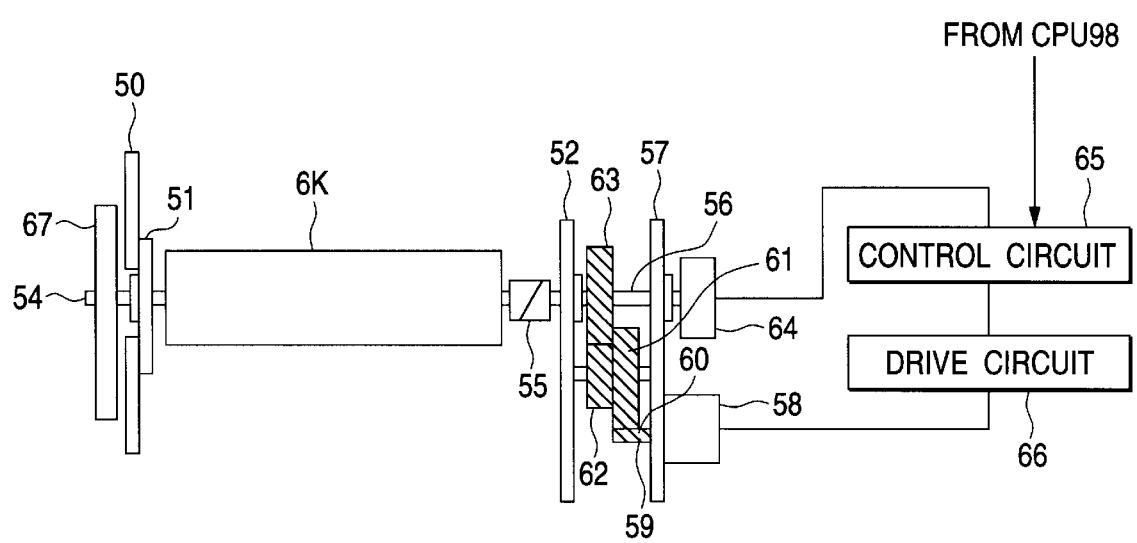
FIG. 4 is a view showing a drive device for a photoreceptor drum.

In the thus constructed digital color copying machine, the devices for driving and turning the photoreceptor drums 6K, 6Y, 6M and 6C will be described. Those devices are provided for the photoreceptor drums 6K, 6Y, 6M and 6C, respectively. In the description to follow, the drive device for driving the photoreceptor drum 6K will be typically discussed. In the drum drive device, as shown in FIG. 4, the photoreceptor drum 6K is rotatably supported between a first frame 50 and a second frame 52. A drive shaft 56, which is coupled with a rotary shaft 54 by way of a coupling 55, is rotatably supported between the second frame 52 and a third frame 57. The photoreceptor drum 6K is driven to turn by a drive mechanism including a drive motor 58, e.g., a stepping motor, a motor shaft gear 60 provided on a rotary shaft 59 of the drive motor 58, a first intermediate gear 61 in mesh with the motor shaft gear 60, a second intermediate gear 62 secured to the same shaft of the first intermediate gear 61, and a photoreceptor drive gear 63 in mesh with the second intermediate gear 62 and secured to the drive shaft 56 of the photoreceptor drum 6K. An encoder 64 is attached to the drive shaft 56 of the photoreceptor drum 6K. The encoder 64 detects a rotating state of the encoder 64, and feeds back a detecting signal to a drive circuit 66 by way of a control circuit 65, to thereby control a rotation speed of the photoreceptor drum 6K to be constant. In the figure, reference numeral 67 designates a flywheel attached to the rotary shaft 54 of the photoreceptor drum 6K.

The drive roll 25 for driving the transfer belt 24 is also driven to turn by a drive device constructed like the drive device for the photoreceptor drum 6.

<Outline of an Image Forming Section and a Control System>

Figure 5:
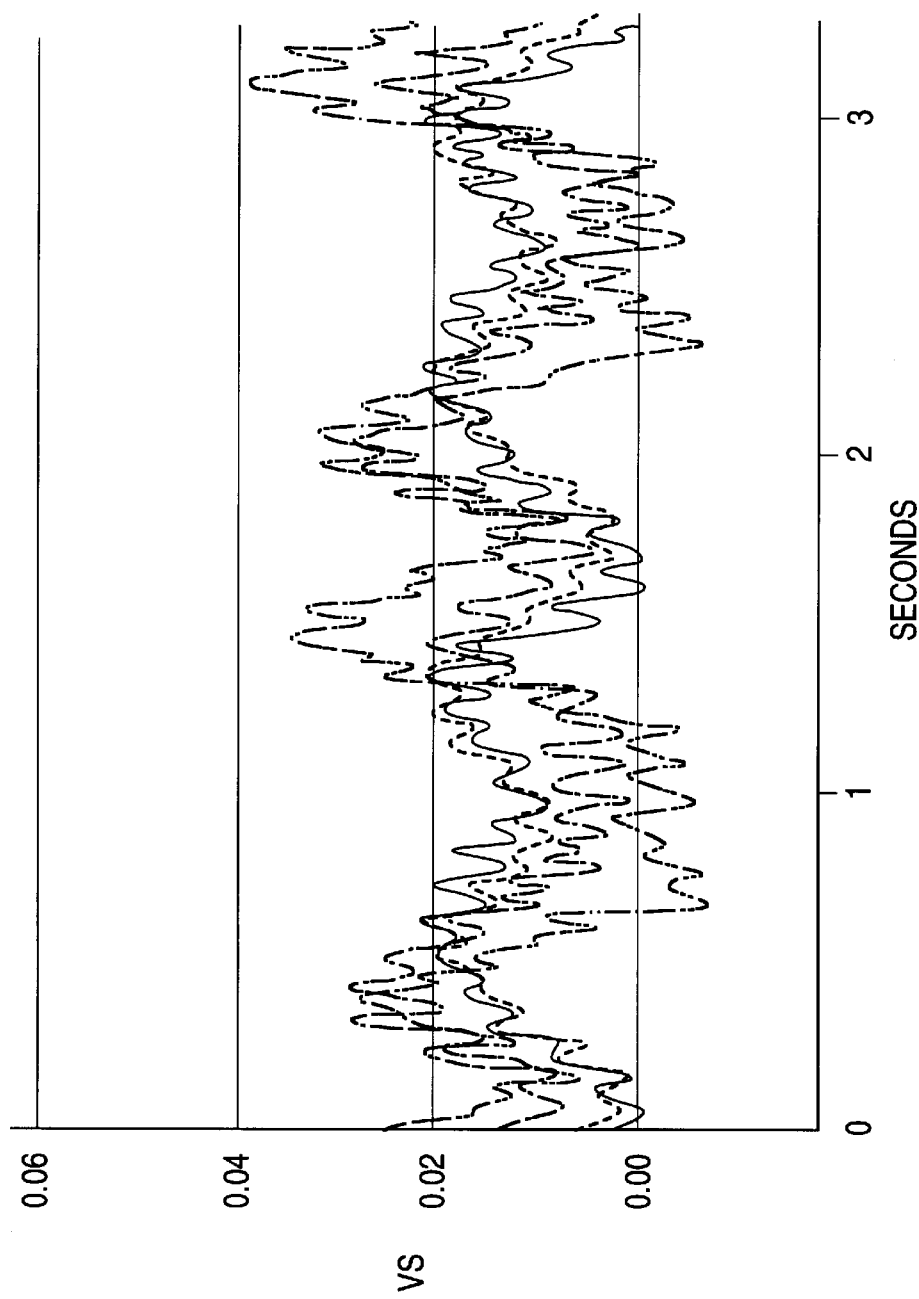
FIG. 5 is a graph showing rotation variations of the photoreceptor drums.

In the thus constructed digital color copying machine, rotation variations at short periods or relatively high frequencies are generated, and these rotation variations appear as rotation variations of black, yellow, magenta and cyan as shown in FIG. 5. The rotation variation varying at short periods or of relatively high frequencies are caused by, for example, a variation of the period of one turn of each photoreceptor drum 6K, 6Y, 6M and 6C, a variation of the period of one turn of the drive roll 25 of the transfer belt 24, eccentricity of the photoreceptor drums and the drive roll, caused by the drums and roll per se or their mounting portions (flanges, for example), the vibration and eccentricity of the gears 60 to 63 for driving them, and a phenomenon, called a walk, in which the transfer belt 24 shifts in the direction orthogonal to the belt moving direction. The non-uniform thickness of the transfer belt 24 also appears as a rotation variation of the transfer belt.

Figure 6:
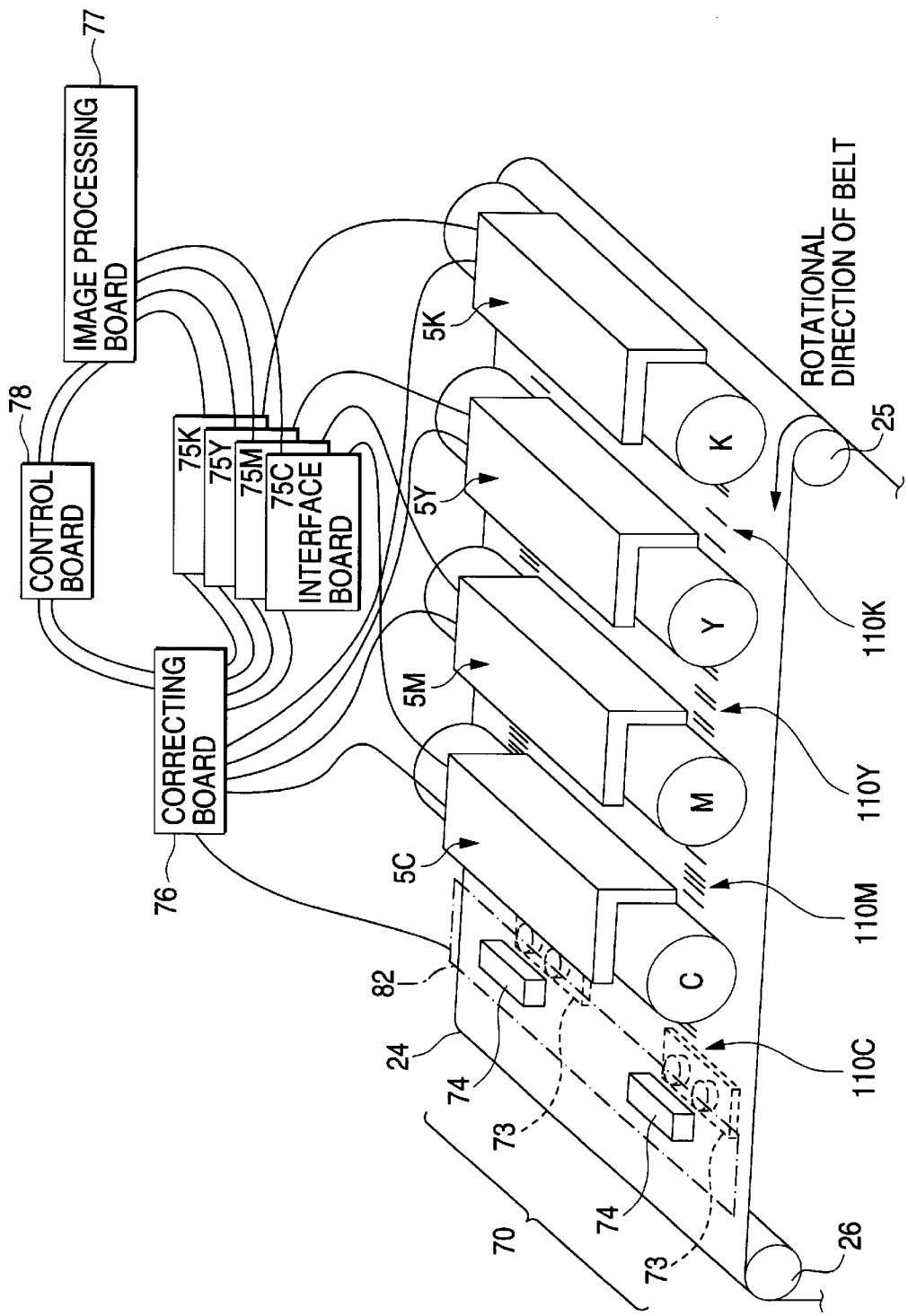
FIG. 6 is a perspective view showing a control portion for the photoreceptor drums.

FIG. 6 is a schematic view showing an image forming portion and a control portion of the digital color copying machine.

Figure 7:
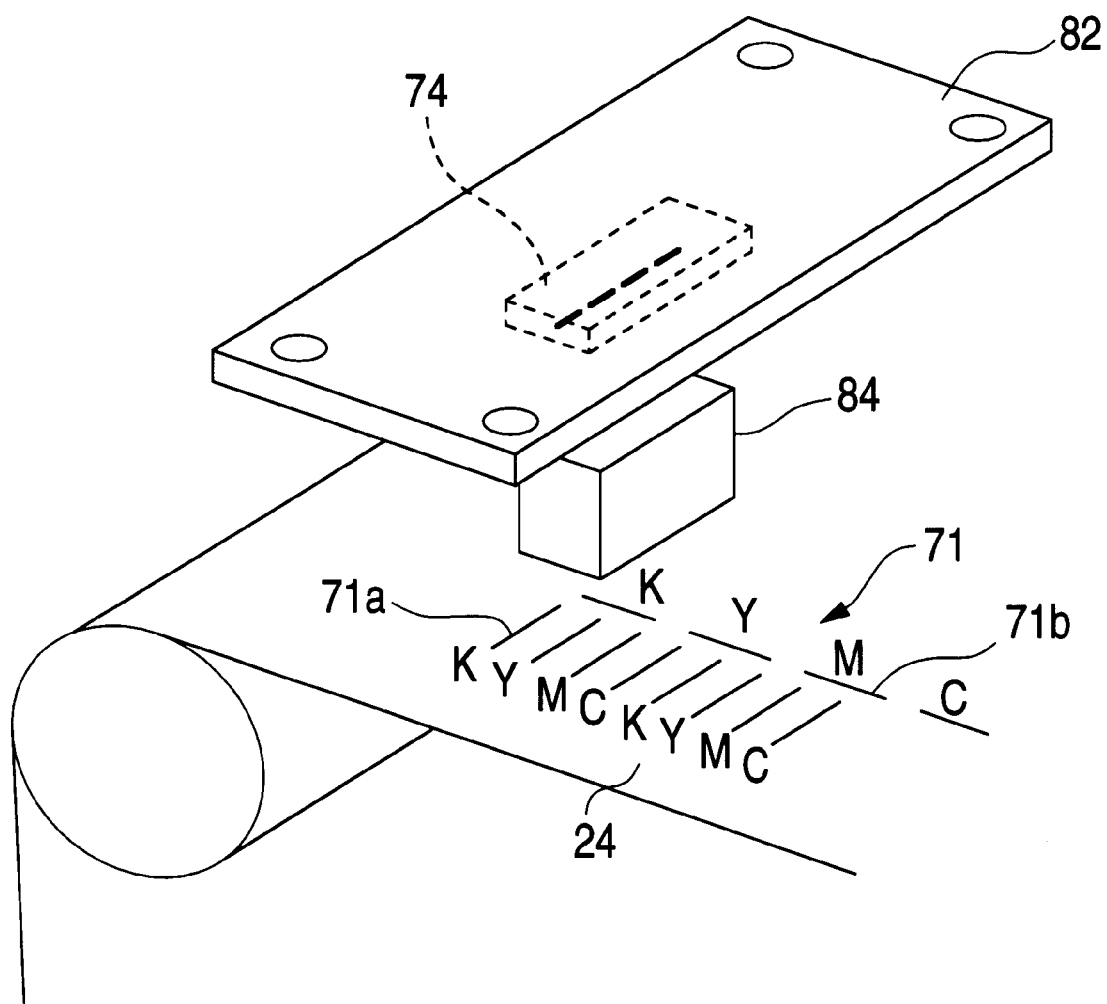
FIG. 7 is a perspective view showing how the pattern detecting means is mounted.

In FIG. 6, pattern detecting means 70 for detecting a color misregistration detecting pattern image 71 (FIG. 7) formed on the transfer belt 24 by each image forming unit 5K, 5Y, 5M and 5C. The pattern detecting means 70 includes two sets of a light source 73 and a photo sensing element 74 that are respectively located closer to the side edges of an image forming region of the transfer belt 24 when viewed in the widthwise direction. The light source 73 includes a LED for emitting back light necessary for detecting the color misregistration detecting pattern 71. The photo sensing element 74 includes a CCD as a line photo sensing element containing a number of photo sensing pixels linearly arrayed. FIG. 7 three-dimensionally illustrates a positional relationship between the photo sensing element 74 and the color misregistration detecting pattern 71 on the transfer belt 24. In the figure, reference numeral 82 designates a sensor board on which the CCD of the photo sensing element 74 and the peripheral circuit for driving the CCD, and numeral 84, a distributed index lens.

Thus, the pattern detecting means 70 are located one for one side of the transfer belt 24 when viewed in its widthwise direction. With use of such pattern detecting means, it is possible to adjust in all directions every type of color misregistration including offsets of a copy in the fast scan direction (orthogonal to the directions of the forward rotations of the photoreceptor drum and the transfer belt) and in the slow scan direction (the forward rotation directions of the photoreceptor drum and the transfer belt), magnification error in the fast scan direction, skew with respect to the fast scan direction, and the like.

In FIG. 6, 75K, 75Y, 75M and 75C designate interface boards for sending image signals to the ROSs 8K, 8Y, 8M and 8C of the image forming units 5K, 5Y, 5M and 5C. A correcting board 76 controls a color misregistration correcting system. A control board 78 controls all the operations of the digital color copying machine. An image processing board is designated by 77.

In the present embodiment, the color misregistration detecting pattern 71 includes color misregistration detecting patterns 71b(K), 71b(Y), 71b(M) and 71b(C), arrayed in the slow scan direction, for detecting the color misregistration oriented in the fast scan direction at a right angle to the advancing direction of the transfer belt 24, and color misregistration detecting patterns 71a(K), 71a(Y), 71a(M) and 71a(C), arrayed in the fast scan direction, for detecting the color misregistration oriented in the slow scan direction coincident with the advancing direction of the transfer belt 24. As shown in FIG. 6, sets of the color misregistration detecting patterns 71a(K), 71a(Y), 71a(M) and 71a(C) and the color misregistration detecting patterns 71b(K), 71b(Y), 71b(M) and 71b(C) are sequentially transferred, in a superimposing fashion, onto the transfer belt 24 over its entire circumference while being positioned such that the pattern detecting means 70, located one at this side and the other at the other side of the image forming unit, can read the patterns. The color misregistration detecting patterns 71a(K), 71a(Y), 71a(M) and 71a(C) arrayed in the fast scan, and the color misregistration detecting patterns 71b(K), 71b(Y), 71b(M) and 71b(C) arrayed in the slow scan direction consist of stripe patterns as linear parts of black (K), yellow (Y), magenta (M) and cyan (C) are sequentially arrayed at predetermined spatial intervals.

Figure 9:
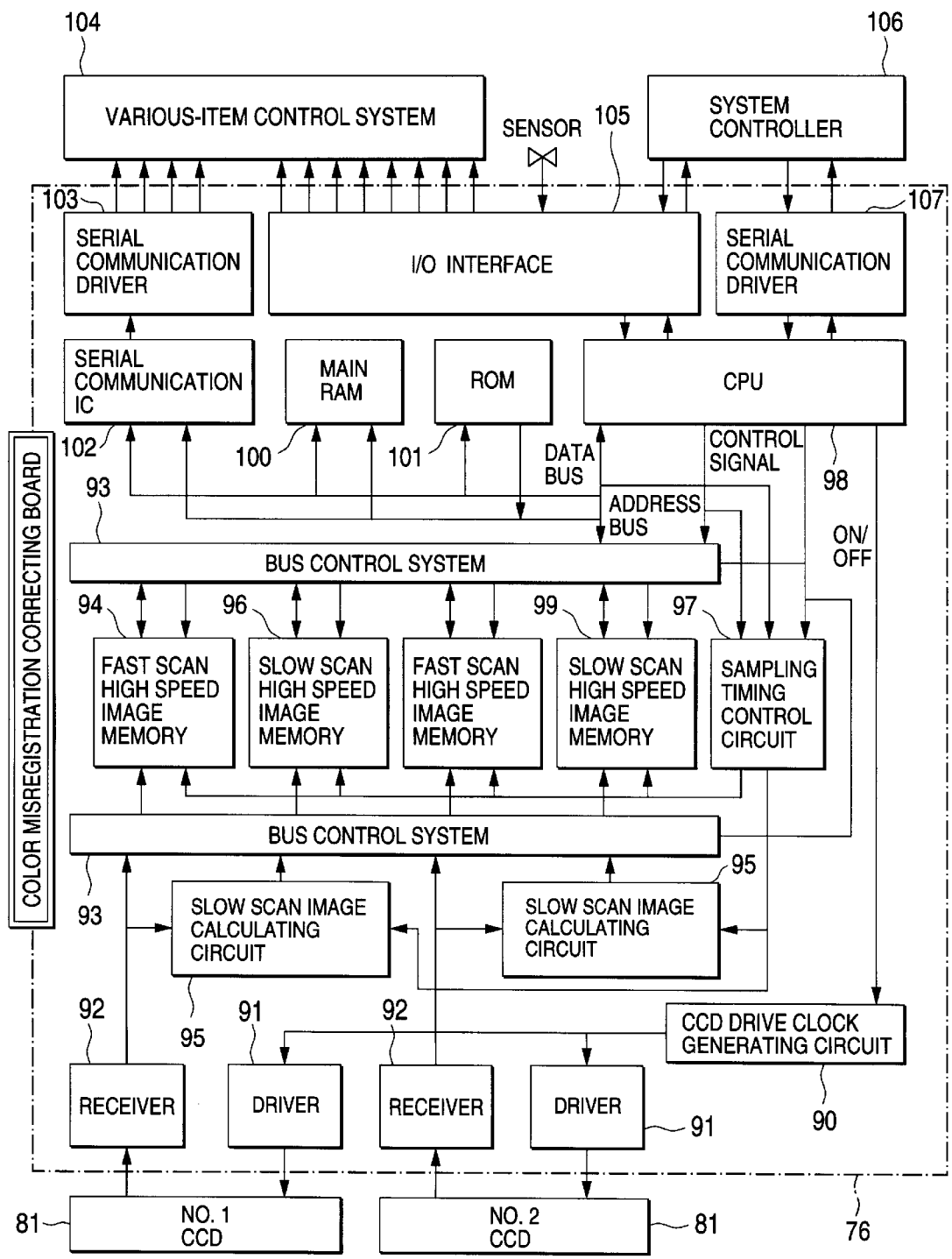
FIG. 9 is a block diagram showing a control circuit.

FIG. 9 is a block diagram showing an example of a control portion of a sampling unit for sampling the color misregistration detecting patterns in the present embodiment. The control portion is contained in the correcting board 76 shown in FIG. 6.

In the correcting board 76, a driver 91 drives a CCD sensor in accordance with a clock signal generated by a CCD drive clock generating circuit 90, so that the CCD sensor sequentially transfers image data of 256 gradation levels to a receiver 92. The image data on the fast scan direction is stored into a fast scan high speed image memory 94 by way of a bus control system 93. The image data on the slow scan direction is averaging processed by a slow scan image calculating circuit 95, and then stored into a slow scan high speed image memory 96 by way of the bus control system 93. A sampling timing control circuit 97 controls the timings of loading image data into the slow scan image calculating circuit 95, the fast scan high speed image memory 94 and the slow scan high speed image memory 96 in accordance with the sampling start timing, sampling periods and the like, all those being set by a CPU 98. A main RAM 100 is used as a work area of the CPU 98, and a ROM 101 stores control programs of the CPU 98. A serial communication IC 102 and a serial communication driver 103 send control data, e.g., setting parameters, from the CPU 98 to a various-item control system 104. An I/O interface 105, coupled with the CPU 98, outputs an on/off signal to the various-item control system 104, receives an on/off signal from the sensor, and transfers an on/off signal to and from a system controller 106. A serial communication driver 107 transfers data to and from the CPU 98 and the system controller 106.

The CPU 98 fetches image data of the color misregistration measuring patterns 71 output onto the transfer belt 24 and sets up image position addresses, and computes the quantities of the color misregistration by controlling the CCD drive clock generating circuit 90, the sampling timing control circuit 97 and the bus control system 93, and controls the various-item control system 104 through the serial communication IC 102 and the serial communication driver 103 or through the I/O interface 105 and the serial communication driver 107.

Figure 1:
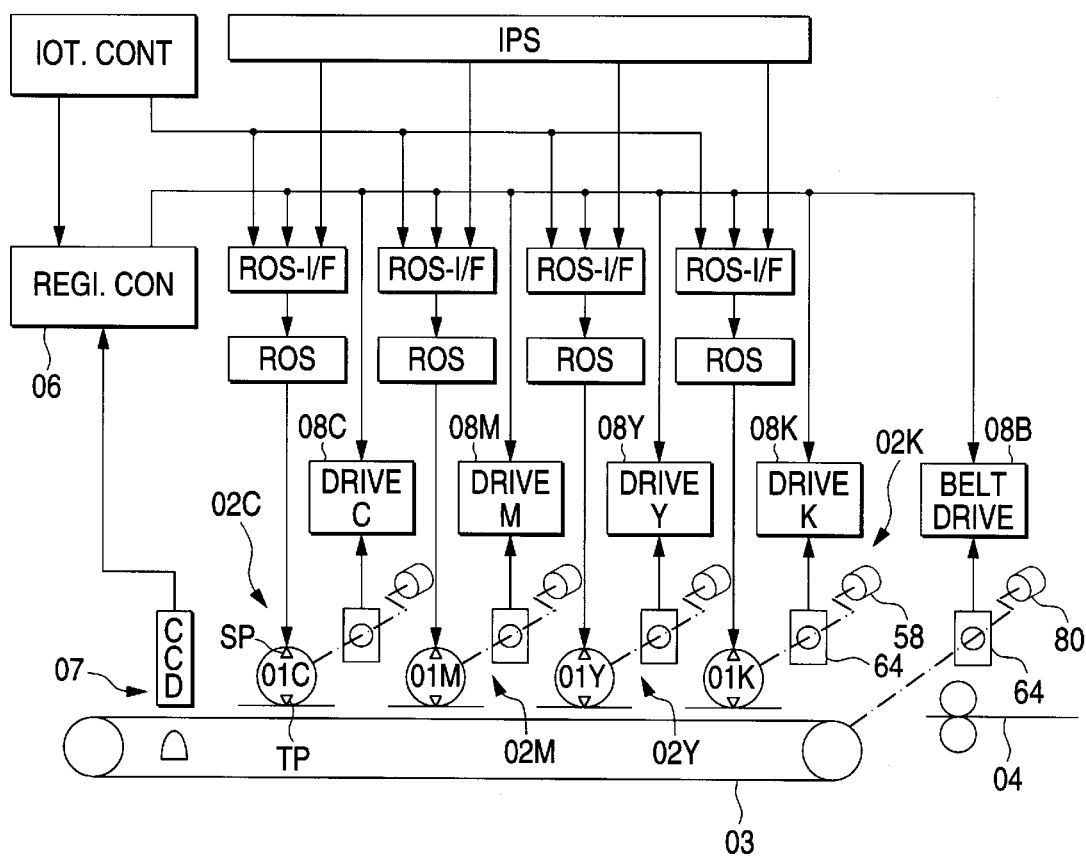
FIG. 1 is a view showing the concept of an image forming apparatus according to the present invention.

The CPU 98 sends correction data to the control circuit 65 (FIG. 4) and drive control means including drive-K, drive-Y, drive-M and drive-C, and a belt drive (FIGS. 1 and 6). The drive control means controls the rotation speeds, for example, of the drive motors 58 for photoreceptor drums and a drive motor 80 for the belt drive roll.

<AC Color Misregistration Detecting Pattern and its Sampling Method>

In the present embodiment, color misregistration detecting patterns exclusively used for the AC component detection, which are for detecting periodical rotation variations generated in the digital color copying machine, are provided separately from DC color misregistration detecting patterns.

Figure 10A:
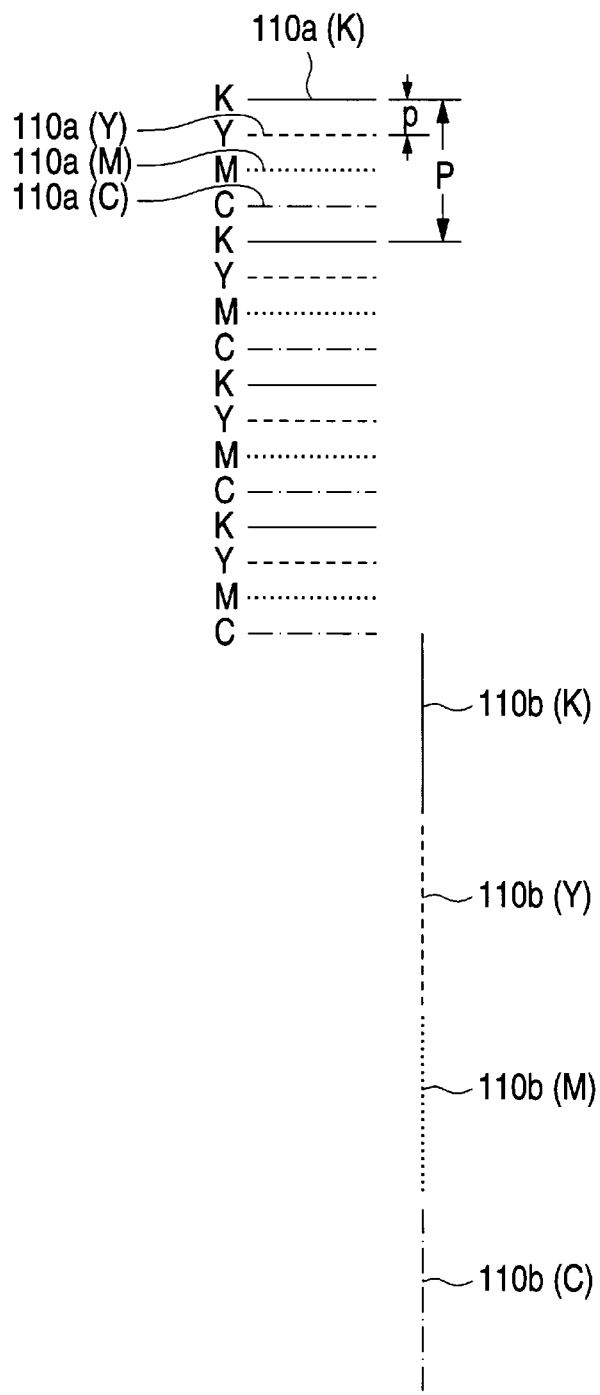
FIGS. 10A and 10B are plan views showing exemplars of DC color misregistration measuring patterns.

Specifically, in the present embodiment, as shown in FIG. 10A, for detecting a rotation variation in the slow scan direction, four linear patterns 110*a*(K), 110*a*(Y), 110*a*(M) and 110*a*(C) of four colors linearly extending in the fast scan direction are arrayed at fine pitches in the slow scan direction while being parallel to one another. For detecting a rotation variation in the fast scan direction, a set of linear patterns 110*b*(K), 110*b*(Y), 110*b*(M) and 110*b*(C) of four colors linearly extending in the slow scan direction are arrayed along a single straight line extending in the slow scan direction. Those AC color misregistration detecting patterns 110*a*(K), 110*a*(Y), 110*a*(M) and 110*a*(C), and 110*b*(K), 110*b*(Y), 110*b*(M) and 110*b*(C) are successively formed in the moving direction of the transfer belt 24 (for example, over the entire circumference of the transfer belt 24), and sampled.

Figure 10B:
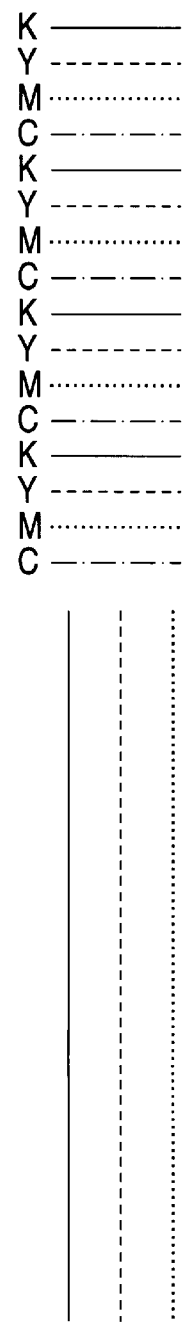
Figure 12A:
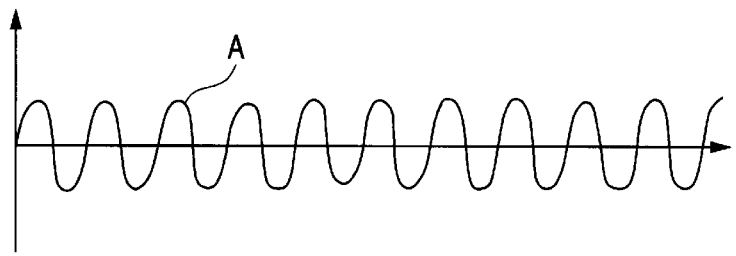
FIGS. 12A to 12D are graphs showing examples of a rotation variation.
Figure 12B:
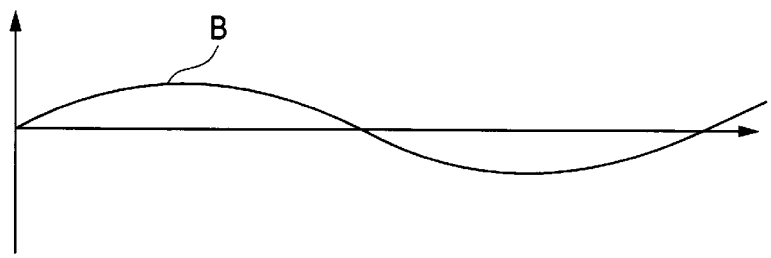
Figure 12C:
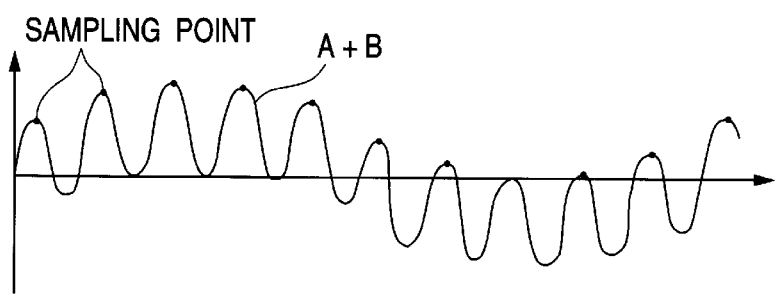
Figure 12D:
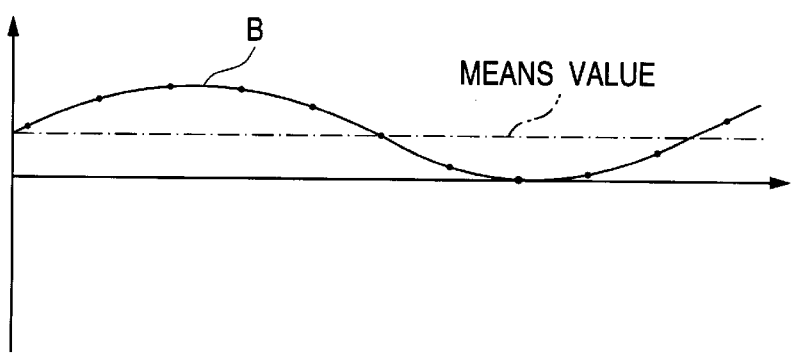

The array of linear patterns 110*b*(K), 110*b*(Y), 110*b*(M) and 110*b*(C), which are linearly arrayed in the slow scan direction for detecting a rotation variation in the fast scan direction, may be substituted by another array in which, as shown in FIG. 10B, four parallel color linear patterns extending in the slow scan direction are spaced from one another in the fast scan direction.

Of the color misregistration detecting patterns exclusively used for detecting the AC components (referred to frequently as AC component detecting patterns), the linear patterns 110*a*(K), 110*a*(Y), 110*a*(M) and 110*a*(C) for detecting the rotation variations in the slow scan direction is arranged such that, as shown in FIG. 10A, the pitches P thereof in the moving direction of the transfer belt 24 are set in accordance with a frequency defined by periodical rotation variations generated in the digital color copying machine. In this case, the frequency defined by the periodical rotation variations generated in the digital color copying machine consists of various frequency components of the period of one turn of each photoreceptor drum 6K, 6Y, 6M and 6C, the period of one turn of the drive roll 25 of the transfer belt 24, the vibration and eccentricity of the gears for driving them, and the walk of the transfer belt 24. Accordingly, a very high sampling frequency is required for detecting all those frequencies at one time. However, it is impossible to form patterns corresponding to the very high sampling frequency.

The present embodiment uses plural types of the AC component detecting patterns. Detecting frequencies are assigned to those types of the AC component detecting patterns, respectively. With this, the AC color misregistration can be detected at a high accuracy while holding back an increase of the sampling frequency. An alternative uses a single AC component detecting pattern corresponding to a relatively high sampling frequency, and detects a predetermined number of AC components by using the single pattern.

In detecting the AC component, as the frequency is lower, it is more difficult to increase the number of samplings. Therefore, it is important how to improve a sampling accuracy at low frequencies. It is assumed that the AC vibration frequencies of a digital color copying machine system are A, B and C (A>B>C). To detect the low vibration frequency C, the sampling frequency is set intentionally at the high vibration frequency A or B or a measure of them, and if no problem arises in the sampling of the vibration frequency C, and set at the frequency as a common measure of the vibration frequencies A and B, as shown in FIGS. 11A and 11B. In a specific example where A=30 Hz, B=20 Hz and C=3 Hz, the sampling frequency is set at 10 Hz. If some problem arises, the sampling frequency is set at the vibration frequency in the frequency to which the sampling is most sensitive or a measure of the most sensitive frequency. When A=30 Hz, B=5 Hz and C=3 Hz, for example, the sampling frequency is set at 10, 15 or 30 Hz. In this case, unless one of the vibration components B and C is smaller in amplitude than the other, it is difficult to separate the vibration components B and C one from the other. If the amplitude of the vibration component B is smaller than of the vibration component C, the vibration component B is negligible, however. Therefore, it is possible to detect only the vibration component C.

If the sampling frequency is thus set, the vibration components of the vibration frequencies A and B may be set in an insensible zone as shown in FIGS. 12A to 12D. Therefore, the detection and analysis of only the vibration component C can readily be carried out while at the same time improving the sampling accuracy.

In the present embodiment, the frequency for sampling the AC component detecting pattern is set corresponding to a rotation vibration of high frequency of those rotation vibrations generated in the digital color copying machine, on the basis of the theoretical consideration mentioned above.

In a case where the rotation frequency of the photoreceptor drum 6 is 0.5 Hz and the rotation frequency of the transfer belt 24 is 5 Hz, the frequency for sampling the AC component detecting pattern is set at 5 Hz, equal to the rotation frequency, high, of the drive roll 25 of the transfer belt 24. If a process speed of the digital color copying machine is 160 mm/sec, the linear patterns 110*a*(K), 110*a*(Y), 110*a*(M) and 110*a*(C) for detecting the rotation variation in the slow scan direction of those AC component detecting patterns 110 are arranged such that the pitch P between the linear patterns of the same color in the moving direction of the transfer belt 24 is set at 32 mm (=16 mm/sec/5 Hz), and the pitch p between the adjacent linear patterns of different colors is set at 8 mm. In an alternative, when the sampling frequency is 2.5 Hz, half of 5 Hz, the pitch P between the linear patterns of the same color is set at approximately 64 mm.

The AC component detecting patterns 110 are detected by the pattern detecting means 70 as shown in FIG. 6, for example. The color misregistration correcting board 76, which serves also phase/amplitude detecting means, receives detecting signals from the correcting board 76, and detects from these detecting signals the phases and amplitudes of the vibration components presenting AC rotation vibrations dependent on the photoreceptor drums 6K, 6Y, 6M and 6C of the image forming units 5K, 5Y, 5M and 5C, and the drive roll 25 of the transfer belt 24, and the like. The drives as drive control means receive information on the phases and amplitudes detected by the phase/amplitude detecting means minutely adjust the rotation speeds of the photoreceptor drums 6K, 6Y, 6M and 6C, the belt drive roll 25, and the like.

<Outline of Control Contents>

The thus constructed color image forming apparatus of the present embodiment considerably reduces the adverse affects by the eccentricity of the photoreceptor drums or the transfer belt, caused by the drums and belt per se or their mounting portions, the eccentricity by a clearance error of the rotary shaft, the nonuniform belt thickness, and the like, to thereby check the image quality deterioration caused by the AC color misregistration. How the apparatus minimizes the adverse affects by those sources of the color misregistration will be described.

When temperature within the digital color printer varies or an external force is applied to the printer, it frequently happens that the positions and the sizes of the image forming units 5K, 5Y, 5M and 5C per se and further the component parts of the image forming units minutely vary as already referred to. The in-machine temperature variation and the external force application are unavoidable. Ordinary actions on the machine, for example, removal of jamming, parts exchange in maintenance, and movement of the printer, are attendant with the external force application to the machine. When the in-machine temperature varies or the external force is applied to the machine, the images formed by the image forming units 5K, 5Y, 5M and 5C are mispositioned, causing DC color misregistration. Therefore, it is difficult to keep the quality image.

The AC color misregistration caused by the rotation vibrations varying at short periods or of relatively high frequencies caused by the period of one turn of the photoreceptor drum 6 and the drive roll 25 for the transfer belt 24, the walk of the transfer belt 24, and the like, and further the rotation vibrations of relatively high frequencies owing to the vibration and eccentricity of the gears for driving them are generated in the digital color printer.

In the digital color printer, to satisfy the requirement of a further image quality improvement, it is necessary to control the color misregistration more accurately for its reduction or to reduce its quantity to 70 $\mu$m or less, for example. To this end, in some cases, an active control is required which reduces the absolute values of the DC and AC color misregistration through improvements of the precision of the manufactured image forming units and the transfer belt, and the accuracy of the driving devices, and diminishes the adverse effect by the AC color misregistration to a negligible level by using the result of monitoring, when required, the rotation variations of the driving systems for the photoreceptor drums and the transfer belt.

In the digital color printer, when the power switch is turned on, after the jamming is removed, or at other timings, for example, before a normal image forming mode (print mode) starts or during the print mode, the following operations, if necessary, are performed: an operation of sampling the DC color misregistration detecting patterns and an operation of a correction mode based on the sampling result, and an operation of sampling the AC color misregistration detecting patterns and an operation based on the sampling result are performed. The sampling operation of the AC color misregistration detecting patterns and the operation based on the sampling result may be performed every time the sampling operation DC color misregistration detecting patterns and the operation based on the sampling result is performed. The digital color printer of the present embodiment is so designed that the combination of the sampling operation of the AC color misregistration detecting pattern and the operation based on the sampling result is performed for once during a color misregistration correcting cycle immediately after the power switch is turned on (or after the maintenance work ends).

Figure 8:
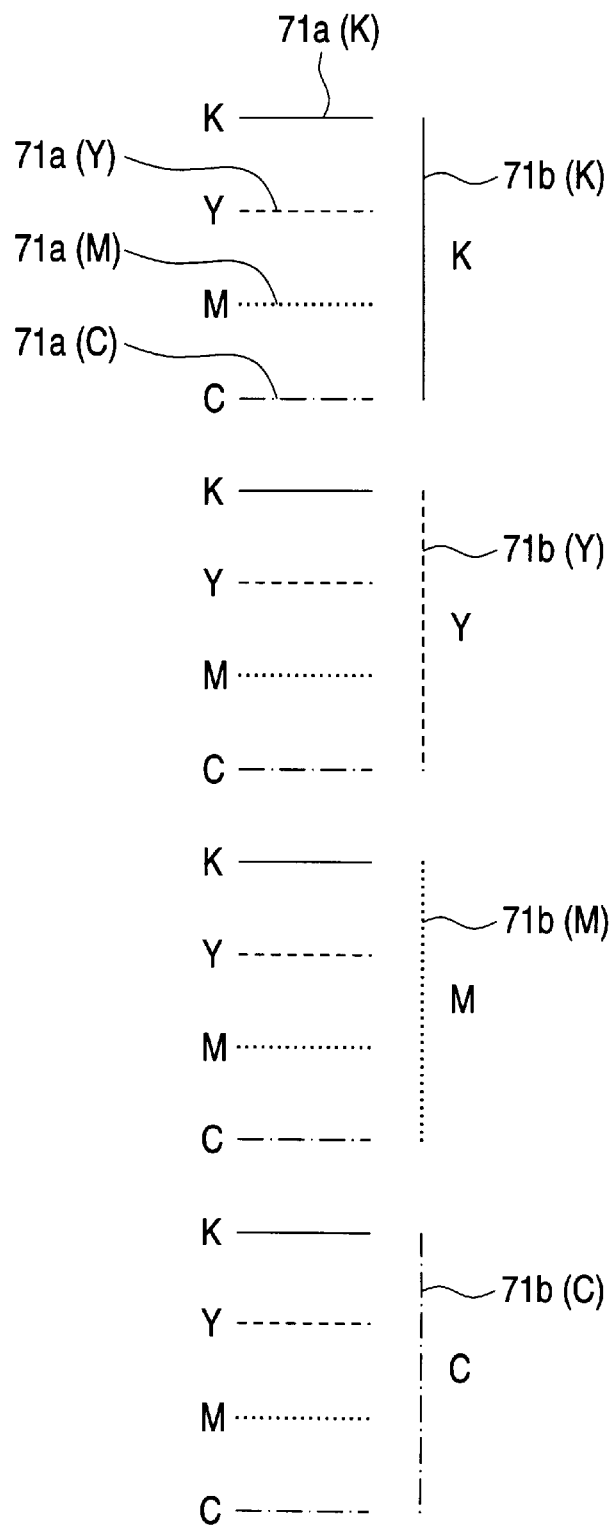
FIG. 8 is a plan view showing DC color misregistration measuring patterns.
Figure 13:
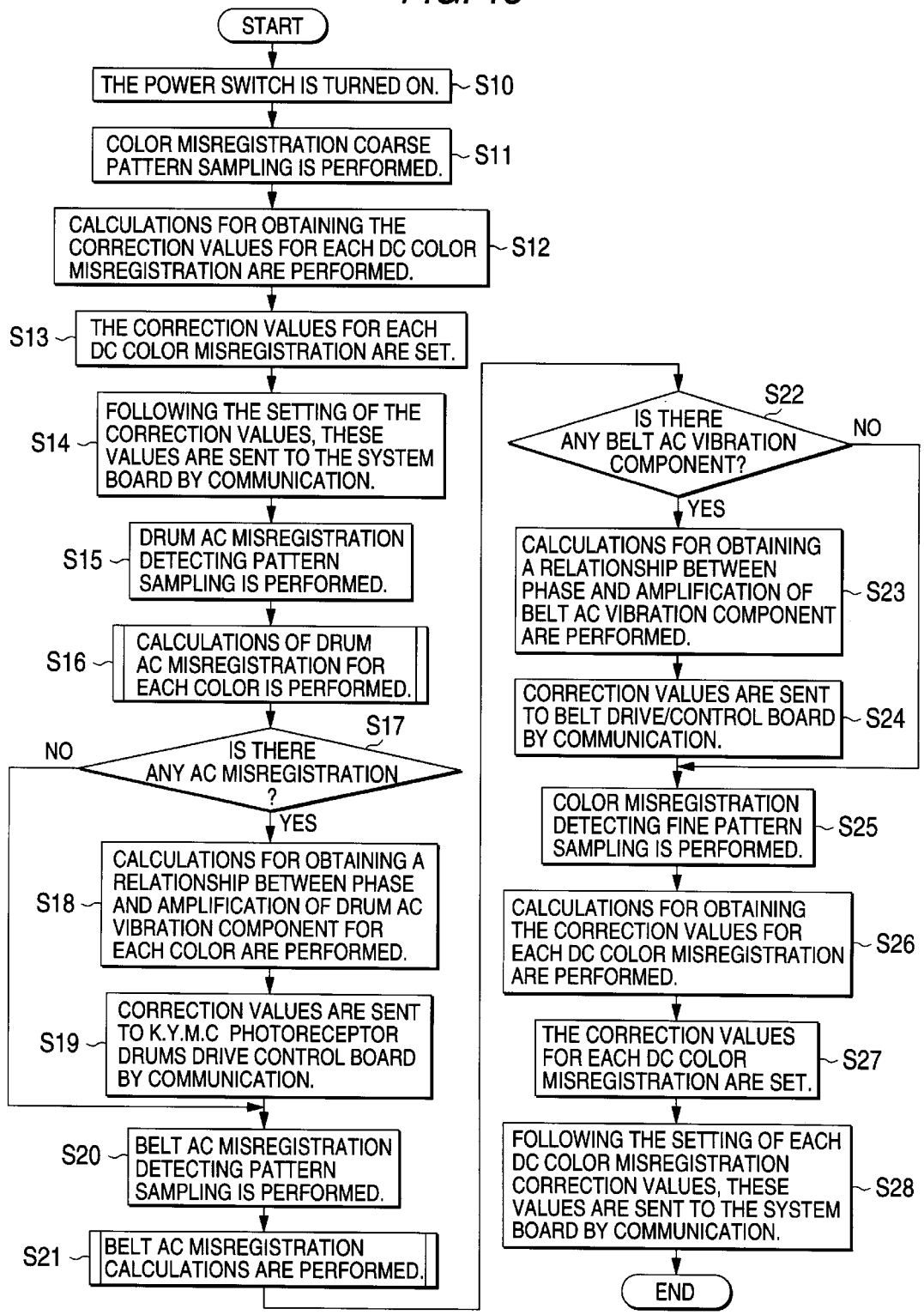
FIG. 13 is a flow chart showing a color misregistration correcting operation.

In the embodiment, as shown in FIG. 13, the power switch is turned on (step S10), and then a color misregistration coarse pattern sampling is performed (step S11). The color misregistration detecting coarse patterns are coarser than the color misregistration detecting patterns 71 shown in FIG. 8, and used for coarsely adjusting the DC color misregistration. In the sampling operation of the coarse patterns, the sampling data of the coarse patterns are fetched and calculated to obtain image positions. After the image positions of all the sampling data are obtained, calculations are performed for obtaining the correction values for the DC color misregistration (step S12), and the correction values are set (step S13). Following the setting of the correction values, these values are sent to the system board by communication (step S14).

As will be described later, to detect whether or not an AC color misregistration of the photoreceptor drums is present, the calculations on the AC color misregistration of the photoreceptor drums and a series of operations based on the calculation results are performed (steps S15 to S19), and the calculations on the AC color misregistration of the transfer belt and a series of operations based on the calculation results are performed (steps S20 to S24). Thereafter, the sampling of the color misregistration detecting fine patterns is performed (step S25). The color misregistration detecting fine patterns are the same as the color misregistration patterns 71 shown in FIG. 8, and used for making a fine adjustment of the DC color misregistration. In the sampling operation of the fine patterns, the sampling data of the fine patterns are fetched and calculated to obtain image positions. After the image positions of all the sampling data are obtained, calculations are performed for obtaining the correction values for the DC color misregistration (step S26), and the correction values are set (step S27). Following the setting of the correction values, these values are sent to the system board by communication (step S28), and the correcting cycle ends.

If the AC component detecting/correcting cycle is executed before the coarse adjustment in the DC color misregistration correcting cycle that is performed immediately after the power switch is turned on, a variation of the DC color misregistration is present. To cope with this, if the sampling period of the AC color misregistration detecting patterns is reduced, then there is a possibility that the patterns of other colors located before and after the AC component detecting pattern under sampling overlap with each other. To ensure that the pattern appears within the sampling region, the sampling region must be large, and therefore the sampling operation is inefficient. For this reason, the decrease of the pattern pitch should be avoided. At least after the coarse adjustment in the DC color misregistration correcting cycle, a variation of the DC color misregistration is lessened. Therefore, the pattern interval may be reduced. In the fine adjustment of the AC color misregistration correction, in the sampling that is performed in a state that a small quantity of the AC component is left, the detection of the AC component is more precise than in the sampling that is performed in a state that a large quantity of the AC component is left. In this respect, it is better to complete the correction of the AC component before its fine adjustment. Thus, it is preferable that the AC color registration correcting cycle is inserted between the coarse adjustment of the DC color misregistration correction cycle and the fine adjustment thereof. By so doing, the adverse effect by the AC component is lessened in the fine adjustment of the DC color misregistration correction, to thereby provide a finer DC color misregistration correction.

The description to follow is for elaboration of the sampling operations of the AC color misregistration detecting patterns and the control operations based on the sampling results.

<Sampling Operations>

In the sampling operations of the AC color misregistration detecting patterns on the photoreceptor drums for the respective colors and a control mode based the results of the sampling, as shown in FIG. 6, the control board 78 issues commands to the respective portions, and the interface boards 75K, 75Y, 75M and 75C drive color misregistration detecting pattern output means respectively contained therein which successively output the image data of the AC component detecting patterns 110 for the photoreceptor drums to the corresponding image forming units 5K, 5Y, 5M and 5C. The timings at which the interface boards 75K, 75Y, 75M and 75C start to output the image data are exactly the same as in a normal image forming mode (print mode). Upon reception of the image data, the image forming units 5K, 5Y, 5M and 5C form given AC component detecting patterns 110, and transfer the patterns, in an superimposing fashion, on the transfer belt 24 at the same timings as in a normal image forming mode (print mode). The result is formation of the AC component detecting patterns 110 on the transfer belt 24.

Figure 14:
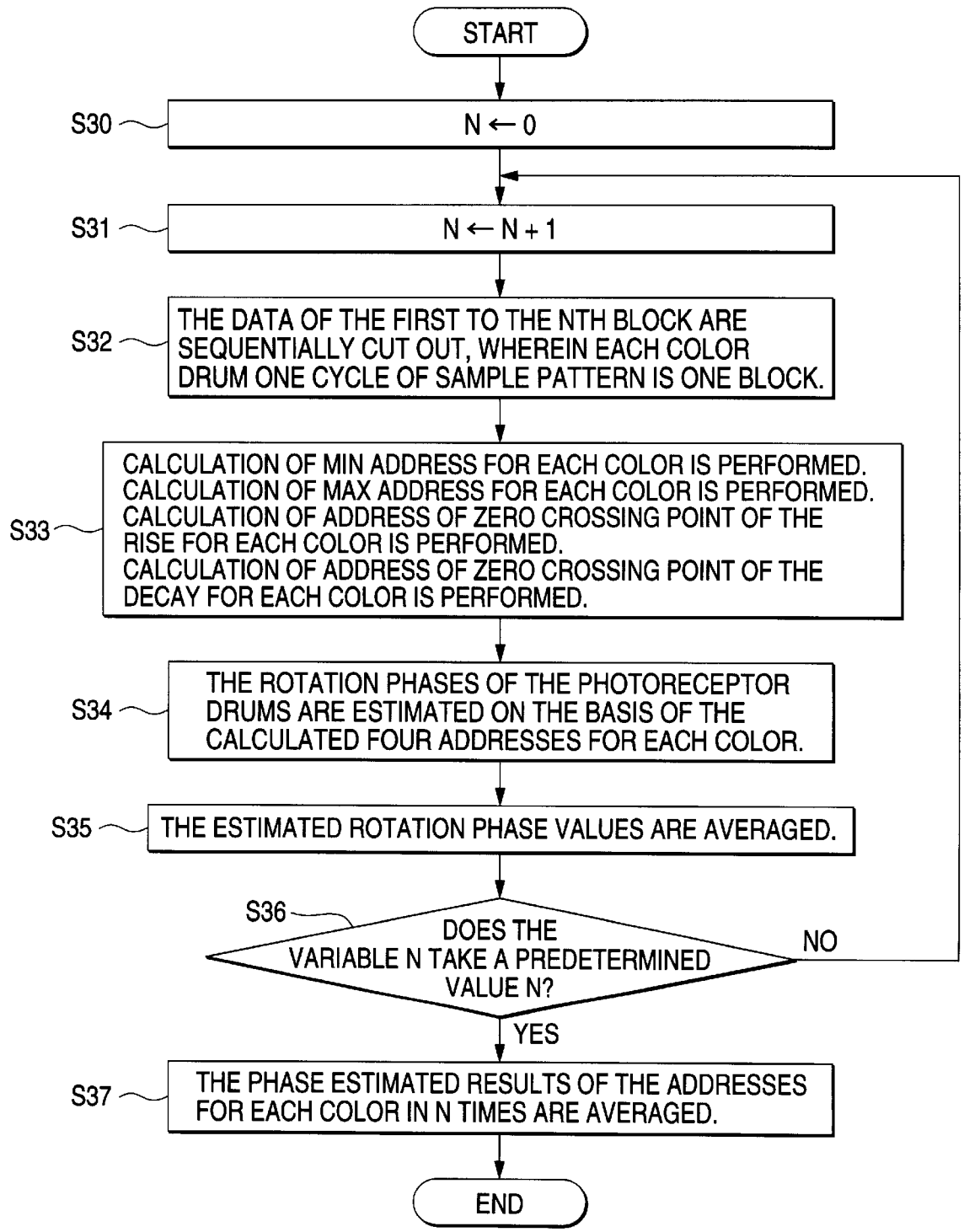
FIG. 14 is a flow chart showing a color misregistration correcting operation.
Figure 15A:
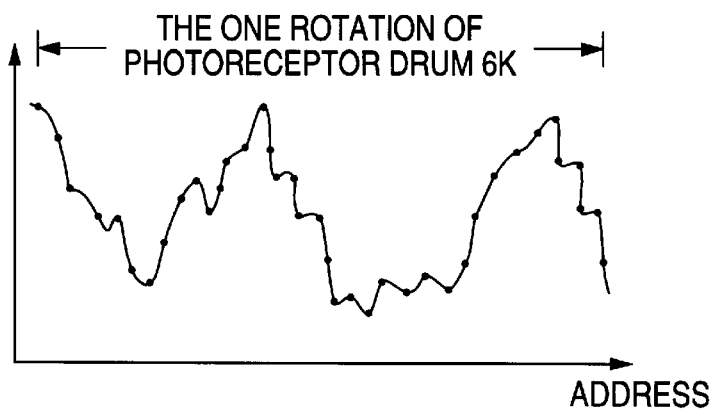
FIGS. 15A to 15D show graphs showing rotation variations of the respective color photoreceptor drums.
Figure 15B:
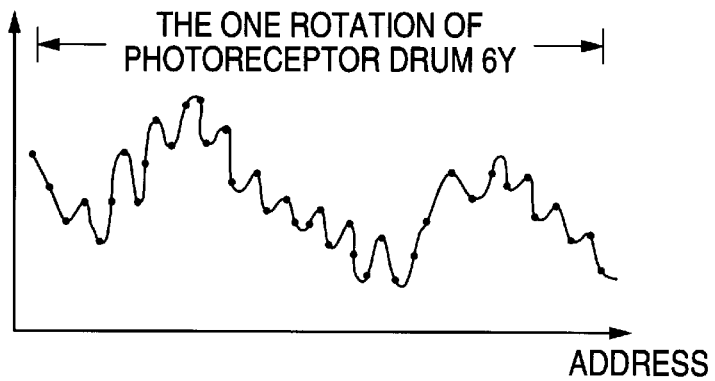
Figure 15C:
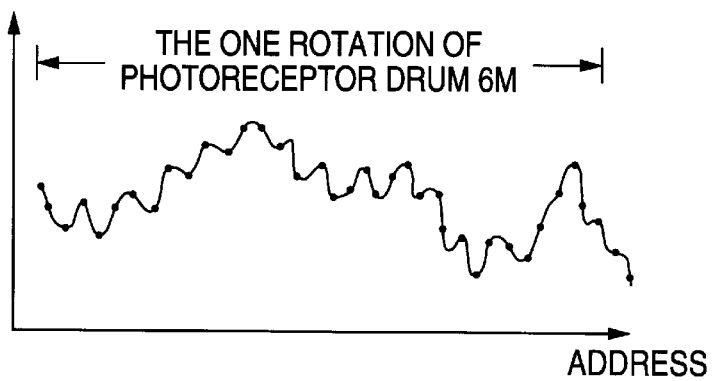
Figure 15D:
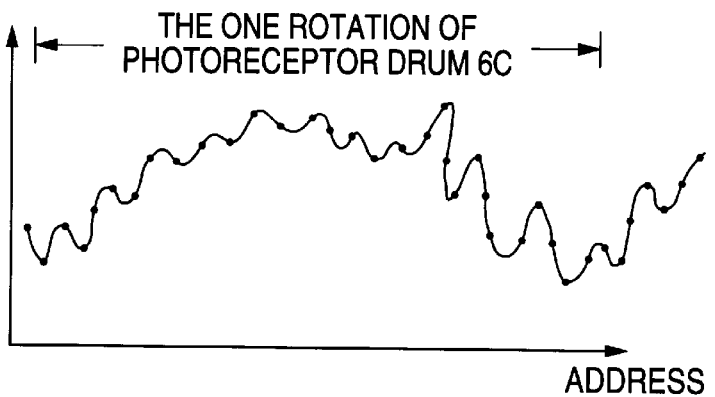
Figure 16:
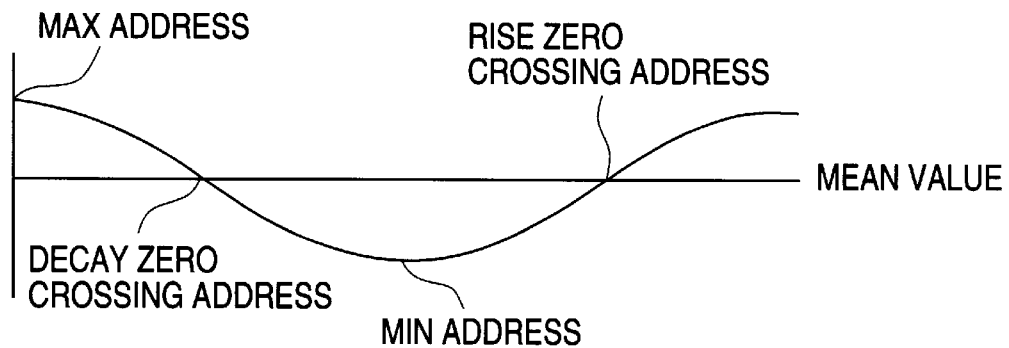
FIG. 16 is an explanatory diagram showing how a rotation phase of the photoreceptor drum is detected.

In a subroutine of the step S16, shown in FIG. 13, for calculating the AC component detecting patterns 110 exclusively used for the AC component detection, as shown in FIG. 14, a variable N is first set to 0, and 1 is added to N (steps S30 and S31). The data of the first to the Nth block are sequentially cut out (data of the first block is first cut out) (step S32), as shown in FIGS. 15A to 15D. Here, one block is equal to the sampling patterns corresponding to one turn of each color photoreceptor drum. Then, as shown in FIG. 16, calculations are performed of the address of a minimum value (Min) of a rotation variation of each photoreceptor drum 6K, 6Y, 6M and 6C, the address of a maximum value (Max) thereof, the address of a zero crossing of the rise of each rotation variation of each color photoreceptor drum, and the address of a zero crossing of the decay thereof (step S33). The rotation phases of the photoreceptor drums are estimated on the basis of the thus calculated four addresses for each color (step S34). The estimated rotation phase values are averaged (step S35). Thereafter, the variable N takes a predetermined value N, and judgement is made as to whether or not the operations of acquiring the data of N blocks and estimating the rotation phases are completed (step S36). The above sequence of operations is repeated till the data cutting-out and estimating operations are completed (steps S36 to S35). Finally, the phase estimated results of the addresses for each color are averaged (step S37), and here, the calculation subroutine for the AC color misregistration of the photoreceptor drums ends.

For the rotation phases of the AC components of the photoreceptor drums 6K, 6Y, 6M and 6C, the values of N are set (e.g., 3 to 7) so as to detect for each color the AC component detecting patterns 110 corresponding to one turn of the transfer belt 24. By so doing, a rotation variation over at least one turn of the transfer belt 24 is also taken into consideration.

Figure 17:
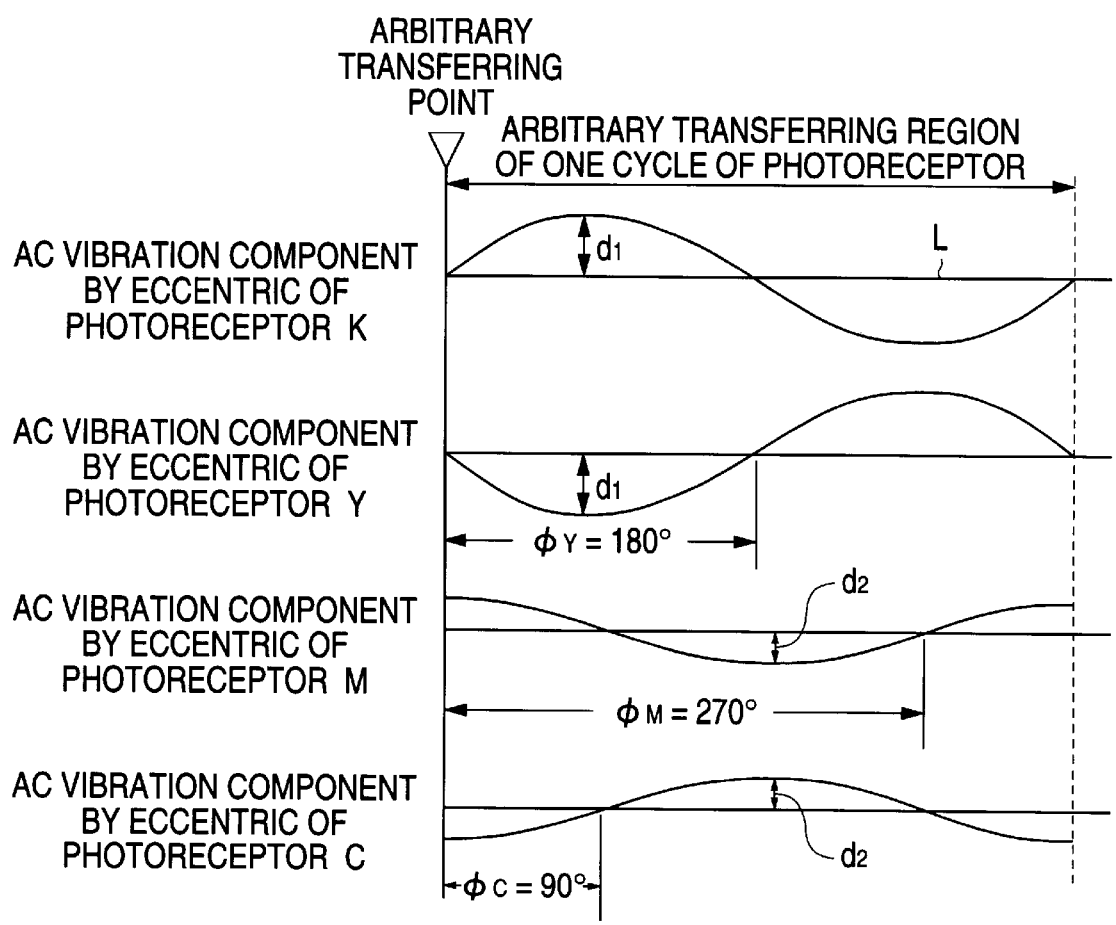
FIG. 17 is explanatory diagram showing variations the AC vibration components of the respective colors before the correction.

Following the completion of the AC component phase shift calculations made for each respective color photoreceptor drum, a step S13 shown in FIG. 13 judges whether or not the AC color misregistration (containing phase shifts and amplitude differences) of the photoreceptor drums 6K, 6Y, 6M and 6C are present. If the answer is NO, the sampling operations of the AC color misregistration detecting patterns on the transfer belt and a control mode based on the result of the sampling operations, which will be described later, are then performed (steps S20 to S24). If the photoreceptor drums have AC color misregistration with respect to a transfer point on the transfer belt 24, as shown in FIG. 17, the CPU 98 performs the calculations on the phases and amplitudes of the AC vibration components of the photoreceptor drums (step S18), and sends the correction values to the drive control boards 66 (FIG. 4) of the photoreceptor drums 6K, 6Y, 6M and 6C of the colors K, Y, M and C by communication (step S19). Thereafter, the sampling operations of the AC color misregistration detecting patterns on the transfer belt and a control mode based on the result of the sampling operations are then performed (step S20).

The phase calculation obtains phase shifts $\phi$ of the vibration components of the photoreceptor drums 6K, 6Y, 6M and 6C with respect to the black photoreceptor drum 6K. The amplitude calculations of the AC vibration components are performed on the basis of the already calculated maximum and minimum values of the rotation variation of each photoreceptor drum 6K, 6Y, 6M and 6C. If the periodical rotation variation of the transfer belt is not taken into consideration, the amplitude calculation may simply be performed using only a difference between the maximum and minimum values. The periodical rotation variation of the transfer belt is essentially taken into consideration in constructing the present embodiment. Hence, for the amplitude calculations, the embodiment uses the differences each between the maximum value and the minimum value when an average value of the maximum values and the minimum values of the rotation variations of the N number of turns of the photoreceptor drums is 0.

In the sampling operations of the AC color misregistration detecting patterns on the transfer belt and a control mode based the results of the sampling, as shown in FIG. 6, the control board 78 issues commands to the respective portions, and the interface boards 75K, 75Y, 75M and 75C drive color misregistration detecting pattern output means respectively contained therein which successively output the image data of the AC component detecting patterns 110 for the transfer belt to the corresponding image forming units 5K, 5Y, 5M and 5C. The image forming units 5K, 5Y, 5M and 5C form the AC component detecting patterns 110 in accordance with the image data, and transfer the AC component detecting patterns, in a superimposing fashion, onto the transfer belt 24 at the same timings as in a normal image forming mode (print mode). The result is formation of the AC component detecting patterns 110 on the transfer belt 24. The AC component detecting patterns 110 for the transfer belt are the same as those for the photoreceptor drums except that the intervals of the former patterns when viewed in the moving direction of the transfer belt are set corresponding to a frequency of a rotation variation periodically generated in the transfer belt.

In a subroutine of the step S21, shown in FIG. 13, for calculating the AC component detecting patterns 110 of the transfer belt, as in the calculation subroutine for the AC component phase of the transfer belt (step S16), an algorithm (Steps S30 to S37) as shown in FIG. 14 is executed and finally the N times phase estimations on the transfer belt are averaged.

Following the completion of the AC component phase calculations of the transfer belt, a step S22 shown in FIG. 13 judges whether or not the AC vibration component of the transfer belt is present. If it is absent, the fine adjustment of the DC color misregistration detection is made (step S25), as already referred to. If the transfer belt has the AC vibration component, as shown in FIG. 13, the CPU 98 performs the calculations on the phases and the amplitudes on the transfer belt (step S23) with reference to a tolerable value of the belt AC vibration component determined by the product specification, and sends the correction values to the drive control means (belt drive in FIG. 1) by communication, and then the fine adjustment for the DC color misregistration is performed (step S25).

The sampling of the AC component detecting patterns exclusively used for the AC components and the correction of the AC components will be described more specifically.

Figure 18:
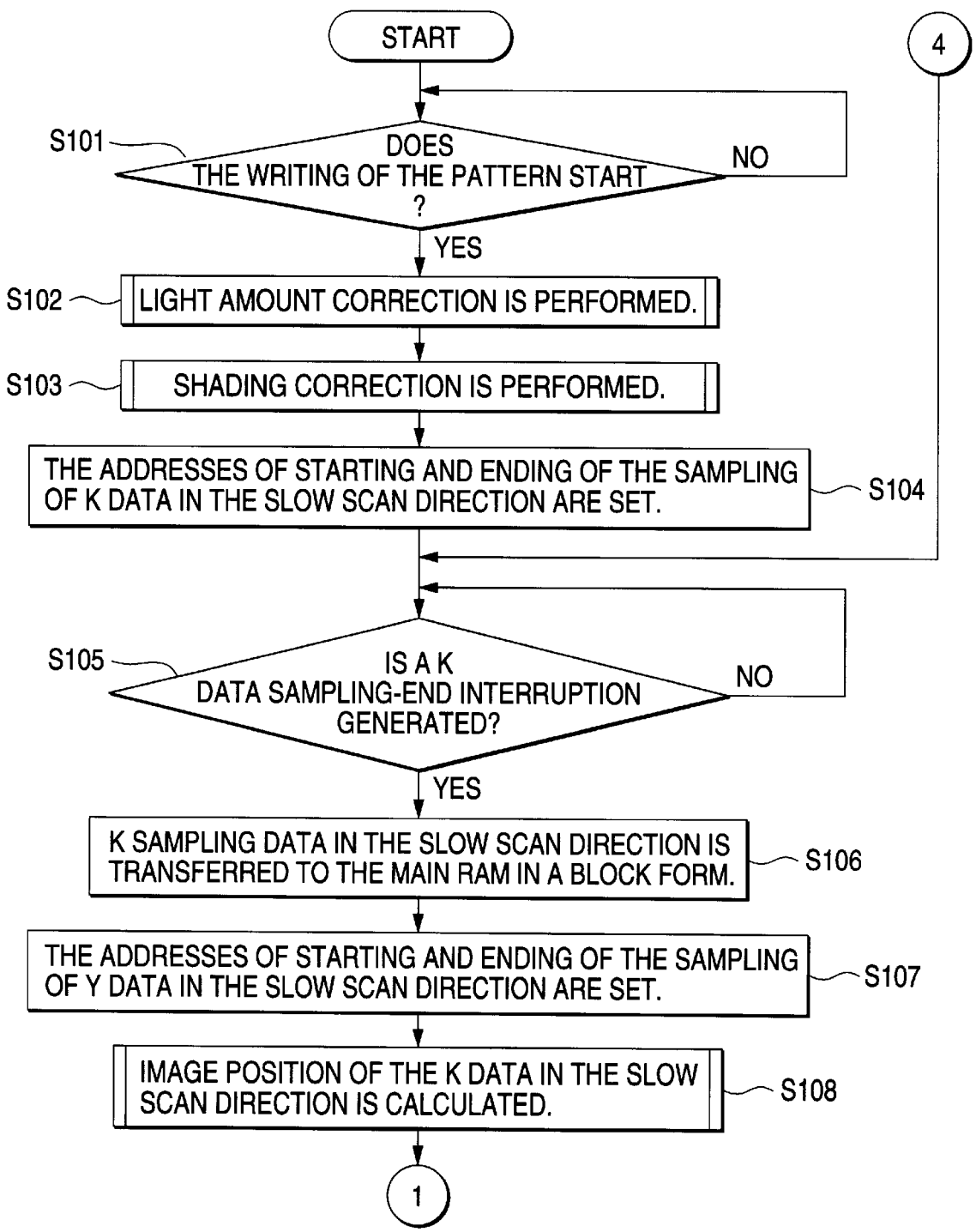
FIG. 18 is a flow chart showing an operation of a sampling unit for sampling color misregistration detecting patterns.

In the sampling of the AC component detecting patterns 110 provided only for the detection of the AC components, as shown in FIG. 18, the CPU waits till the writing of the patterns starts (step S101), performs a light amount correction and a shading correction (steps S102 to S103), and sets the addresses of starting and ending the sampling of K data in the slow scan direction (step S104).

The CPU waits till a K-data sampling-end interruption is generated (step S105), and transfers the sampling data (K data) in the slow scan direction to the main RAM 100 in a block form (step S106).

Subsequently, the start address and the end address of the sampling of Y data in the slow scan direction are set (step S107), and then an image position of the K data in the slow scan direction is calculated (step S108).

Figure 19:
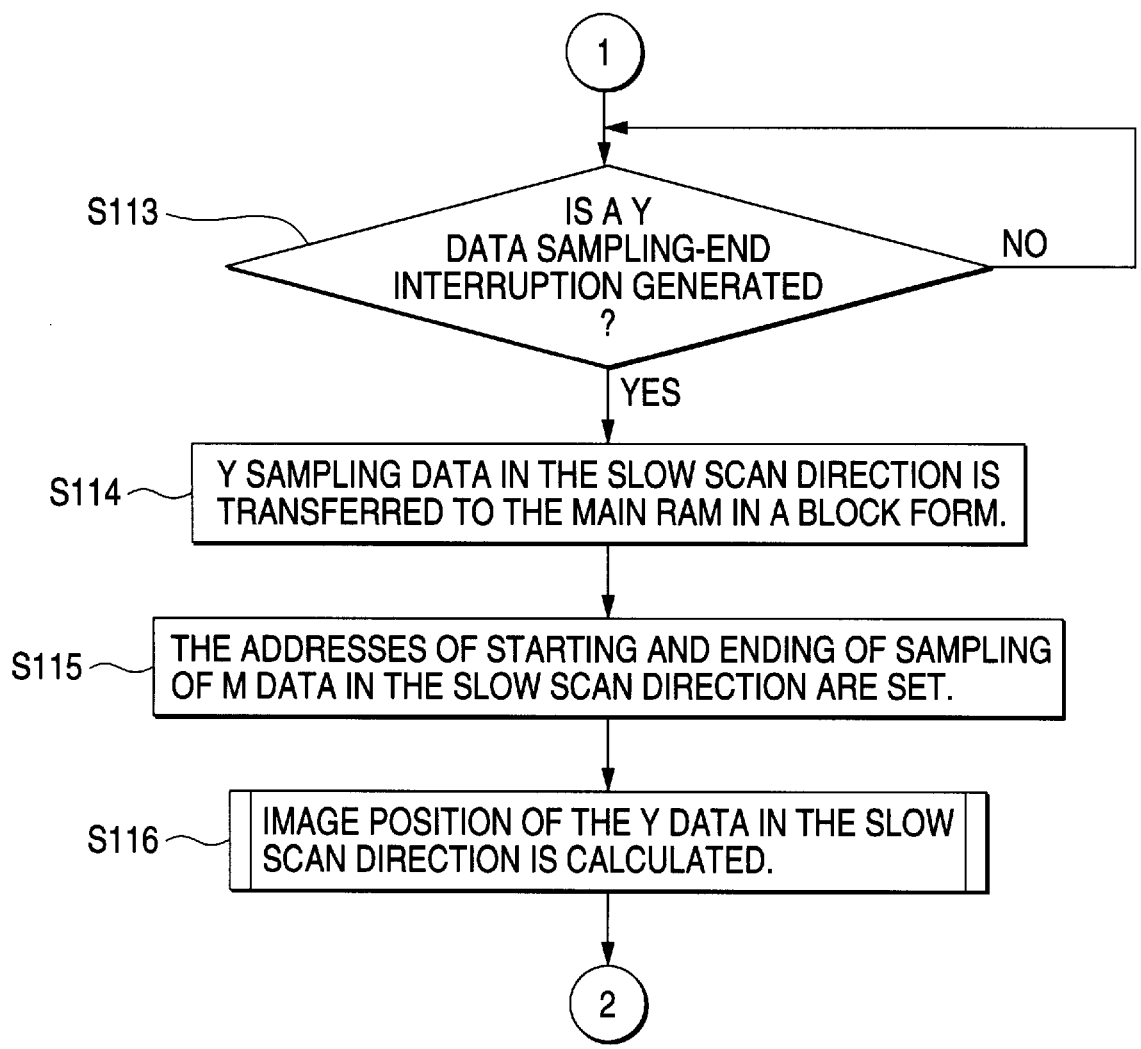
FIG. 19 is a flow chart showing the operation of a sampling unit for sampling color misregistration detecting patterns.

As shown in FIG. 19, the CPU waits till a Y-data sampling-end interruption is generated (step S113), and transfers the sampling data (Y data) in the slow scan direction to the main RAM 50 in a block form (step S114). Subsequently, the start address and the end address of the sampling of M data in the slow scan direction are set (step S115), and then an image position of the M data in the slow scan direction is calculated (step S116).

Figure 20:
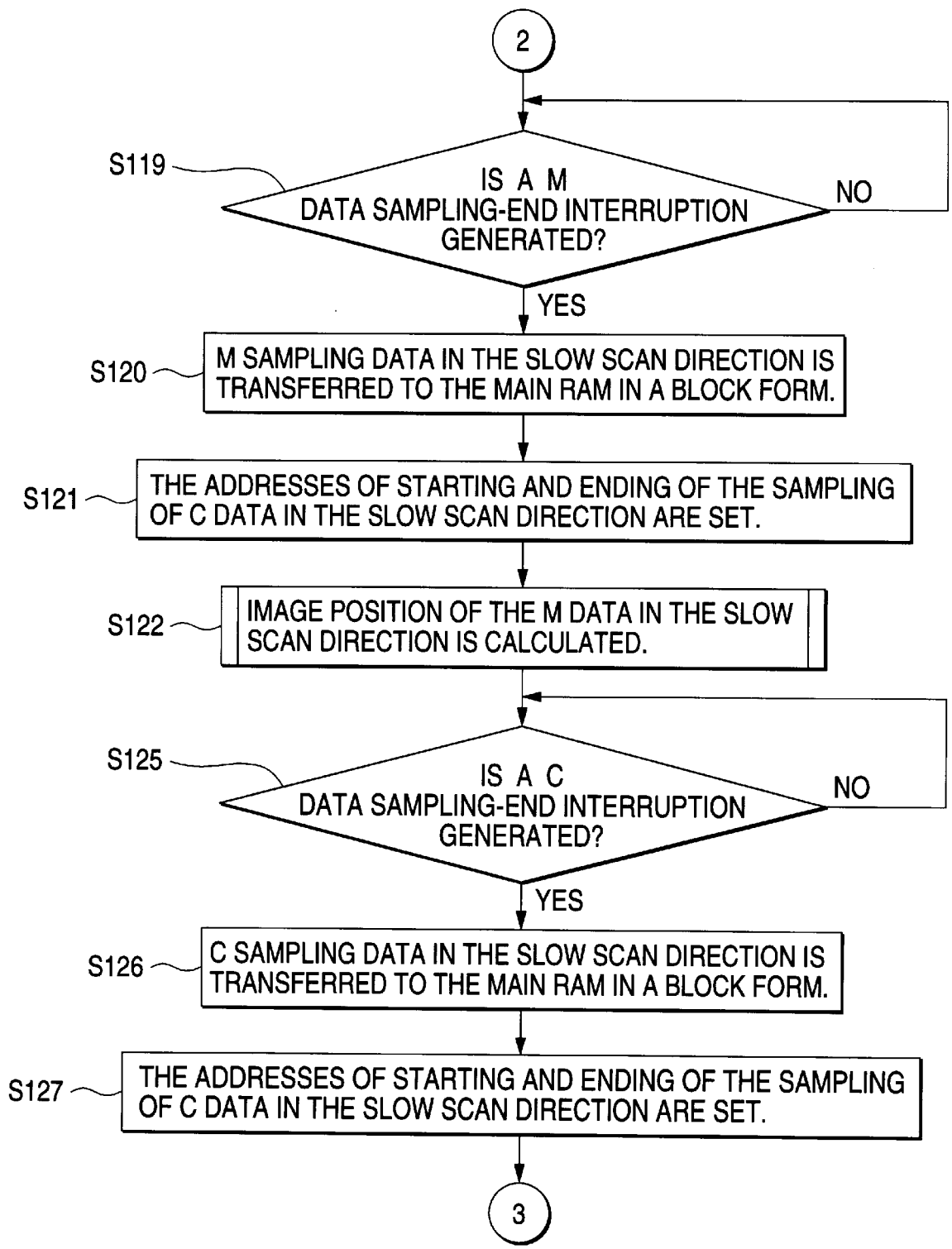
FIG. 20 is a f low chart showing the operation of a sampling unit for sampling color misregistration detecting patterns.
Figure 21:
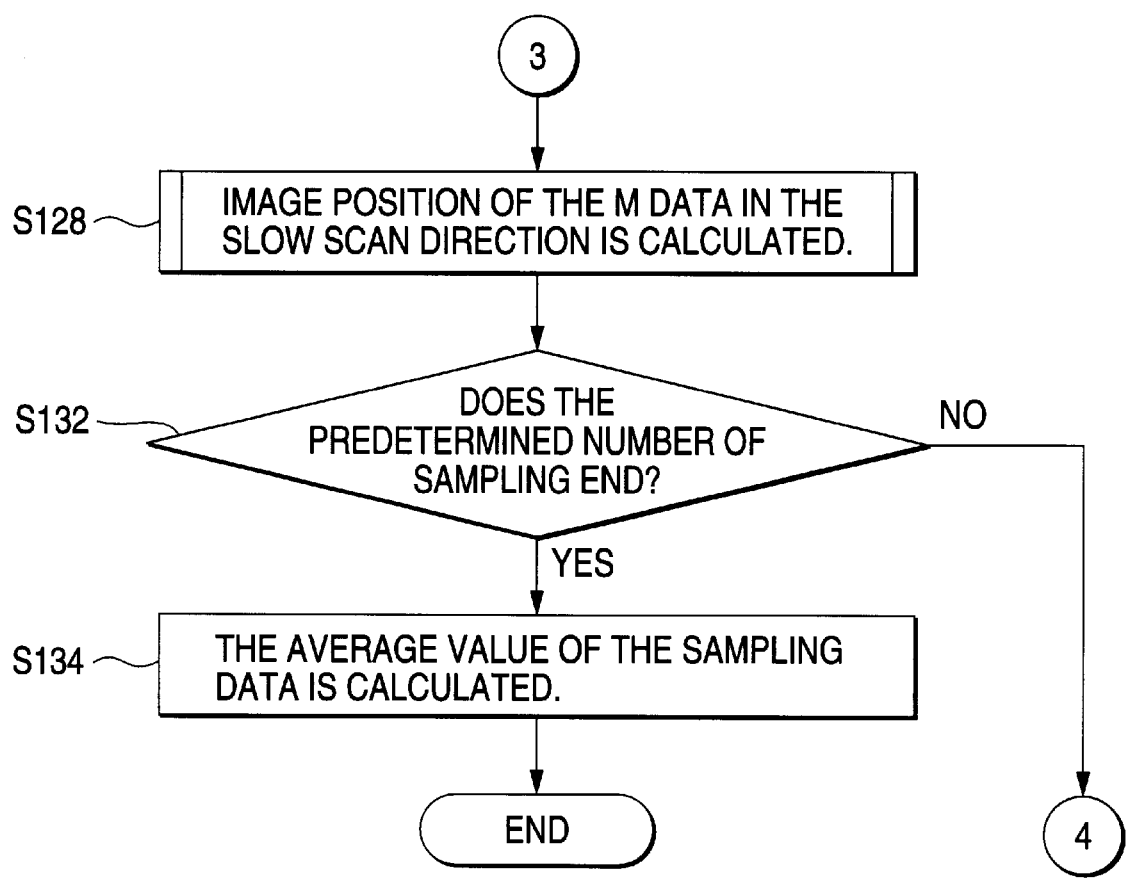
FIG. 21 is a f low chart showing the operation of a sampling unit for sampling color misregistration detecting patterns.

Thereafter, as shown in FIG. 20, the CPU waits till an M-data sampling-end interruption is generated (step S119), and then executes the processing of the data up to C data (steps S120 to S128) as shown in FIGS. 20 to 21. And the CPU returns to the step S105 and repeats a similar operation till a predetermined number of samplings ends. When the predetermined number of samplings ends (step S132), the CPU averages the sampling data (step S134).

Figure 22:
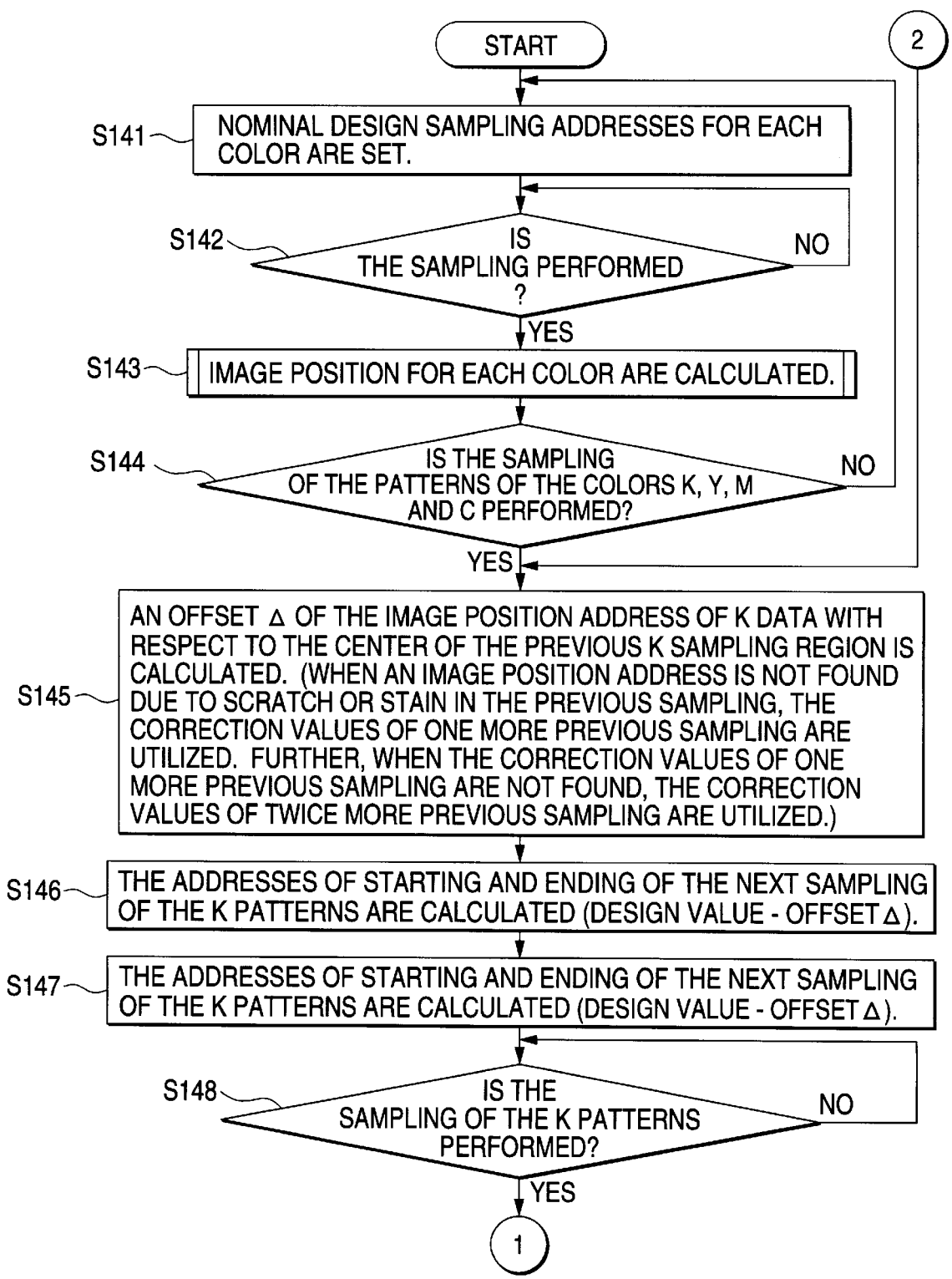
FIG. 22 is a flow chart showing the operation of a sampling unit for sampling color misregistration detecting patterns.

In a slow scan sampling start point correction mode, as shown in FIG. 22, the CPU first sets a nominal design sampling address of each color (step S141), waits till the sampling ends (step S142), and calculates an image position of each color (step S143). A similar processing is repeated till the sampling of those patterns of the colors K, Y and C (step S144).

An offset Δ of the image position of K data with respect to the center of the previous sampling region is calculated (step S145). When in the previous sampling, the image position address cannot be specified because of image stains, for example, the correction value obtained in the sampling preceding to the previous sampling is used. If the image position address cannot be specified in the latter sampling, the correction value obtained in a sampling processing to the latter sampling is used, and so on.

The start and end addresses of the next sampling of the K patterns vertical to the belt advancing direction are calculated using (design value−offset Δ) and set (steps S146 to S147). Then, the CPU waits till the sampling of the K patterns (step S148). If the step S145 is not essential to the system, it may be omitted. In this case, the interval between the sampling start addresses of the adjacent K data is fixed.

Figure 23:
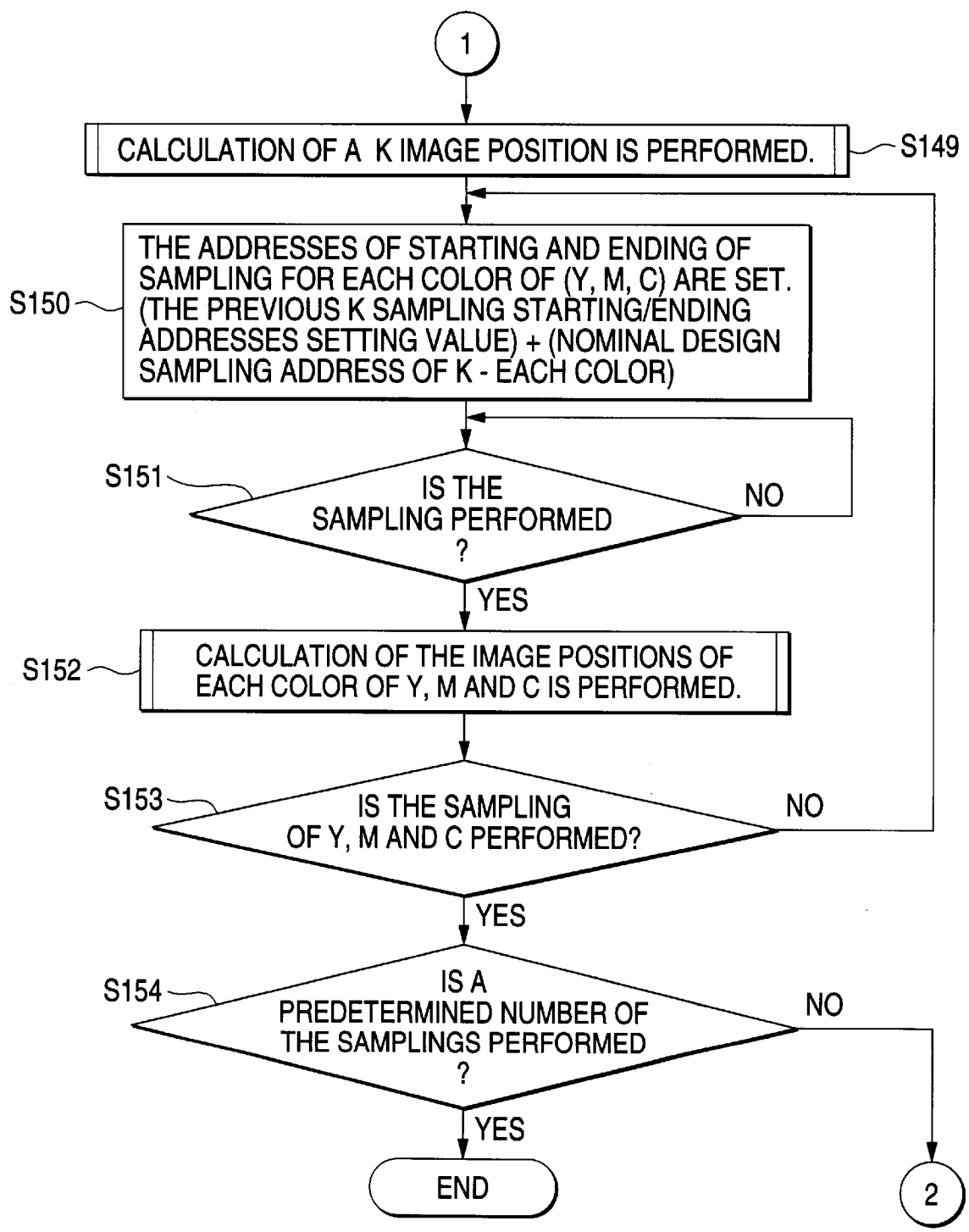
FIG. 23 is a flow chart showing the operation of a sampling unit for sampling color misregistration detecting patterns.

Thereafter, a K image position is calculated as shown in FIG. 23 (step S149). The CPU sets the start and end addresses of sampling Y, M and C patterns are set (step S150). Differences (K−Y), (Y−M) and (M−C) are set at fixed values. Offsets produced by the sampling method that is used in detecting AC components can be corrected by merely correcting, in the same manner, the K data sampling region correcting values obtained in the steps S145 to 147. Therefore, the number of necessary calculating steps is reduced. Then, the image positions of the Y, M and C color images are calculated (step S152).

The sequence of the process steps subsequent to the step S150 is repeated till the samplings of the data Y, M and C are completed. Further, the sequence of the process steps subsequent to the step S145 is repeated till a predetermined number of samplings are completed (step S154).

Figure 24:
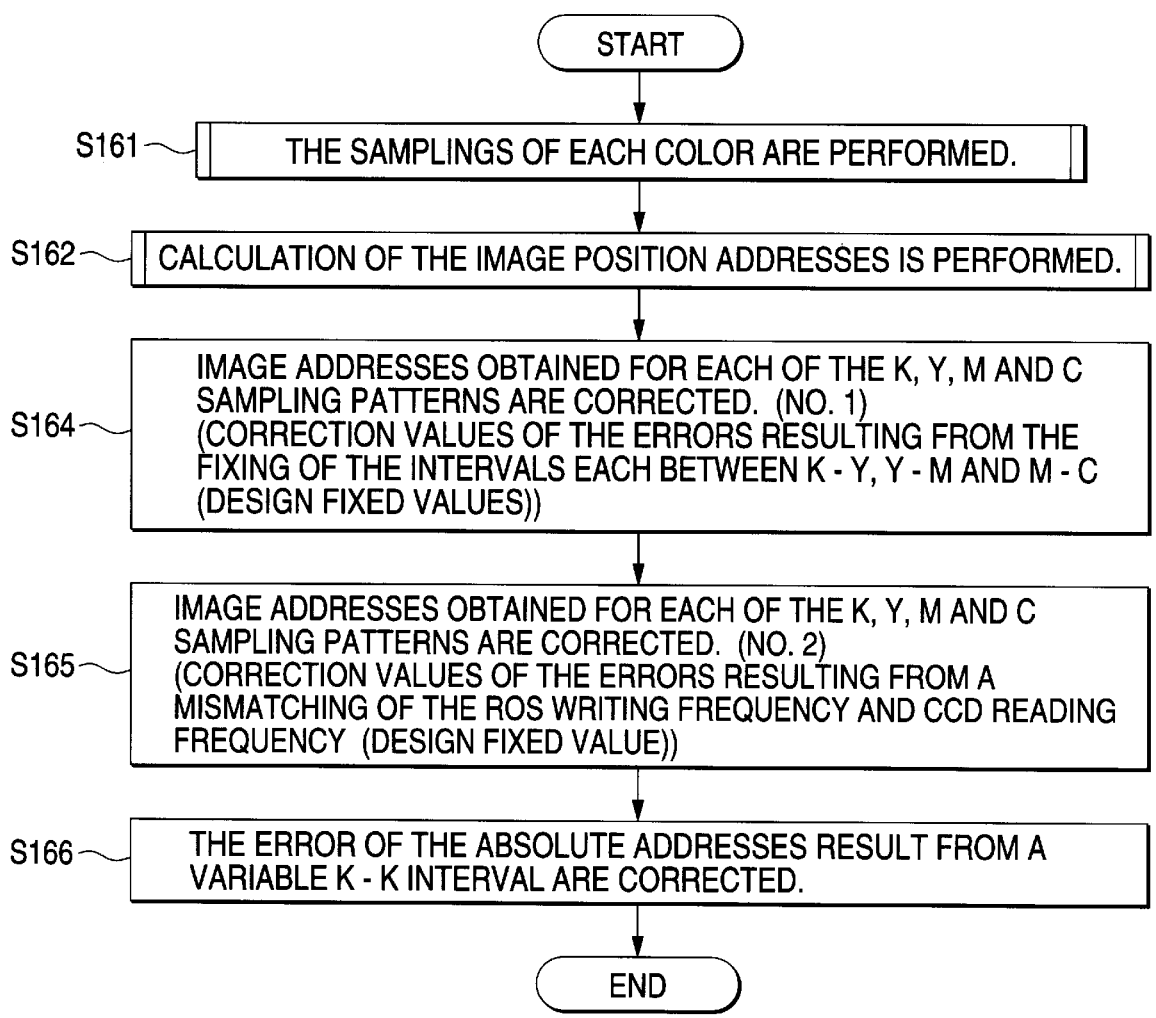
FIG. 24 is a flow chart showing the operation of a sampling unit for sampling color misregistration detecting patterns.

In the operation of correcting the address errors of the colors referring to the color K after the sampling operation, as shown in FIG. 24, the samplings of the respective colors are performed (step S161), and the image position addresses (step S162) are successively calculated. Then, the following calculation is performed (step S164).

Image addresses obtained for each of the K, Y, M and C sampling patterns−(correction values (design fixed values) of the errors resulting from the fixing of the intervals each between K−Y, Y−M, and M−C). Further, the calculation for correcting the errors resulting from the correction of the start point of the K−K interval is performed in the following way (image addresses obtained for each of the K, Y, M and C sampling patterns−(K−K interval correction value).

Additionally, the following calculation is performed (step S165).

Image addresses obtained for each of the K, Y, M and C sampling patterns−(correcting values of the errors resulting from a mismatching of the ROS writing frequency and CCD reading frequency (design fixed value).

Through the above calculations, the absolute addresses of the respective color patterns are obtained. By analyzing them, the AC components are detected (step S166).

Figure 25:
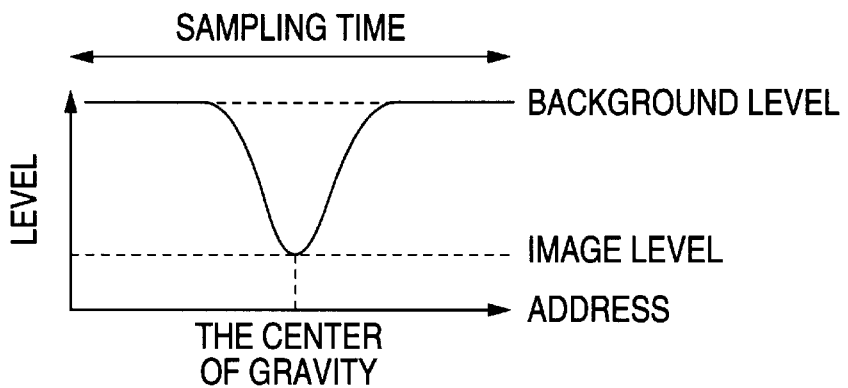
FIG. 25 is a waveform showing an output signal of a sensor of the pattern detecting means.

An ideal image profile obtained when the AC component detecting patterns 110 are read is as shown in FIG. 25. The center of the pattern image is obtained using a barycentric method. This process is repeated to obtain its average, whereby a correct image position address is obtained.

Figure 26:
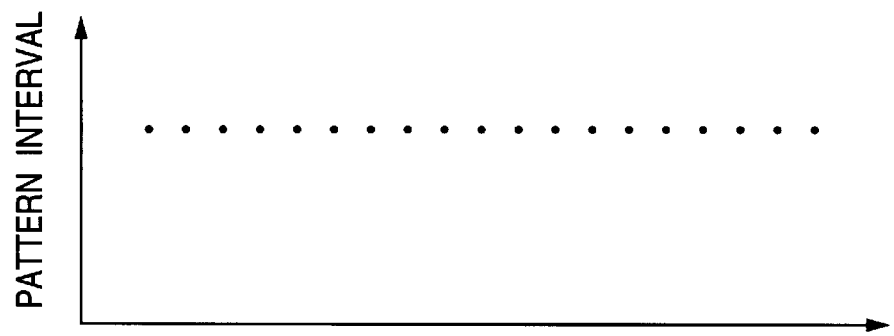
FIG. 26 is a graph showing detection intervals of the color misregistration detecting patterns when no vibration component is present.
Figure 27:
FIG. 27 is a graph showing detection intervals of the color misregistration detecting patterns when a vibration component is present.

The samplings of the AC component detecting patterns in the fast scan direction are performed in similar ways.

Where no AC color misregistration is generated in the digital color copying machine, the sampling data of the AC component detecting patterns 110 are uniformly pitched as shown in FIG. 26. Rotation variations having various frequency components are generated in an actual digital color copying machine, however. Examples of those rotation variations are variations of the periods of one turn of each photoreceptor drum 6 and one turn of the drive roll 25 of the transfer belt 24, and the vibration and eccentricity of the gears for driving the drums and the belt, and a walk of the transfer belt 24. Therefore, the pitches of the AC component detecting patterns are not uniform, as shown in FIG. 27, and a periodically varying AC color misregistration is generated.

In this embodiment, as described above, the data of the first block counted from its beginning is cut out, as shown in FIG. 15, on basis of the sampling data spaced at the pitches of the AC component detecting patterns 110, stored in the main RAM 100. Here, one block is equal to the sampling patterns corresponding to one turn of each color drum.

Figure 28:
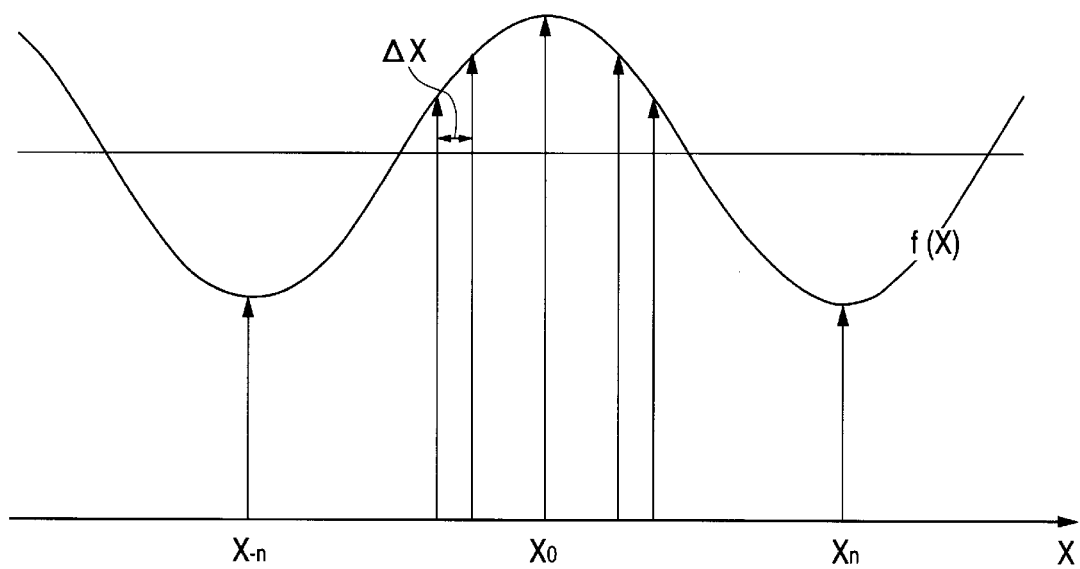
FIG. 28 is a graph showing how to obtain an average value of the color misregistration detecting patterns.

Subsequently, the calculations of the address of the minimum value (Min) of the thus cut out rotation variation of each color photoreceptor drum, the address of the maximum value (Max) thereof, the addresses of the zero crossings of the rise and the decay of the rotation variation of each color photoreceptor drum are performed (step S18 in FIG. 13). In those calculations, discrete data of the AC component detecting patterns 110 as shown in FIG. 15 are sampled in accordance with the sampling frequency, and, as shown in FIG. 28, an average value is calculated by the following equation Average value=$\Sigma(f(X)/n)$, where $\Sigma$ ranges from X=X-n to X=Xn.

As shown in FIG. 16, the addresses of the zero crossings of the rise and decay of the rotation variation are obtained where with the average value is 0, using the sampling data spaced at the pitches of the AC component detecting patterns 110. The address of the minimum value (Min) of the rotation variation of each photoreceptor drum 6K, 6Y, 6M and 6C, and the address of the maximum value (Max) thereof are calculated using the sampling data spaced at the pitches of the AC component detecting patterns 110.

The phases and the amplitudes of the rotation variations of the photoreceptor drums 6K, 6Y, 6M and 6C are estimated on the result of the calculations of the address of the minimum value (Min) of the thus cut out rotation variation of each color photoreceptor drum, the address of the maximum value (Max) thereof, the addresses of the zero crossings of the rise and the decay of the rotation variation of each photoreceptor drum 6K, 6Y, 6M and 6C. In this case, the detection accuracies of the phases and the amplitudes can be improved by averaging the address values of those four factors. The detection accuracies of them may be further improved by averaging the thus obtained phases of N number of blocks.

An N number of estimated values of each of the phases and amplitudes of N blocks, i.e., N turns of the photoreceptor drums 6K, 6Y, 6M and 6C, are calculated, and the N number of the estimated values are further averaged, and the averaged ones are used as the estimated values of the phase and the amplitude of the rotation variation of each photoreceptor drum.

Figure 29:
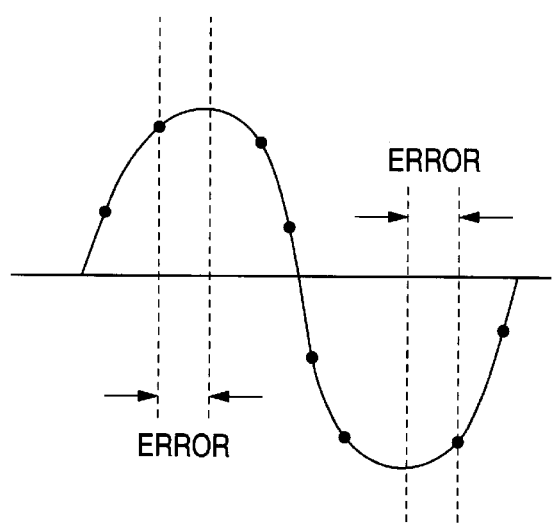
FIG. 29 is a graph showing how to obtain the maximum value and the minimum value of the color misregistration detecting patterns.

The phase and the amplitude may be estimated by any one of the four address values for one turn of each photoreceptor drum 6K, 6Y, 6M and 6C. In the embodiment, the phase and amplitude of the rotation variation for one turn of each photoreceptor drum is estimated on the basis of the averaged value of the four address values for one turn of each photoreceptor drum. The reason for this follows. Since the rotation variation of each photoreceptor drum is discretely sampled using the AC component detecting patterns, the detected addresses of the maximum and minimum values of each photoreceptor drum are not coincident with the actual addresses of those values, as shown in FIG. 29. By averaging the four calculated addresses for each turn of each photoreceptor drum, the adverse effects by those plus and minus errors, randomly dispersed, of the addresses of the maximum and minimum values, which are obtained by discretely sampling the AC component detecting patterns, are lessened, and the detection accuracies of the phase and amplitude of the rotation variation of each drum are improved.

The zero crossing address values in the rise and decay of the rotation variation are obtained by inserting or outserting a zero crossing point, and the detecting precision is more preferable for the maximum value or the minimum value.

Also to obtain the phase and amplitude of a rotation variation of the transfer belt, as in the case of the photoreceptor drums, the data of the sampling pattern of one turn of the transfer belt is cut out as one block on the basis of the sampling data spaced at the pitches of the AC component detecting patterns 110, stored in the main RAM 100, and finally the estimated values of the phase and amplitude of the AC vibration component of the transfer belt are calculated (step S23 in FIG. 13).

Further, to sample the AC components of only the photoreceptor drums, the pattern detecting means 70 is set at a position distance N (=natural number) times as long as the circumference length L of the transfer belt drive roll 25 spaced from the photoreceptor drum 6C that is located most downstream in the belt moving direction. For example, when the photoreceptor drums 6K, 6Y, 6M and 6C are disposed such that the transfer points of those drums are spaced at intervals of distance 2L apart from each other, the pattern detecting means 70 is located a distance L downstream of the photoreceptor drum 6C the belt moving direction. If so disposed, the AC component by the drive roll 25 is not included in the detected AC components. To sample the AC component by only the drive roll 25, the pattern detecting means 70 is located a distance (N+1/2)L apart from the most downstream photoreceptor drum 6C. When the four photoreceptor drums 6K, 6Y, 6M and 6C are disposed as mentioned above, the pattern detecting means 70 is located a distance 3/2L apart from the photoreceptor drum 6C. If so located, it is easy to detect the AC component of the drive roll.

<Control Operation Based on the Sampling Results>

The CPU 98 compares the phase and amplitude estimated values of the photoreceptor drums with those of the transfer belt. When the comparing result shows that the rotation variations of the photoreceptor drums are not uniform in phase and amplitude as shown in FIG. 17, the CPU performs the calculations on the phases and amplitudes of the AC components (phase shifts and amplitude differences) of the photoreceptor drums (step S18 in FIG. 13), sends the results of the calculations as correction data to the drive control board 66 (respective drives) of the respective color photoreceptor drums by communication (step S19), and finely and individually adjusts the rotation speeds of the photoreceptor drums 6K, 6Y, 6M and 6C so as to suppress periodical rotation variations. Also when the phase shifts and amplitude errors are present in the rotation variation of the transfer belt, the CPU performs the calculations on the phases and amplitudes of the AC component of the transfer belt (step S23 in FIG. 13) of the transfer belt, and sends the results of the calculations as correction data to the drive control board (belt drive) of the drive roll 25 of the transfer belt 24 by communication (step S24), and finely adjusts a rotation speed of the transfer belt 24 so as to suppress the periodical rotation variation.

In the present embodiment, the rotation speeds of the photoreceptor drums are individually adjusted so as to reduce the amplitudes d of the AC components of the photoreceptor drums 6K, 6Y, 6M and 6C to zero or thereabouts. In the waveforms representing the AC components shown in FIG. 17, the portions of the amplitude d present in the upper (plus) region when viewed with respect to the average line (zero base line) indicates that the photoreceptor drum rotates at a speed higher than a predetermined speed. On the other hand, those portions present in the lower (minus) region indicates that the photoreceptor drum rotates at a speed lower than the predetermined speed. Therefore, when the amplitude d is present in the plus region, the rotation speed of the photoreceptor drum is controlled so as to be decreased in accordance with the amplitude d. When the amplitude d is present in the minus region, the rotation speed of the photoreceptor drum is controlled so as to be increased in accordance with the amplitude d. Thus, the control by at least the "opposite phase" to the AC component is carried out in the drum speed control.

In the attempt to compensate for a color misregistration by suppressing the periodical rotation variations through the fine adjustment of the rotation speeds of the photoreceptor drums in accordance with the amplitudes of the AC vibration components, the rotation speed of each photoreceptor drum is settled down at the rotation speed of the drum before the fine adjustment, through the adjustment. A speed of the photoreceptor drum when it passes an exposure point SP as a position where a latent electrostatic image is written onto the drum and a speed of the drum when it passes a transfer point TP both vary. The effects of the variations of the drum speeds at the exposure point SP and the transfer point TP appear on the image. As the result of the speed variation, the magnification of the image in the slow scan direction (the rotation direction of the photoreceptor drum) is not uniform. The resultant image contains portions expanded or contracted in the slow scan direction.

Therefore, the control system must be arranged such that where the color misregistration is compensated for through the fine adjustment of the rotation speeds of the photoreceptor drums, the AC vibration component of the photoreceptor drum to be fine adjusted cancels the result of superimposing the effects by the drum speed variations at the exposure point SP and the transfer point TP.

To reduce the amplitudes d of the AC vibration components to zero or thereabouts by correcting the AC vibration components, it is necessary to satisfy the following conditional formula (Detecting quantity of the AC vibration component of the drum A)–(correction quantity at exposure)–(correction quantity at image transfer)=0    (1)

Assuming that the AC vibration component of the drum is $A \sin \omega t$ (A:amplitude and t:time), a correction gain (amplification degree) is $\alpha$, and a phase difference between the exposure point SP and the transfer point TP) is $\beta$, the left side of the conditional formula (1) is (Detecting quantity of the AC vibration component of the drum A)–(correction quantity at exposure)–(correction quantity at image transfer)

$= A \sin \omega t - \alpha \sin \omega t - \{-\alpha \sin \omega(t+\beta)\}$ $= A \sin \omega t - \alpha \sin \omega t + \alpha \sin \omega(t+\beta)$ To set up that the left side of the conditional formula (1) is 0, $\alpha \sin \omega(t+\beta)$ must be expressed by a function of $\sin \omega t$. This is satisfied only when $\beta=0$ or $\pi$. $\beta=0$ implies that the exposure point SP and the transfer point TP are at the same position. It is impossible to physically realize this solution in the construction of the image forming apparatus. Hence, the solution is improper. Therefore, the correct solution is $\beta=\pi$. The physical meaning of the solution is that the exposure point SP and the transfer point TP are out of phase.

On condition that $\beta=\pi$, substituting $\beta=\pi$ into the left side of the conditional formula (1), then we have (Left side) $= A\sin\omega t - \alpha\sin\omega t + \alpha\sin\omega(t + \pi)$ $= A\sin\omega t - \alpha\sin\omega t - \alpha\sin\omega t$ $= A\sin\omega t - 2\alpha\sin\omega t$ The left side=0, and thence $\alpha=A/2$. This implies that the correction gain is ½ of the amplitude d (A) of the AC vibration component of the photoreceptor drum.

As seen from the above description, to correct a color misregistration by suppressing the periodical rotation variation through the fine adjustment of the rotation speed of each photoreceptor drum, it is necessary to dispose the exposure point SP and the transfer point TP such that, ideally, these points are angularly spaced 180° apart from each other. Actually, however, the phase difference may be within 180±45° as will be described later, and hence may be approximately 180°. To correct a color misregistration by suppressing the periodical rotation variation on the basis of the premise, a detecting value (amplitude) of the AC vibration component of each photoreceptor drum, which is produced using the detecting patterns formed on the transfer belt or each photoreceptor drum, is multiplied by ½ of the correction gain, and the resultant product is inverted in phase, and the phase inverted one is sent as a correction value to the drive control board 66 of each photoreceptor drum by communication.

Figure 30:
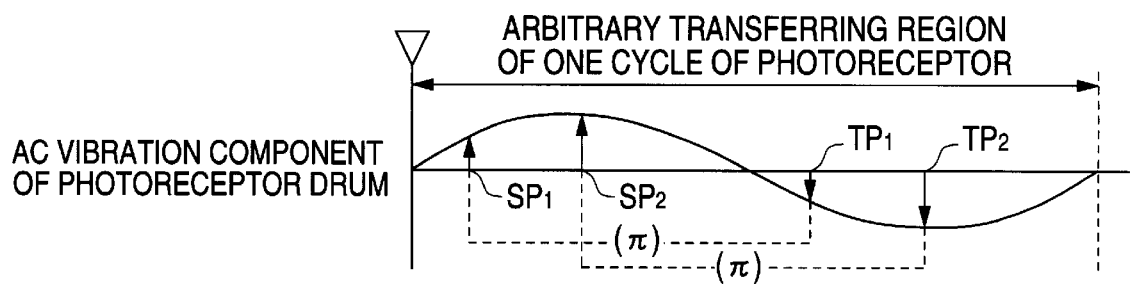
FIG. 30 is an explanatory diagram showing exposure points and transfer points, angularly spaced 180° from each other, and an AC vibration component.

A case is given where after the AC component detecting patterns are sampled, detecting information of the AC vibration component of each photoreceptor drum is known and the exposure point SP and transfer point TP of the photoreceptor drum are disposed in an out-of-phase fashion. In this case, as shown in FIG. 30, the amplitudes d of the AC vibration component at the exposure point (SP1, SP2) and at the transfer point (TP1, TP2) are equal in amplitude but opposite in orientation (sign). With such an amplitude relationship, if the rotation speed of the photoreceptor drum is finely adjusted and its rotation speed is increased at the exposure point, the rotation speed is decreased at the transfer point. As a result, a latent electrostatic image formed at the exposure point is extended in the slow scan direction (drum rotation direction) by a quantity corresponding to the speed variation, and at the transfer point a toner image is transferred while being extended by the same quantity as at the exposure point. In contrast with this, if the rotation speed of the drum is decreased at the exposure point, its speed is increased at the transfer point. As a result, the latent image formed is contracted in the slow scan direction by a quantity corresponding to the speed variation, and at the transfer point the toner image is transferred while being contracted by the same quantity as at the exposure point.

Figure 32A:
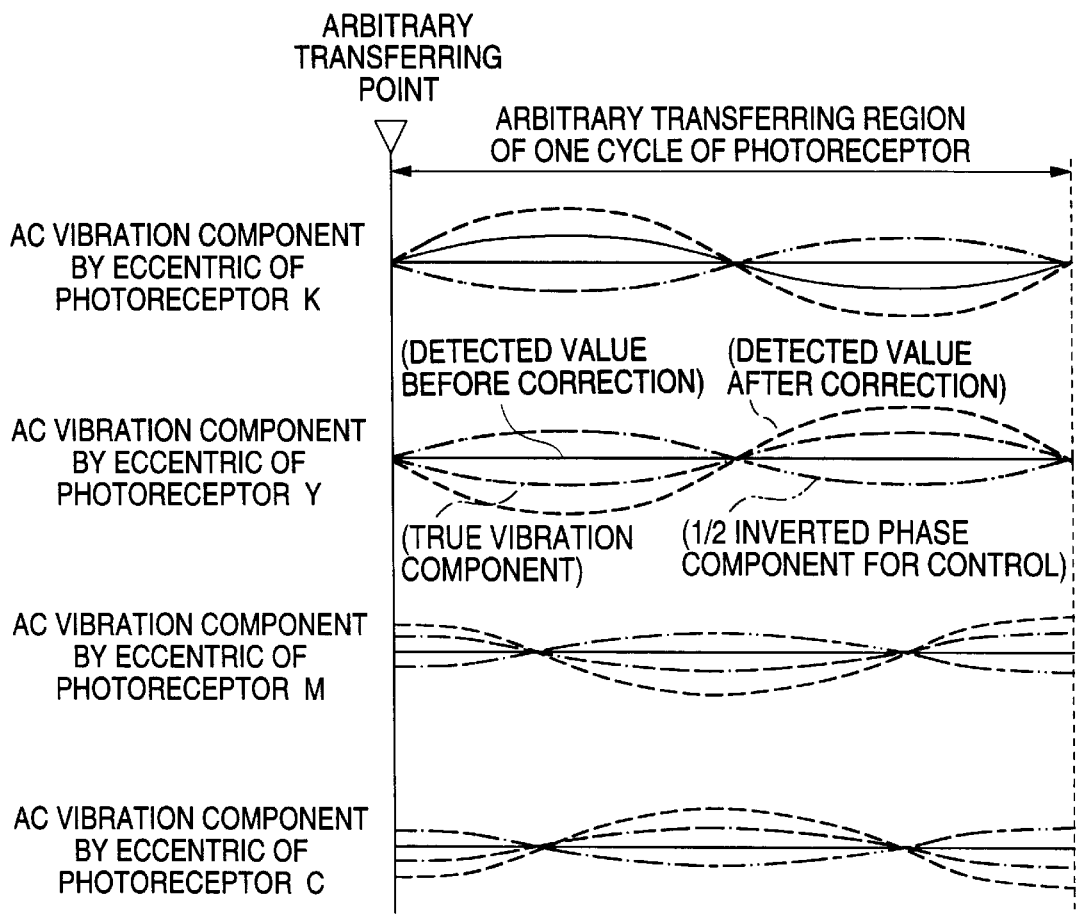
FIG. 32A is explanatory diagram showing variations of the AC vibration components of the respective colors after the correction.
Figure 32B:
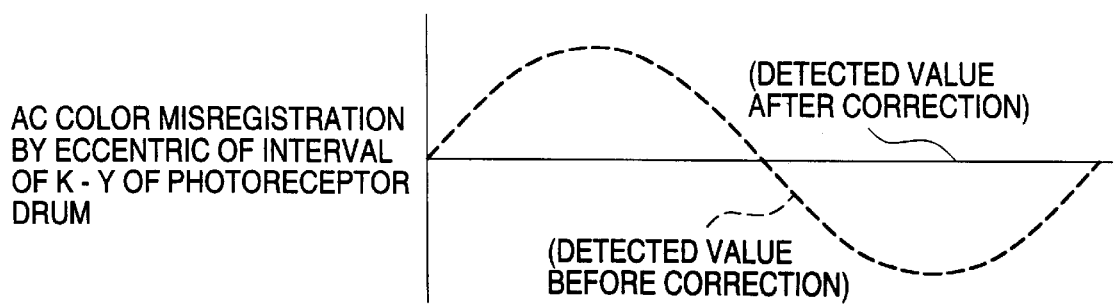
FIG. 32B is an explanatory diagram showing AC color misregistration component between K and Y colors at that time.

Therefore, where the exposure point and the transfer point are angularly spaced from each other by 180°, when the correction value used in the fine adjustment of the rotation speed is compared with the correction result appearing on the image after the fine adjustment, the latter is the double of the former. The same thing is true for the detecting information of the AC vibration component gathered by sampling the AC component detecting patterns. As shown in FIGS. 32A and 32B, the AC component contained in the detecting information is not the true vibration component by the rotation variation of the photoreceptor drum, but is the double of the true vibration component (indicated by a one-dot chain line in the figure). For this reason, to suppress the periodical vibration variation of each photoreceptor drum, the AC vibration component obtained through the sampling is multiplied by "−½", and the resultant product is superimposed on the correction quantity in the drive control board of the photoreceptor drum.

Figure 31:
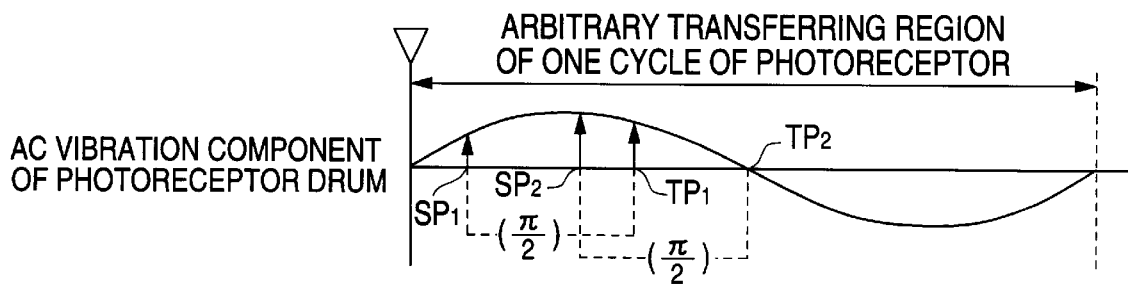
FIG. 31 is an explanatory diagram showing exposure points and transfer points, angularly spaced 90° from each other, and an AC vibration component.

When the phase difference between the exposure point SP and the transfer point TP is 90°=π/2, not 180°, as shown in FIG. 31, the absolute values and the orientations of the amplitudes of the AC vibration component at the exposure point SP and the transfer point TP are random or the amplitude relationship between the corresponding points is not fixed. In this condition, it is impossible to generate the correction quantities for suppressing the periodic rotation variations of the rotary means through the fine adjustment of the rotation speeds of the rotary means, for example, the photoreceptor drums. Therefore, it is impossible to correct the color misregistration.

In the present embodiment based on the , to correct the color misregistration by suppressing the periodic rotation variations of the rotary means through the fine adjustment of the rotation speeds of the photoreceptor drums, the phase difference between the exposure point SP and the transfer point TP is set at approximately 180°. Specifically, as shown in FIGS. 2 and 3, the transfer point TP is set at the lowest position of each photoreceptor drum, and the exposure point SP is set at a position spaced upward from the transfer point by approximately 180°. Further, the AC vibration component of each photoreceptor drum is multiplied by ½ of the correction gain, and the resultant product is inverted in phase, and the phase inverted one is sent as a correction value to the drive control board 65 of each photoreceptor drum by communication (steps S18 and S19 in FIG. 13). When a stepping motor is used for the drive motor 58 for driving each photoreceptor drum, the fine adjustment of each rotation speed by using the phase inverted ½ control signal can be realized by modulating the pulse width and the frequency of a drive pulse signal to be applied to the stepping motor.

Incidentally, in the present embodiment, the present invention is applied to the image forming apparatus of the direct transfer type, but may be applied to an image forming apparatus of the intermediate transfer type, as a matter of course.

By individually adjusting the rotation speeds of the photoreceptor drums 6K, 6Y, 6M and 6C so that the amplitudes d of the AC vibration components are reduced to zero or thereabouts, the AC vibration components (waveforms) of the photoreceptor drums shown in FIG. 17 are all reduced to approximate to zero as shown in FIG. 32A. In the figure, a one-dot chain line indicates the true value (the magnitude of an eccentricity that will cause the rotation variation) of the AC vibration component.

Figure 33:
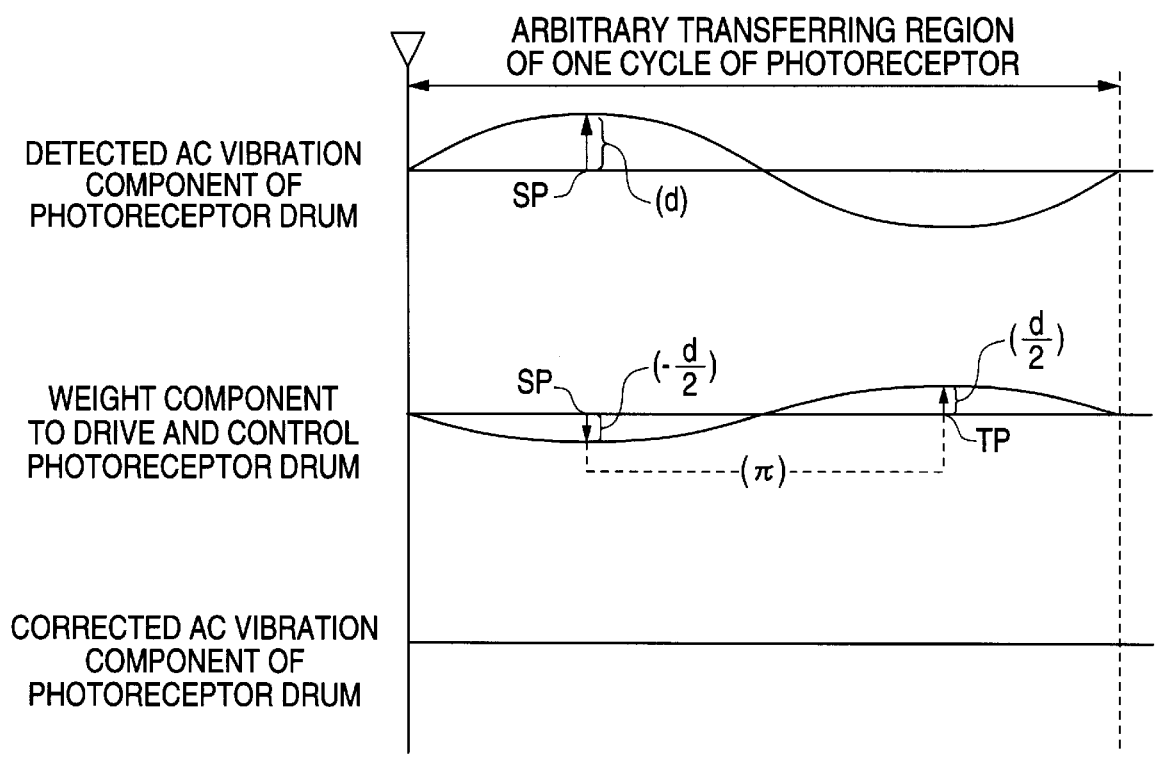
FIG. 33 is explanatory diagram showing correction quantities, and a correction result.

The correction control in the present embodiment will be typically described for one photoreceptor drum in a time sequential manner. A photoreceptor drum has an AC vibration component as shown in FIG. 33. The AC component is multiplied by ½, and phase inverted, and the resultant is superimposed on the correction quantity in the drive control circuit 65 (F.F table) of the photoreceptor drum. As a result, the AC component of the photoreceptor drum having undergone the correction process is reduced approximately to zero. In the correction control, as shown in FIG. 33, at the exposure point SP the AC vibration component is corrected by only (−d/2), half of the amplitude d of the AC vibration component. However, the AC vibration component is corrected by (d/2), the inversion of (−d/2) at the transfer point TP angularly spaced approximately 180° apart form the exposure point SP. As a result, the vibration component left after the correction at the exposure point SP cancels that left after the correction at the transfer point TP. As a whole, the correction of a quantity corresponding to the amplitude d of the AC vibration component is made for the AC vibration component.

Thus, through the fine adjustment of the rotation speeds of each photoreceptor drum, the AC color misregistration between the colors K and M is reduced substantially to zero, as shown in FIG. 32B. The AC color misregistration between each of the remaining combinations of colors (K−Y, K−C, Y−M, Y−C, and M−C) is also reduced to zero or thereabouts, as a matter of course.

As seen from FIG. 30, as the phase difference between the exposure point and the transfer point shifts from 180°, the fixed relationships of the absolute value and orientation of the amplitude d of the AC vibration component at the exposure point and those at the transfer point is more lost, and it is more difficult to uniquely determine a correction quantity for the fine adjustment of the rotation speed. And the control (correction) gradually loses its accuracy. Therefore, a tolerable range of the phase difference is 180±45°. In this case, the correction accuracy where the AC vibration component has the largest amplitude is approximately ½ as large as of the case where the phase difference is 180°. In this respect, 180±30° is more preferable for the tolerable range of the phase difference.

Also in case where the phase difference between the exposure point and the transfer point is set as just mentioned and where the fine adjustment of the rotation speed of the transfer belt 24 is performed separately from the fine adjustments of the photoreceptor drums, an AC vibration component of the transfer belt 24 is multiplied by ½, and phase inverted, and the resultant is sent as a correction value to the drive control board (belt.drive) of the transfer belt by communication (steps S23 and S24 in FIG. 13).

<Another Mode of the Control Operation>

In the thus far described Embodiment 1, to suppress the periodical rotation vibrations of the photoreceptor drums, the rotation speeds of the photoreceptor drums are individually adjusted so that the amplitudes d of the AC vibration components are reduced substantially to zero. Alternatively, the AC vibration component of one photoreceptor drum is used as a reference. The rotation speeds of the remaining photoreceptor drums are individually controlled so as to coincide the amplitudes and orientations of the AC vibration components of the remaining photoreceptor drums with those of the reference vibration component.

Figure 34A:
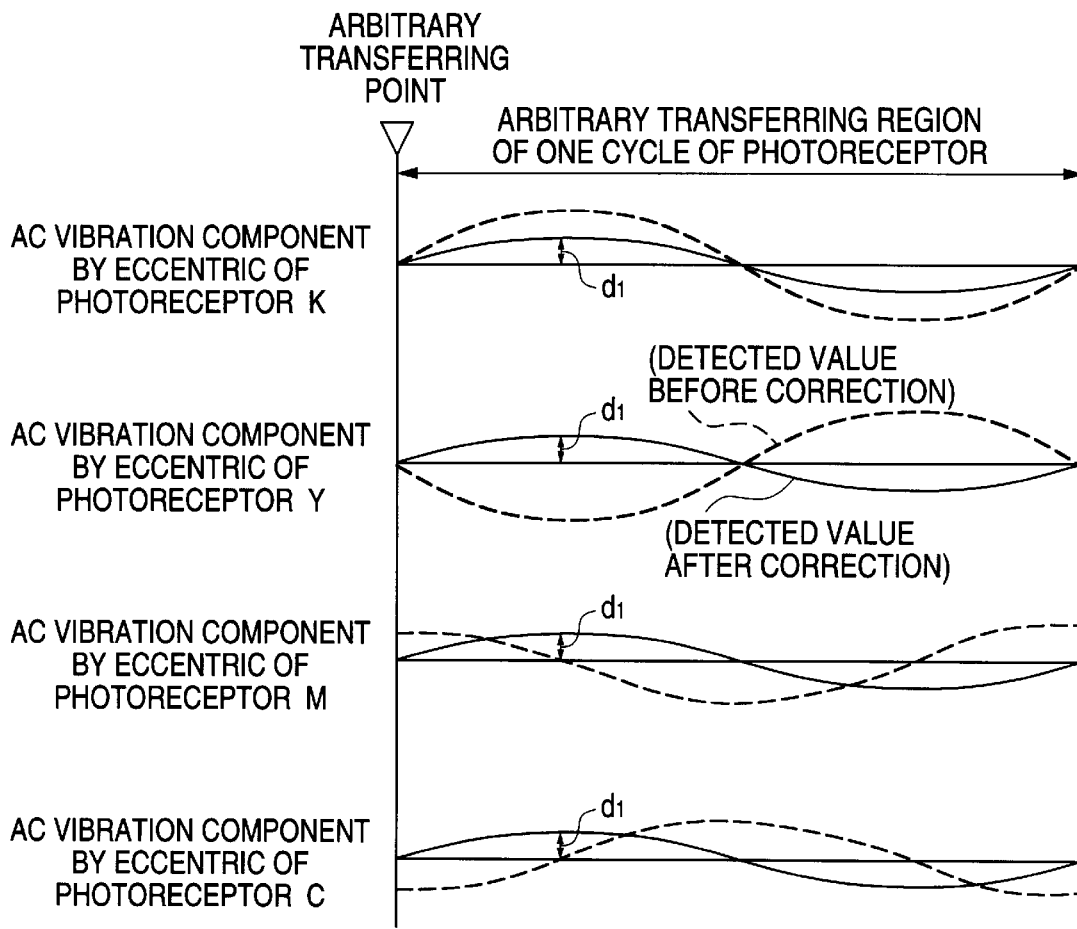
FIG. 34A is an explanatory diagram showing other variations of the AC vibration components of the respective colors after the correction.

More specifically, in the waveforms of the AC vibration components shown in FIG. 17, the AC vibration component of the photoreceptor drum of color K is used as a reference vibration component. The rotation phases of the remaining photoreceptor drums 6Y, 6M and 6C are individually adjusted so that the waveforms of the AC vibration components of those remaining drums are in phase with the reference vibration component waveform. Through the phase adjustment, the waveforms of all the AC vibration components are arranged to be in phase, as shown in FIG. 34A. An amplitude adjustment is then performed. In the adjustment, the photoreceptor drum 6M (or 6C) of color M (or C) is used as a reference. The rotation speeds of the photoreceptor drum 6K and 6Y of colors K and Y are individually fine-adjusted so that the amplitudes d1 of the photoreceptor drum 6K and 6Y are coincident with those of the amplitudes d2 of the photoreceptor drums 6K and 6Y of colors K and Y.

Figure 34B:
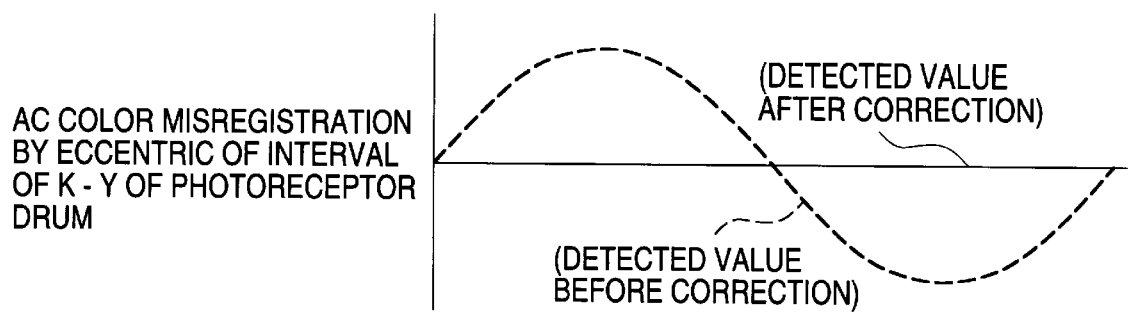
FIG. 34B is an explanatory diagram showing AC color misregistration component between K and Y colors at that time.

Thus, one photoreceptor drum is used as a reference, and the rotation speeds of the remaining photoreceptor drums are individually adjusted so that the amplitudes and orientations of the AC vibration components of those remaining ones are coincident with those of the AC vibration component of the reference photoreceptor drum. Through the adjustment, the AC vibration components (waveforms) of the respective photoreceptor drums shown in FIG. 17 are arranged to be in phase and to have the equal and low amplitudes, as shown in FIG. 34A. Therefore, the AC color misregistration arising from the amplitude differences of the AC vibration components of the respective colors can be satisfactorily reduced. For example, the AC color misregistration between the colors K and M is substantially removed (FIG. 34B). The AC color misregistration between each of the remaining combinations of colors (K–Y, K–C, Y–M, Y–C, and M–C) is also substantially removed, as a matter of course.

The rotation phase adjustment is performed in the following way.

The photoreceptor drums (transfer belt) are rotated by a necessary turn in an idling manner for the rotation phase adjustment. The phase adjustment is preferably when the digital color copying machine is in a standby mode. In the phase adjustment, of the transfer baffles 48K, 48Y, 48M and 48C FIG. 3) which bring the photoreceptor drums 6K, 6Y, 6M and 6C into contact with the transfer belt 24, at least the baffles associated with the photoreceptor drums to be phase adjusted are lowered. By so doing, it does not happen that the transfer belt 24 slides on the photoreceptor drums while being in contact with the drums. Accordingly, the belt and the drums are not damaged by abrasion.

Figure 35:
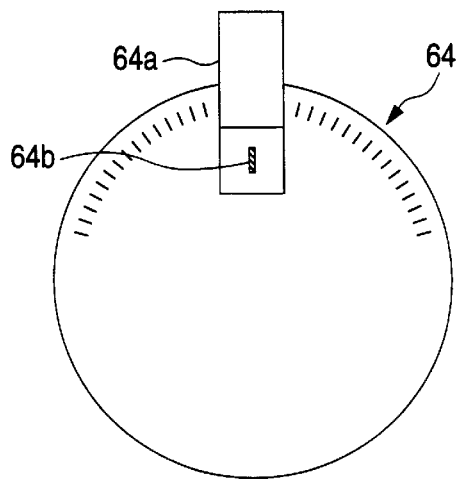
FIG. 35 is an explanatory diagram showing a reference position of an encoder.

The encoder 64 attached to each of the drive shafts of the photoreceptor drum 6 and the transfer belt 24 may be used for the rotation phase adjustment. In this case, the drive control means (drive) of the photoreceptor drum 6 and the transfer belt 24 are arranged in a manner that the rotation phases of the encoder 64 are divided into an M (M:natural number) number of segments for the phase adjustment. For the phase adjustment, as shown in FIG. 35, a Z-phase 64b (a reference point of one turn) of the pulse signal generated one pulse for each turn of the encoder 64 is set at an absolute phase specified by the CPU 98 by communication, i.e., a phase as a reference phase, determined by a mounting position of a sensor 64a of the encoder 64. For the same purpose, the rotation of the photoreceptor drum 6 may also be adjusted by an increment or a decrement of a specified phase. In a case where the rotation phase φ of the photoreceptor drum 6Y of color Y lags (or leads) that of the photoreceptor drum 6K of black K by ½ period as shown in FIG. 17, the CPU 98 sends the calculation result to the control circuit 65 of the photoreceptor drum 6Y and controls the photoreceptor drum 6Y so as to advance its rotation phase by ½ period. In the control, when the photoreceptor drum 6Y is stopped, only this drum is turned 180° compared to the remaining ones, in an idling manner; that is, the drum is made to lead the remaining ones by 180°.

The phase adjustment control is preferably carried out when no image forming operation is performed, for example, during a time waiting for the paper feeding which follows the registration control cycle, immediately after a start key is pushed, and in a density detecting cycle. By so doing, the correction time is reduced.

Embodiment 1 includes pattern detecting means, phase/amplitude detecting means, drive control means so as to finely and individually control the rotation speeds of the photoreceptor drum 6 and the transfer belt 24 in the digital full color copying machine. Therefore, it is able to reduce the amplitudes of the vibration components to zero and hence to suppress the periodical rotation variations, by individually adjusting the rotation speeds of the photoreceptor drum 6. Further, the AC color misregistration is suppressed (reduced) by making the phases and amplitudes of the vibration components coincident with each other. The AC color misregistration is caused by the eccentricity of the photoreceptor drum and the transfer belt, caused by the drum and belt per se or their mounting portions, the eccentricity by the clearance errors of the rotary shafts, and the nonuniform belt thickness of the transfer belt.

<Other Arrangements of the Control System>

A feed forward control system is employed, as a rule, for the control in which the rotation speeds of the photoreceptor drum 6 and the transfer belt 24 are individually adjusted for suppressing the periodical rotation variations. The control is carried out before the image forming cycle starts, after the phases and amplitudes of the periodical vibration components obtained from the detecting information of the AC component detecting patterns that are formed in advance on the transfer belt. Therefore, the AC vibration components present before the image forming process is removed, thereby suppressing (reducing) the AC color misregistration.

In Embodiment 1, the control for suppressing the periodical rotation variations is combined with a feedback control in which a rotation of each of the photoreceptor drum 6 and the transfer belt 24 is detected by the encoder 64 attached to the rotary shaft of each the drum and the belt, and detecting information are fed back to the drive control means (drive) of the photoreceptor drum 6 and the transfer belt 24. In this case, after the high frequency vibration components are removed by the feed back control using the encoder, the detection of the AC vibration component by using the AC component detecting patterns and the control based on the detection result are performed. The resultant control is more precise.

In Embodiment 1, when the control for suppressing the periodical rotation variations is applied to the two types of the rotary means, the photoreceptor drum and the transfer belt, the phases and the amplitudes of the AC vibration component of the photoreceptor drum having a long rotation period are detected, and the control based on the detection result is performed. Then, the phases and the amplitudes of the AC vibration component of the drive roll of the transfer belt whose rotation period is shorter than that of the photoreceptor drum are detected, and the control based on the detection result is performed. Thus, when the control is applied to a plural number of rotary means of different rotation periods, the detection and the control are performed in the order of the lengths of the rotation period of the rotary means: The rotary means of which the rotation period is the longest is first subjected to the detection and the control, then the rotary means of which the rotation period is long next to the former is subjected to the detection and the control, and so on. When the AC vibration component of the belt drive roll of a short rotation period is detected, most of the AC components of the photoreceptor drum having a long rotation period have already been removed. Accordingly, the detection of the AC vibration component of the belt drive roll is easy and precise.

In Embodiment 1, AC component detecting patterns are formed on both side portions on the transfer belt 24 when viewed in the axial direction (fast scan direction), the patterns are detected by the pattern detecting means 70 disposed adjacent to the patterns, the detecting information of the patterns are summed and averaged, and the phase and amplitude of the AC vibration component are calculated using the resultant information, whereby the periodical rotation variation is removed. More specifically, in the steps S15 and S16 and the steps S20 and S21 in FIG. 13, the detecting patterns on the both side portions are sampled, the sampled data are averaged, and the averaged data is used as a correction value, whereby the AC component phase calculation is performed. A periodical rotation variation, which is generated in the axial direction by the eccentricity of the photoreceptor drum and the transfer belt and their drive shafts, can be detected more reliably and accurately than in the case where it is detected at a single location in the axial direction. Further, the accurate detecting information ensures a proper control. It is noted that both side portions on the transfer belt is the places where the AC vibration component most frequently appears. Therefore, when the AC component detecting patterns are formed there and detected as in the above case, the eccentricity can be most efficiently detected.

Figure 36:
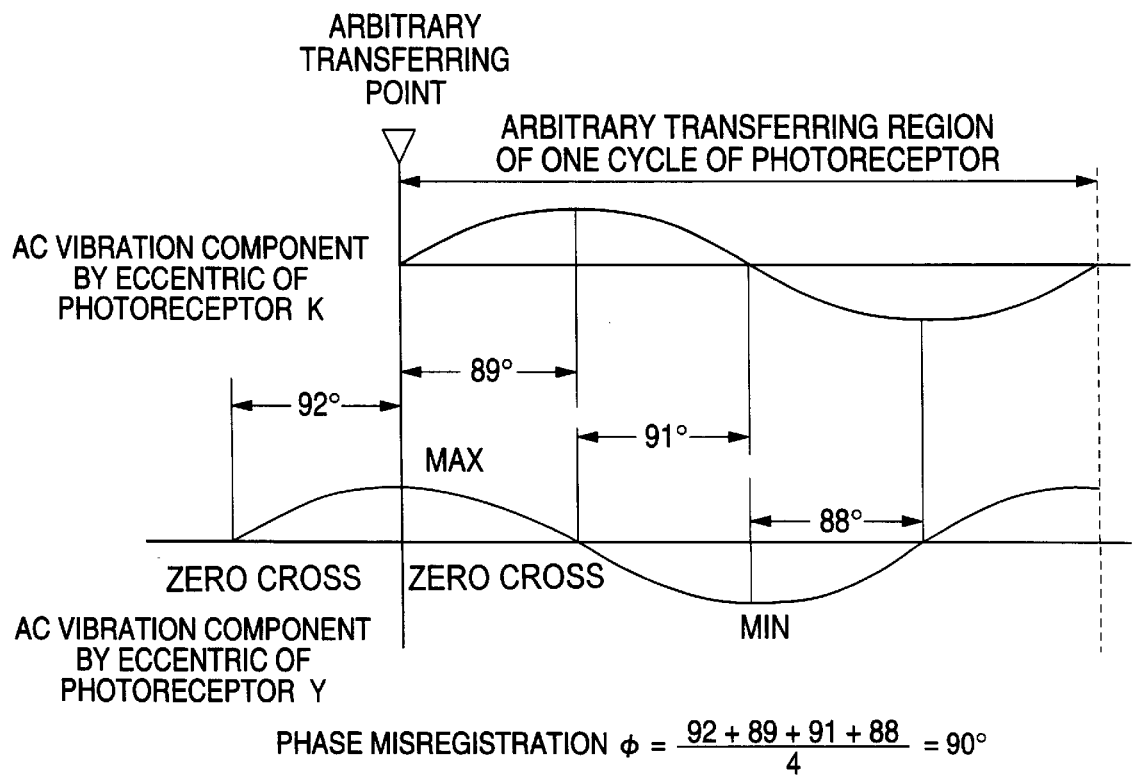
FIG. 36 is an explanatory diagram showing a method for detecting a rotation phase of the photoreceptor drum.

In Embodiment 1, the phases of the AC vibration component of the photoreceptor drum and the transfer belt at the Nth turn of them are detected. In this case, the time for the phase detection is increased by the time taken for the drum and the belt to turn N times. The phase detection may be based on the pattern data of one turn of each of the photoreceptor drum and the transfer belt 24. In the phase detection based on the one turn pattern data, there is a danger that a phase detection error increases. To cope with this, as shown in FIG. 36, the pattern data of one turn of each drum, for example, is processed to obtain an average value of the rotation variation data. The address value of the maximum value, the minimum value, and the zero crosses in the rise and decay of the AC vibration component varying with respect to the average value are calculated. The phases of the AC vibration component of each of the photoreceptor drum and the transfer belt are obtained from the those address values. The phase values obtained from those four address values of each color are averaged. A rotation phase of each of the photoreceptor drum and the transfer belt is determined on the averaged phase value. In this way, the phase can be determined for a short time.

Embodiment 2

Embodiment 2 is a digital color copying machine having the same control system as of the copying machine of Embodiment 1 except that an AC rotation variation caused by, for example, an eccentricity of the drive roll 25 of the transfer belt 24 is neutralized (corrected) through the drive control of the photoreceptor drums 6K, 6Y, 6M and 6C, not the drive control of the transfer belt 24 per se.

The copying machine of this embodiment must execute the correction operation under the restrictive condition on the exposure point and the transfer point (a specific phase difference therebetween is required). Therefore, the control system in this embodiment must be arranged such that the AC vibration component of the transfer belt to be finely adjusted cancels the result of superimposing the effects by the belt speed variations at the exposure point SP and the transfer point TP.

In order to reduce the amplitudes d of the AC vibration component of the transfer belt substantially to zero by correcting the vibration component, the following conditional equation must hold:

(AC vibration component of the transfer belt)−(correction quantity at exposure)−(correction quantity at image transfer)=0 . . . (2)

The diameter of each photoreceptor drum 6K, 6Y, 6M and 6C and the diameter of the drive roll 25 of the transfer belt 24 are selected so as to have a multiple (positive integer) ratio. A case where the ratio of their diameters is an even number, e.g., 2N:1 N:natural number), will be described. Assuming that in the formula (2), the AC vibration component of the belt is $B\sin\omega t$ (B:amplitude and t:time), a correction gain (amplification degree) is $\gamma$, and a phase difference between the exposure point SP and the transfer point TP) is $\pi$, the left side of the conditional formula (2) is (AC vibration component of the belt)−(correction quantity at exposure)−(correction quantity at image transfer)

$= B \sin 2N\omega t - \gamma \sin 2N\omega t - \{-\alpha \sin 2N\omega(t+2N\pi)\}$ $= B \sin 2N\omega t - \gamma \sin 2N\omega t + \gamma \sin 2N\omega t$ $= B \sin 2n\omega t$ In the formula (2), the left side=0. $\gamma$ as a solution cannot be obtained. This implies that the correction is impossible when this diameter ratio is used.

A case where the ratio of their diameters is an odd number, e.g., (2N−1):1 N:natural number), will be described. The left side of the conditional formula (2) is (AC vibration component of the belt)−(correction quantity at exposure)−(correction quantity at image transfer)

$= B \sin(2N-1)\omega t - \gamma \sin(2N-1)\omega t - \{-\alpha \sin(2N-1)\omega(t+(2N-1)\pi)\}$ $= B \sin(2N-1)\omega t - \gamma \sin(2N-1)\omega t - \gamma \sin(2N-1)\omega t$ $= B \sin(2N-1)\omega t - 2\gamma \sin(2N-1)\omega t$ Since (the left side)=0, $\gamma = B/2$. This indicates that the correction gain is ½ of the amplitude d(=B) of the AC vibration component of the transfer belt.

As described above, Embodiment 2 is based on the concept that to compensate for the color misregistration, the periodical rotation variation of the transfer belt 24 is removed by finely adjusting the rotation speeds of the photoreceptor drums 6K, 6Y, 6M and 6C. To implement the concept, a diameter ratio of the photoreceptor drum and the drive roll of the transfer belt is set at an odd number, the amplitude of the AC vibration component of the transfer belt 24 is multiplied by ½ of the correction gain and phase inverted, and the result is applied by communication to the drive control board 65 of each photoreceptor drum, and superimposed on the control quantity (correction quantity) in the board.

Figure 37:
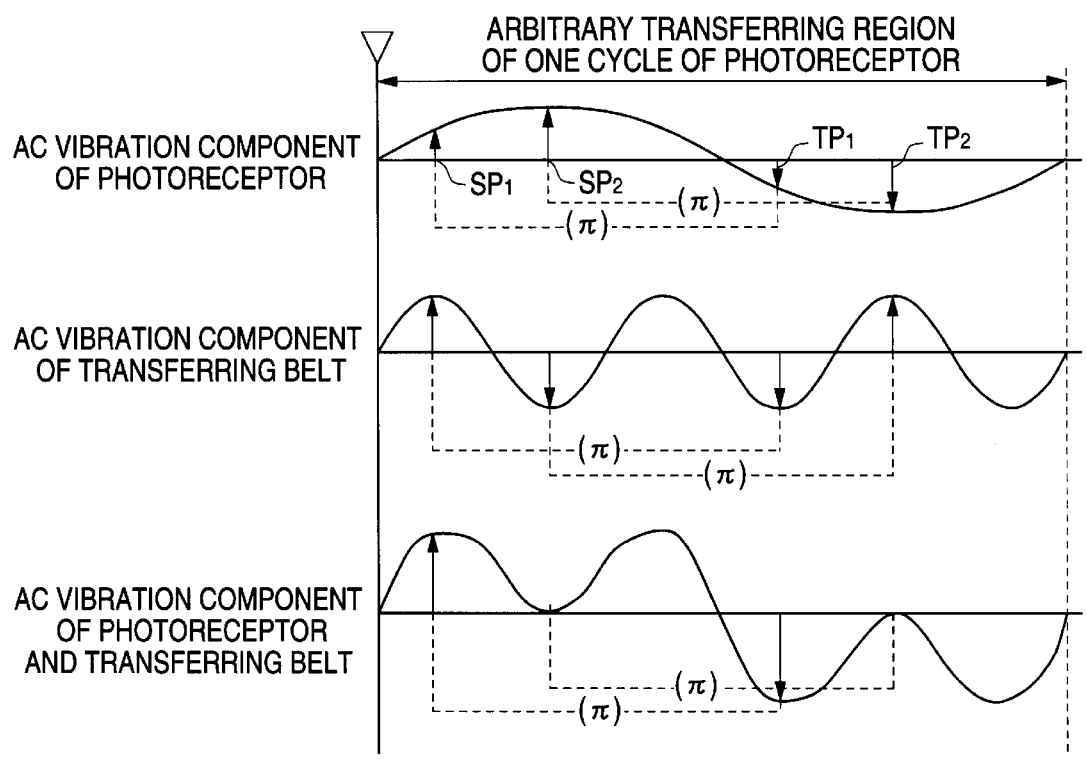
FIG. 37 is an explanatory diagram showing the relationship between a photoreceptor drum and an AC vibration component of a transfer belt when the diameter ratio of the photoreceptor drum and the transfer belt is an odd number.
Figure 39:
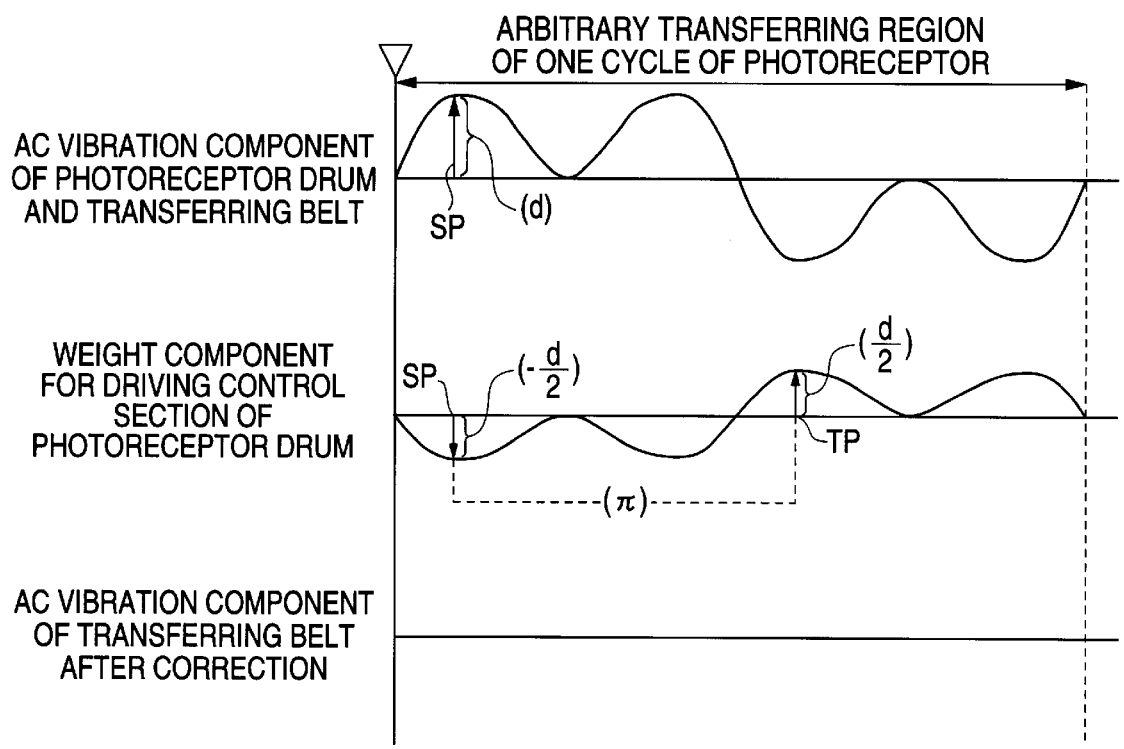
FIG. 39 is an explanatory diagram showing correction quantities and a correction result.

A case that the diameter ratio of the photoreceptor drum and the drive roll 25 of the transfer belt is 3:1, and the AC vibration components of them have been obtained, is shown in FIG. 37. When those AC vibration components are composed, the resultant vibration component takes a waveform depicted in the lowest portion of FIG. 37. In this case, 180° or $\pi$ as a phase difference between the exposure point SP and the transfer point TP on the photoreceptor drum corresponds to $3\pi/2$ on the transfer belt. The amplitudes d of the AC vibration components of the photoreceptor drum or the transfer belt, and the AC vibration component as the resultant of the former vibration components are equal in their absolute value and opposite in their orientation (sign) at the exposure points (SP1 and SP2) and the transfer points (TP1 and TP2).

Where the phase difference between the exposure point and the transfer point is 180° and a diameter ratio of the photoreceptor drum and the belt drive roll is an odd number, when the correction quantity used in the fine adjustment of the rotation speed is compared with the correction result appearing on the image after the fine adjustment, the latter is the double of the former. For this reason, to remove the periodical vibration variation of the transfer belt, the AC vibration component obtained through the sampling is multiplied by "−½", and the resultant product is superimposed on the correction quantity in the drive control board of the photoreceptor drum. To remove the periodical rotation variation of the photoreceptor drum, the product of "−½" and the AC vibration component obtained through the sampling is superimposed on the correction quantity in the drive control board of the photoreceptor drum, simultaneously with the transmission of that for the transfer belt, as a matter of course. Actually, the AC vibration components of the photoreceptor drum and the transfer belt are composed, and the composed AC vibration component (detecting value) is multiplied by "−½", and phase inverted, and the resultant is sent to the drive control circuit of the photoreceptor drum where the former is superimposed on a correction quantity of the circuit (FIG. 39).

Figure 38:
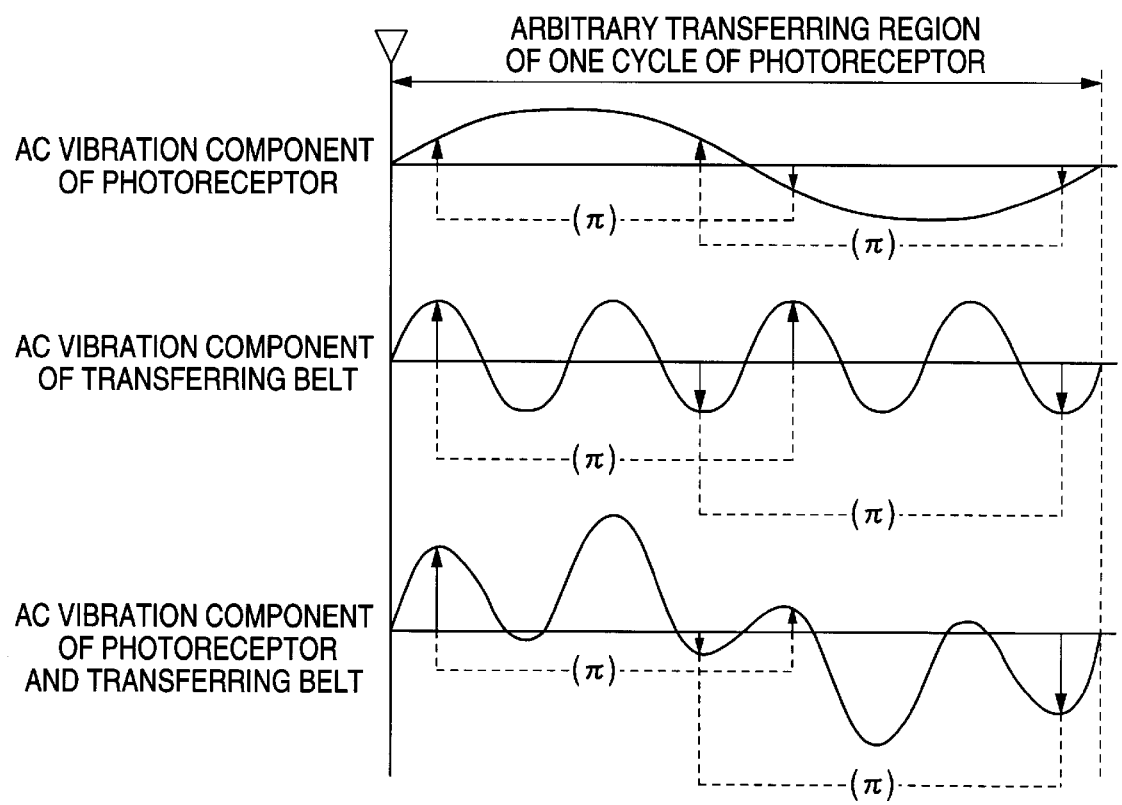
FIG. 38 is an explanatory diagram showing the relationship between a photoreceptor drum and an AC vibration component of a transfer belt when the diameter ratio of the photoreceptor drum and the transfer belt is an even number.

A case that the diameter ratio of the photoreceptor drum and the drive roll 25 of the transfer belt is 4:1, and the AC vibration components of them have been obtained, is shown in FIG. 38. When those AC vibration components are composed, the resultant vibration component takes a waveform depicted in the lowest portion of FIG. 38. In this case, 180° or π as a phase difference between the exposure point SP and the transfer point TP on the photoreceptor drum corresponds to 4π on the transfer belt. The amplitudes d of the AC vibration components of the photoreceptor drum or the transfer belt, and the AC vibration component as the resultant of the former vibration components are equal in their absolute value and in their orientation (sign) at the exposure points (SP1 and SP2) and the transfer points (TP1 and TP2). Therefore, at this diameter ratio, it is impossible to remove the periodical rotation variation of the transfer belt by the drive control of the photoreceptor drum. In this case, to remove the periodical rotation variation of the transfer belt, the transfer belt per se must be put under the drive control.

The correction control in the present embodiment will be described. Let us consider a case where an AC vibration component as the resultant of composing the AC vibration components of the photoreceptor drum and the transfer belt is as shown in FIG. 39. In this case, the AC vibration component of the transfer belt having undergone the correction process is reduced substantially to zero by superimposing the phase-inverted, ½× AC vibration component on a correction quantity in the drive control circuit 65 (F.F table) of the photoreceptor drum. In the correction control, as shown in a waveform located in the middle of FIG. 39, at the exposure point SP the AC vibration component is corrected by only (−d/2), half of the amplitude d of the AC vibration component. However, the AC vibration component is corrected by (d/2), the inversion of (−d/2) at the transfer point TP angularly spaced approximately 180° apart form the exposure point SP. As a result, the vibration component left after the correction at the exposure point SP cancels that left after the correction at the transfer point TP. As a whole, a correction of a quantity corresponding to the amplitude d of the AC vibration component is made for the AC vibration component. Thus, the periodical rotation variations of both the photoreceptor drum and the transfer belt can be corrected by the correction control.

The periodical rotation variation of the belt-like image bearing member consists of one or more the following vibrations: a vibration caused by an eccentricity of the photoreceptor drum 6 or its mounting portion or caused by its drive roll or drive gear, a vibration caused by an eccentricity of the transfer belt 24 or its mounting portion or caused by its drive roll or drive gear, and a speed variation caused by the nonuniform thickness of the transfer belt 24. The present embodiment can satisfactorily suppress the periodical rotation variation by selecting one or more vibrations from those vibrations and controlling them.

Embodiment 3

Figure 40:
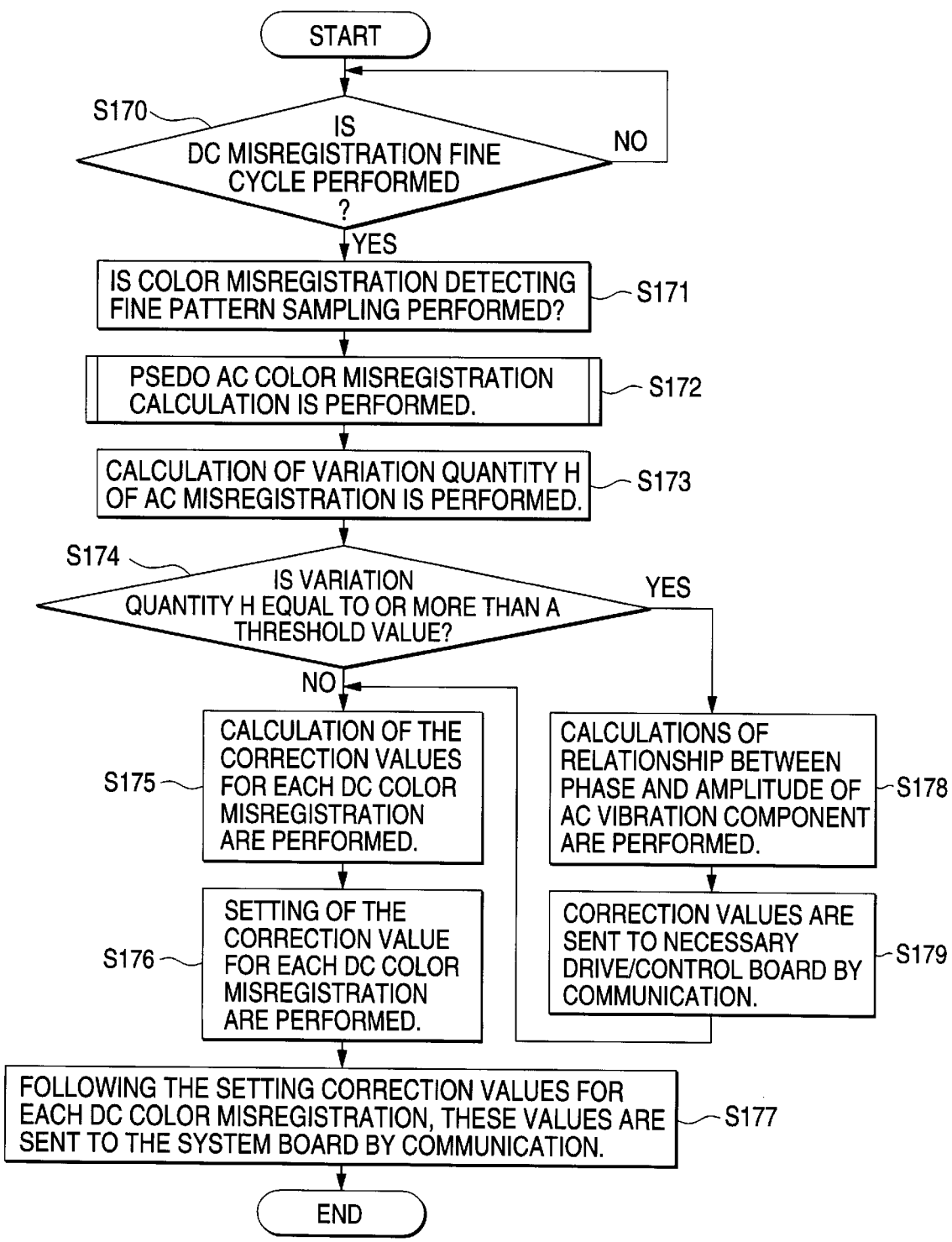
FIG. 40 is a flow chart showing another example of a color misregistration correcting operation.
Figure 41:
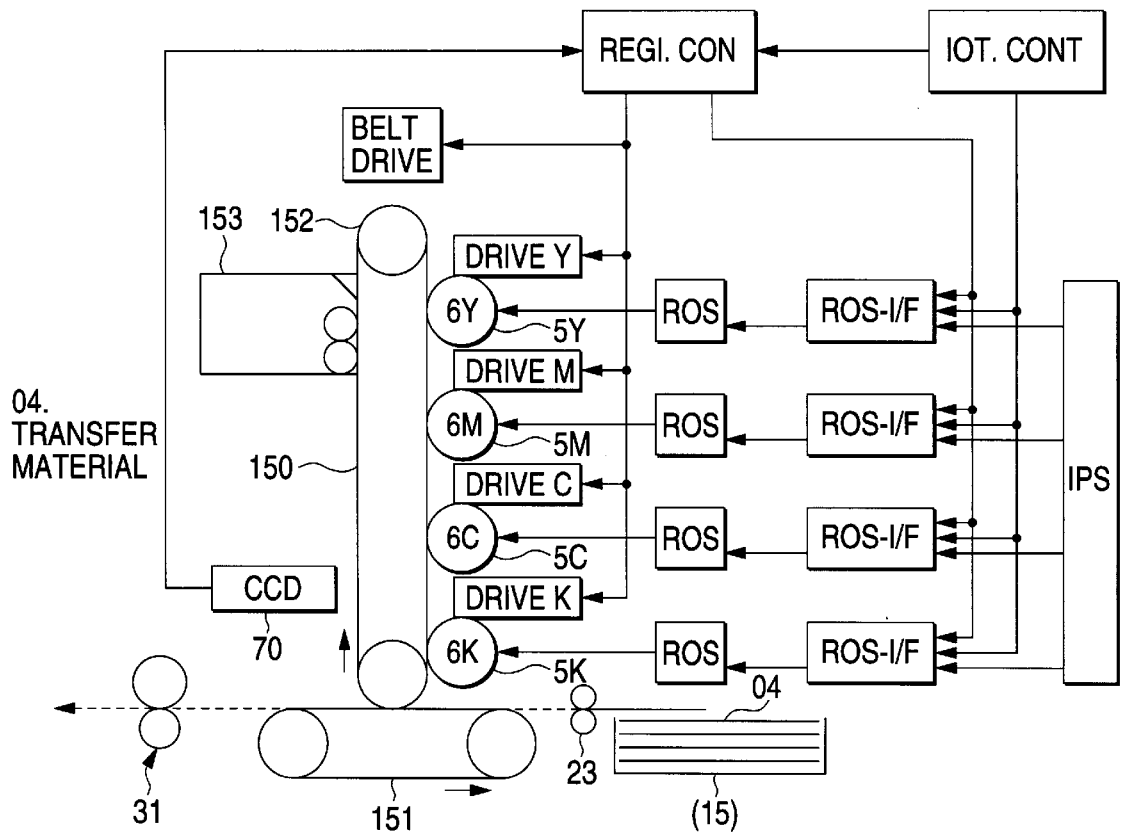
FIG. 41 is a view showing the concept of another image forming apparatus according to the present invention.

FIG. 40 shows Embodiment 3. Embodiment 3 is different from Embodiments 1 and 2 in that after paper jamming is removed and when temperature varies in excess of a predetermined value in the machine, a variation quantity of the AC color misregistration is detected every fine adjustment in the DC component correction cycle, and if the correction is needed, the correction cycle is executed.

The AC vibration component caused by the eccentricity of the photoreceptor drum and the transfer belt is not such a variation being easy to vary for a short time. Therefore, such a simple measure of applying the AC color misregistration correction cycle at the time of power on or of parts exchanging, as referred to in the description of Embodiment 1 and 2, will do. That is, any problem cannot arise. However, if a phenomenon giving rise to the AC vibration component accidentally occurs, the phenomenon continues and causes another AC vibration component and hence a color misregistration.

In the present embodiment, to execute the fine adjustment for the AC color misregistration correction in a normal state (step S170), the fine adjustment for the DC color misregistration is performed as in the step S25 of FIG. 13 (step S171), and a pseudo AC color misregistration (phase and amplitude) calculation is performed (step S172). The pseudo AC color misregistration calculation is different from the normal AC color misregistration calculation (steps S16 and S21 in FIG. 13) in that the data by the DC color misregistration fine adjustment, obtained in the step S171, is used for the pattern sampling data as an object to be calculated. The remaining process of the pseudo AC color misregistration calculation is the same as of the normal one.

Subsequently, on the basis of the phase/amplitude calculation results of the pseudo AC color misregistration calculation and the normal one, a variation quantity H of the AC color misregistration is calculated through the comparison with an estimated reduced value.

Whether or not the AC color misregistration correction cycle is to be executed is judged on the basis of the variation quantity H. A threshold value t on the phase and amplitude of the AC vibration component is set, and it is judged whether or not the variation quantity H of the AC vibration component exceeds the threshold value t (step S174). If the former is below the latter, there is no need of executing the AC color misregistration correction cycle, and then the normal fine adjusting cycle is executed. Specifically, calculations for obtaining correction values for various DC color misregistration are carried out using the sampling data obtained in the step S171 (step S175). Then, the various DC color misregistration correction values are set (step S176), and upon the completion of the correction value settings, the correction values are sent to the control board (step S177).

If the variation quantity H is above the threshold value t, an AC vibration component, not negligible, is generated by some cause, and then the AC color misregistration correction cycle is executed. In the correction cycle, calculation on the phase and the amplitude of the AC vibration component is performed (step S178). The original sampling data used for the calculation is only necessary data on the AC vibration component that is extracted from the data obtained through the DC color misregistration detection fine adjustment pattern. A detection accuracy for the AC vibration component is inferior in the data resolution to the case where the AC color misregistration fine adjustment pattern is used for the sampling. When it is expected that the detection accuracy will be poor, it is necessary to ease the numerical requirement by specification (threshold value t) by a quantity corresponding to a degradation of the data resolution. Thus, by easing the specification value, a degradation of the AC vibration component can be compensated for to some extent.

When the calculation on the phase and amplitude of the AC vibration component is completed, an AC color misregistration correction value is set up, and sent to the drive control board of a necessary photoreceptor drum or transfer belt by communication (step S178). In this case, a correction quantity is handled such that it is added to the latest correction data (F.F table data) that was gained in the AC color misregistration correction cycle at the timing of Embodiment 1. When the correction value is sent and the control system is ready for the execution of the AC color misregistration correction cycle, control advances to the step S175.

In Embodiment 3, when the variation quantity H of the AC vibration component exceeds a threshold value, the AC color misregistration correction cycle is executed. In this case, the correction cycle is executed using the data gathered from the DC component fine adjustment pattern. In a case where a detection accuracy of the AC vibration component extracted from the DC component detection fine adjustment pattern is comparable with a detection accuracy of the AC vibration component extracted from the AC component fine adjustment pattern, the AC color misregistration correction cycle, which is executed using the data extracted from the DC component detection fine adjustment pattern, is executed immediately. In a case where the detection accuracy is too poor to execute the AC color misregistration correction cycle, the AC color misregistration correction cycle is executed using the AC component fine adjustment pattern only when the variation quantity H is larger than the expected detection accuracy degradation. In other cases, the AC color misregistration correction cycle is not executed, and the AC vibration component data obtained are disposed in the form of fail or warning.

Thus, an accidental AC vibration component can be periodically monitored through the operation of detecting a variation quantity H of the AC color misregistration every DC color misregistration correction cycle. Further, a color misregistration induced by the accidental AC vibration component can be properly reduced in a manner that the AC color misregistration correction cycle is executed only when the variation quantity of the AC color misregistration exceeds the threshold value.

When a variation quantity of the AC color misregistration exceeds the threshold value and the AC color misregistration correction cycle is executed, the steps S15 to S25 shown in FIG. 13 may be executed in lieu of the steps S178 to S179 in FIG. 40. To be more specific, the AC color misregistration correction cycle is executed using the AC component detecting patterns in the steps S15 to S24 in FIG. 13. Then, a control (correction) for the AC color misregistration is performed on the basis of the result of the correction cycle execution, and thereafter the DC fine adjustment cycle of the step S25 in FIG. 13 is executed again. Specifically, the AC component detecting patterns are detected and a control based on the result of the pattern detection is carried out, and the DC fine adjustment patterns are detected. And a control based on the detecting information of the DC color misregistration fine adjustment patterns is carried out. In such an algorithm, the time for executing the correction cycle is relatively long, but the detection and correction of the AC vibration component are reliable and accurate.

Embodiment 4

Embodiment 4 of the present invention, which is a digital color copying machine, employs an intermediate transfer system in which color toner images are formed on the photoreceptor drums 6K, 6Y, 6M and 6C, primarily transferred onto an intermediate transfer belt 150, and secondarily transferred from the intermediate transfer belt onto a copy sheet transported by a paper transport belt 151. In Embodiment 4, the intermediate transfer belt 150 (drive roll 152) is included anew in the objects to be controlled for color misregistration preventing purposes, which include the photoreceptor drums. In this respect, Embodiment 4 is different from Embodiments 1 and 2.

In the present embodiment, the endless intermediate transfer belt 150 which can bear thereon a toner image, not yet fixed, is disposed such that it may be turned in contact with the four photoreceptor drums 6K, 6Y, 6M and 6C. The paper transport belt 151, which is for transporting a copy sheet supplied from the paper tray 15, is disposed such that it may be turned in contact with the intermediate transfer belt 150. The digital color copying machine thus constructed forms a color image in the following manner.

Color toner images of yellow, magenta, cyan and black are respectively formed on the photoreceptor drums 6K, 6Y, 6M and 6C by the electrophotographic process as in Embodiment 1. Those toner images are sequentially transferred, in a superimposing fashion, onto the intermediate transfer belt 150 which is turning in contact with the photoreceptor drums. The toner image, which is thus transferred onto the paper transport belt 151, are transferred onto a copy sheet 04. The copy sheet is supplied to the paper transport belt 151 at a predetermined timing by the registration roll pair 23, and transported by the transport belt. At the time of image transferring, the paper transport belt 151 is turned in contact with the intermediate transfer belt 150. Finally, the copy sheet 04 is stripped from the paper transport belt 151, and fixed by the fixing unit 31, and a color image is printed on the copy sheet. After the image forming process is completed, toner and paper powder are left on the intermediate transfer belt 150, but are removed by a cleaning unit 153 including a rotary brush, a blade, and the like.

In the digital color copying machine based on the intermediate transfer system, in lieu of the transfer belt 24 in Embodiment 1 or 2, the intermediate transfer belt 150 is used as the unit having an AC vibration component as the source of a color misregistration. Eccentricity of the drive roll 152 for driving the intermediate transfer belt 150 to turn, or its eccentricity caused by its mounting portion, the nonuniform thickness of the intermediate transfer belt will cause the AC vibration component. To cope with this, AC component detecting patterns are formed on the intermediate transfer belt 150 as in Embodiments 1 and 2. A DC color misregistration correction cycle and an AC color misregistration correction cycle are executed, and the drive roll 152 of the intermediate transfer belt 150 are also subjected to a rotation speed fine adjustment for suppressing periodical rotation variations as in Embodiments 1 and 2.

Therefore, Embodiment 4 can satisfactorily suppress a periodical color misregistration, caused by the AC vibration component arising from the intermediate transfer belt 150. Also in the present embodiment, encoders are attached to the rotary shafts of the photoreceptor drum 6 and the intermediate transfer belt 150, and a rotation speed of each rotary means is controlled to be constant using the encoders.

Embodiment 5

In this embodiment, the photoreceptor drums 6K, 6Y, 6M and 6C to be used by the digital color copying machines of Embodiments 1 to 3 are classified into some groups by using specific selection criteria. In maintenance, when one of the photoreceptor drums is replaced with a new one, the new drum is selected from those of the drum group to which the drum to be replaced belongs. The grouping of the component parts and the selecting method in which a component part is selected from the parts group having the same attribute as of the part to be selected, are correspondingly applied to the transfer belt, the intermediate transfer belt, the related driver rolls or the like.

Actually, the characteristics (phase and amplitude) of the eccentric component of the photoreceptor drums are minutely different from one another. When the eccentric characteristics of a photoreceptor drum to be replaced are greatly different from those of a new photoreceptor drum, there is a possibility that a color misregistration can be unsatisfactorily suppressed through the DC and AC color misregistration correction cycles used in Embodiment 1 and the like. To cope with this, the present embodiment uses drum selection criteria which consists of 1) a condition that the amplitudes of the eccentric components, which are present at both sides of the photoreceptor drums when viewed in the axial direction, are below a predetermined value, and 2) another condition that the eccentric components have the amplitudes within a predetermined value and the same phases. When a photoreceptor drum originally assembled into the machine is replaced with a new one, the new drum is selected from the photoreceptor drums of a drum group to which the old drum, originally assembled, belongs.

The eccentric components of the photoreceptor drums are generated in the stage of manufacturing the drums. Therefore, the same production line and the same lot may be used for the criteria. Specifically, a photoreceptor drum having the same production line number or the same lot number as of an old photoreceptor drum is selected for a new photoreceptor drum. To secure a fixed phase relationship between a photoreceptor drum and its support parts (flange, for example), phase reference marks may be attached to predetermined positions of the drum and its support parts in the manufacturing stage. The photoreceptor drums are grouped every reference mark. In this case, in assembling the drum and its supporting parts into the machine, these reference marks are aligned with each other. Where a component is manufactured by combining parts of production lines or lots, the characteristics of the manufactured components are measured, and in selecting a desired component, the measured data is referred to. In this case, a phase difference and an amplitude difference, which are caused by a dimensional vibration of the parts of the same lot, can reliably be avoided.

In a case where a new photoreceptor drum is selected and substituted for an old photoreceptor drum, and the phases of the eccentric components are different at both sides of the new photoreceptor drum when viewed in the axial direction are difference, if the photoreceptor drum used has an eccentric component of a predetermined value or less, a color misregistration may be suppressed within a predetermined value through the correction by the DC and AC color misregistration correction cycles, and the rotation phase adjustment, those being applied to the photoreceptor drum assembled. In a case where the amplitude of the eccentric component at both sides of the photoreceptor drum is relatively large, if the amplitude and phase of the eccentric components are substantially equal, a color misregistration can readily be reduced to within a predetermined level through the rotation phase adjustment or the correction of the eccentric component using the F.F table data.

Embodiment 6

Figure 42A:
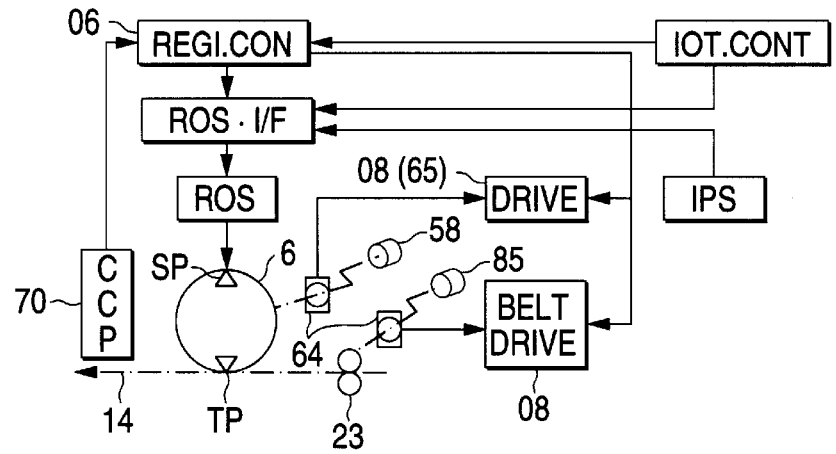
FIGS. 42A to 42C are views showing the concept of other image forming apparatuses according to the present invention.
Figure 42B:
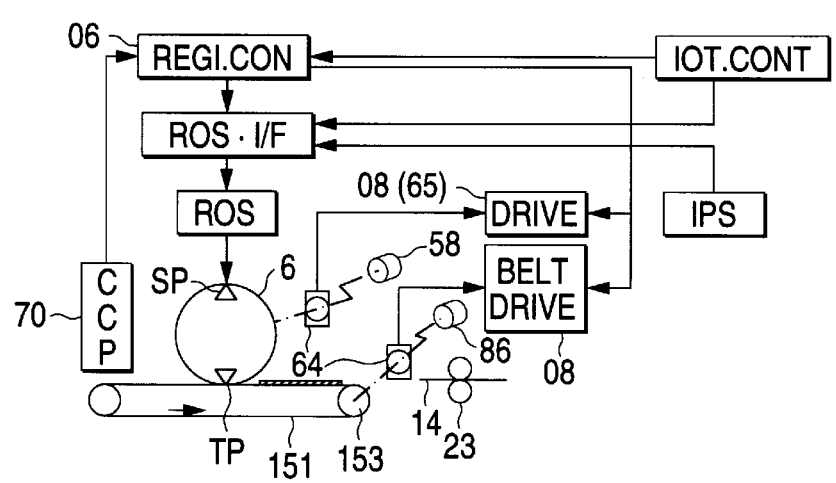
Figure 42C:
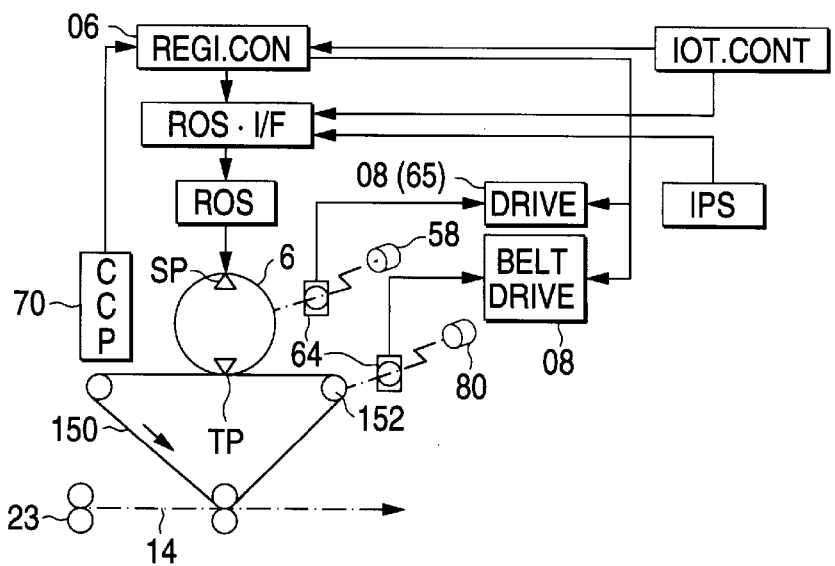
Figure 43:
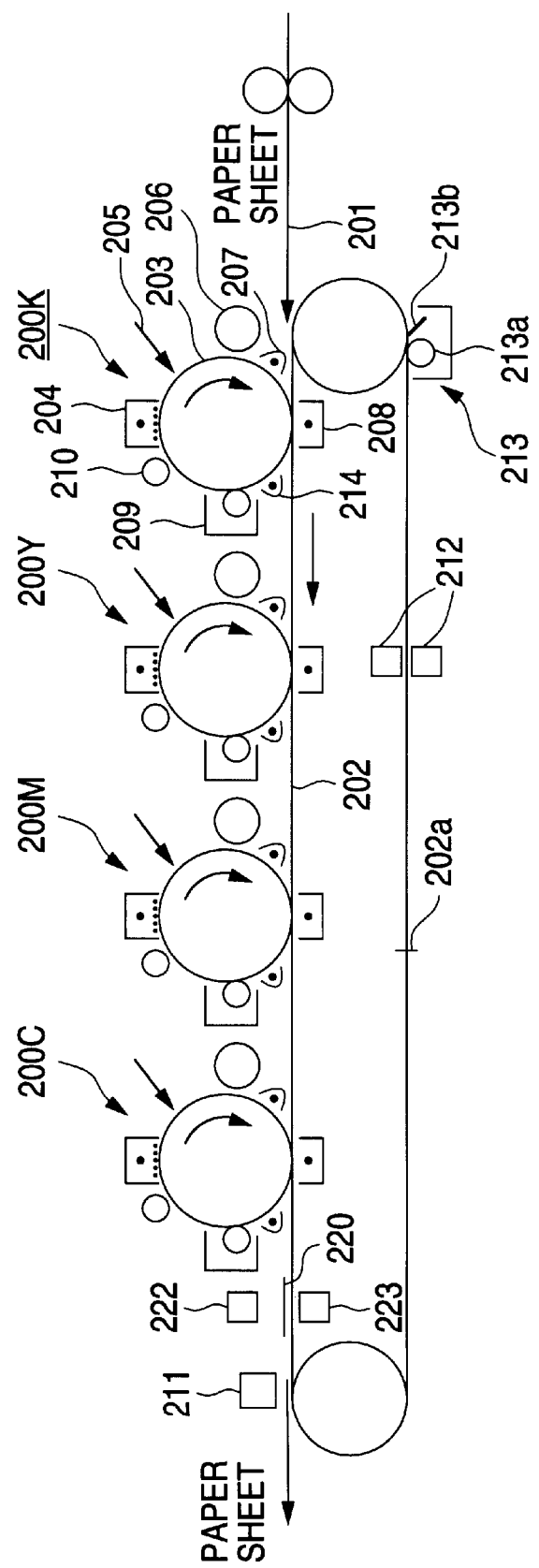
FIG. 43 is a view showing a digital color copying machine with a sampling unit for sampling conventional color misregistration detecting patterns.
Figure 44:
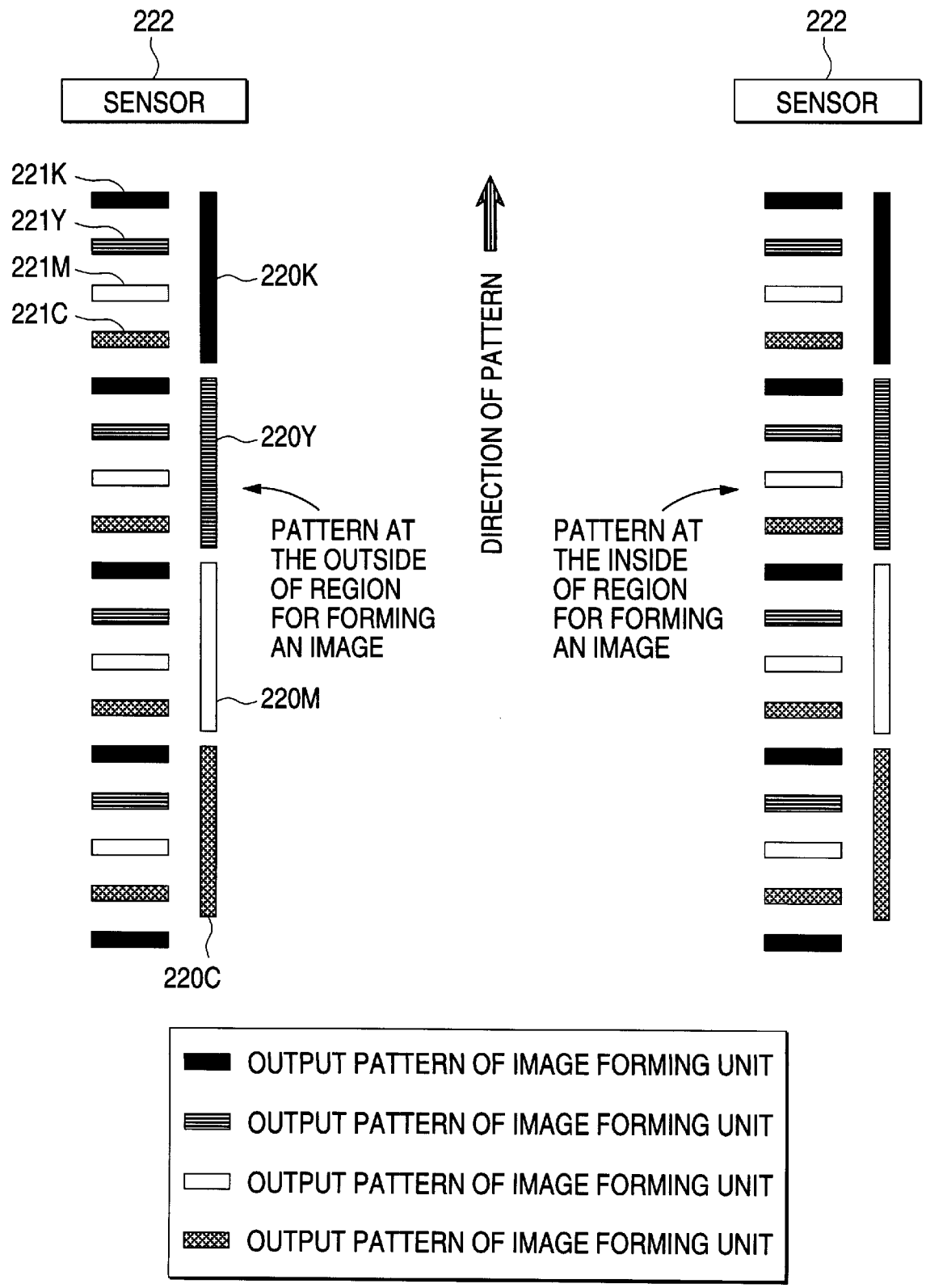
FIG. 44 is a plan view showing conventional color misregistration detecting patterns.
Figure 45A:
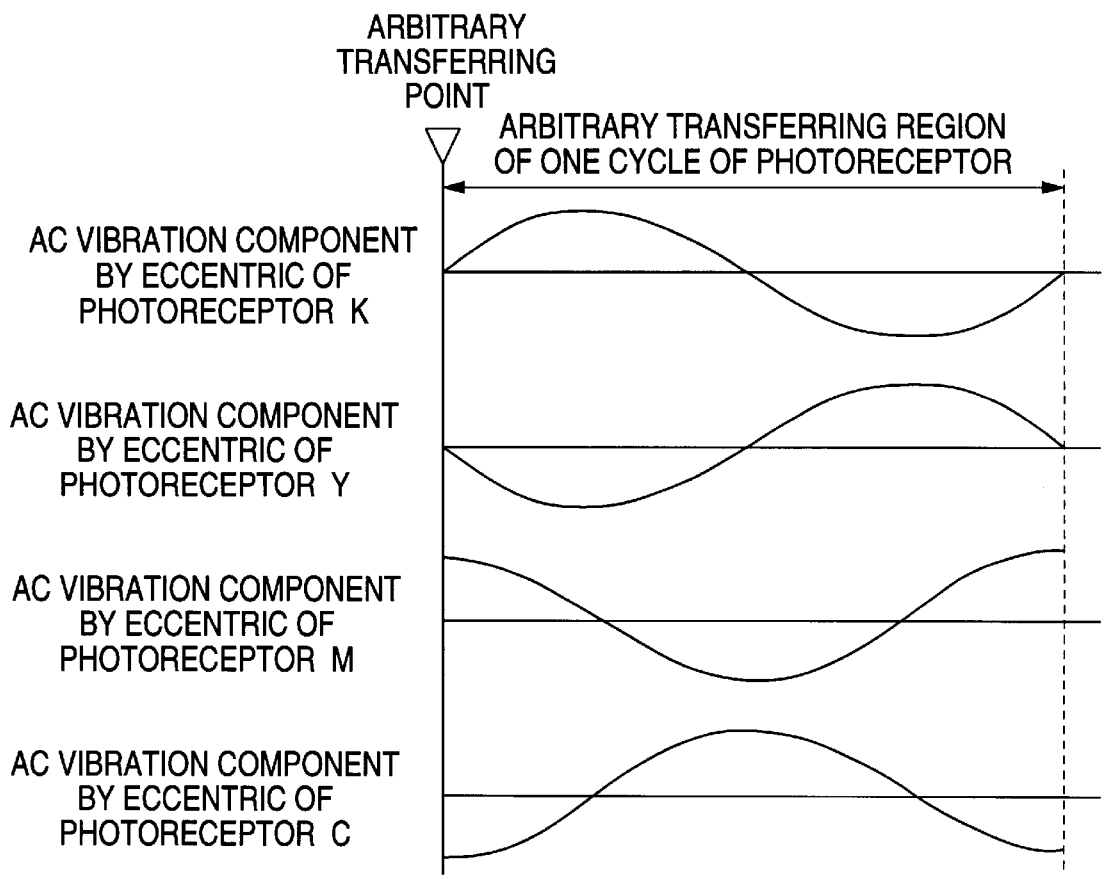
FIGS. 45A and 45B are. explanatory diagram showing variations of the AC vibration components of the respective colors before the correction.
Figure 45B:
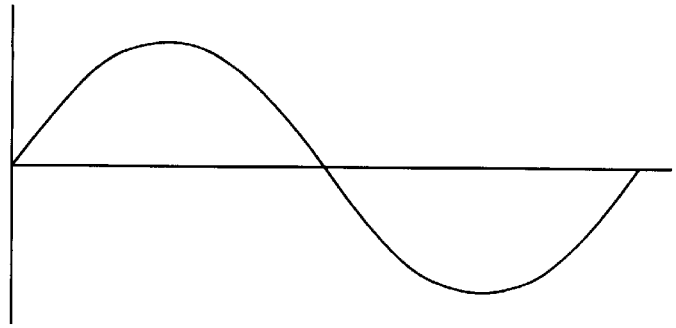
Figures 46A, 46B:
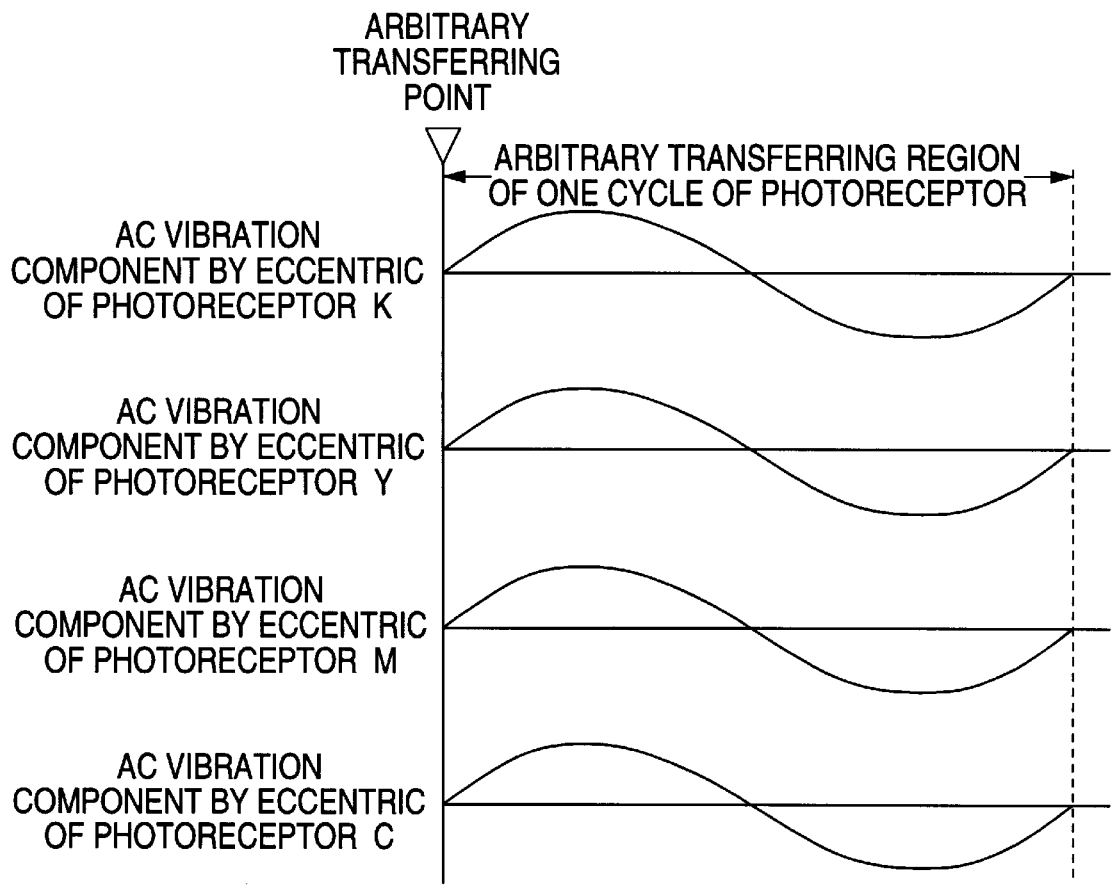
FIGS. 46A and 46B are explanatory diagram showing variations of the AC vibration components of the respective colors after the AC vibration components shown in FIG. 45 are corrected by a correcting method of the older application.
Figure 47A:
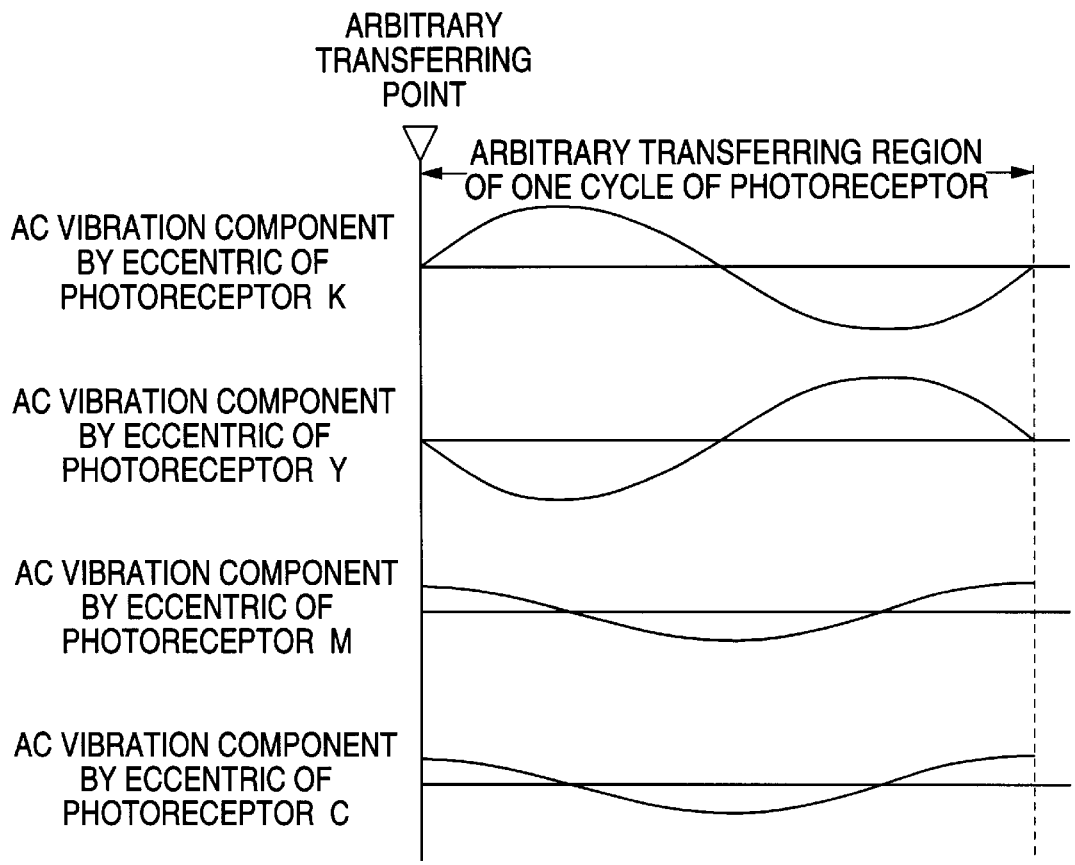
FIGS. 47A and 47B are explanatory diagram showing variations of the AC vibration components of the respective colors before the correction.
Figure 47B:
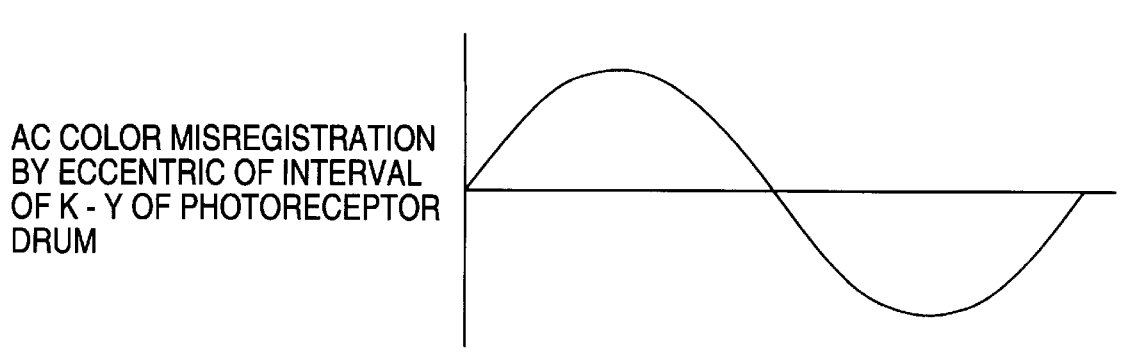
Figure 48A:
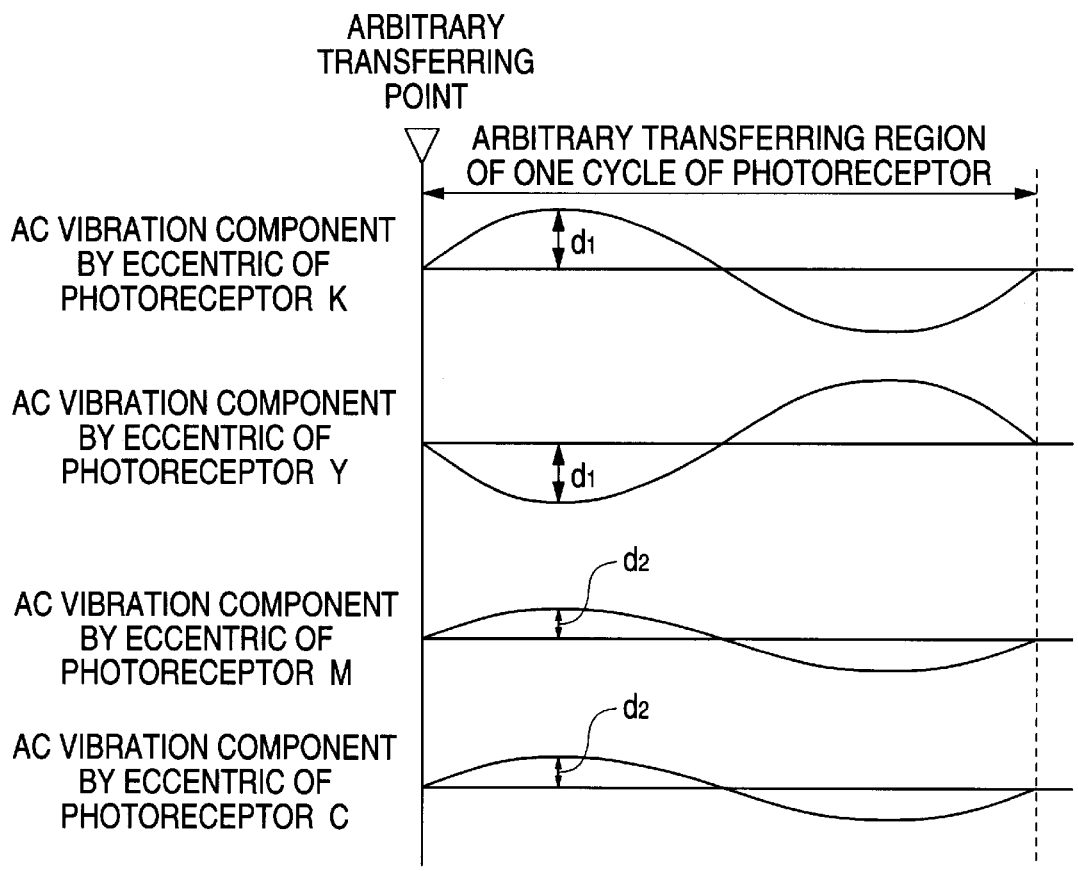
FIGS. 48A and 48B are explanatory diagram showing variations of the AC vibration components of the respective colors after the AC vibration components shown in FIG. 47 are corrected by a correcting method of the older application.
Figure 48B:
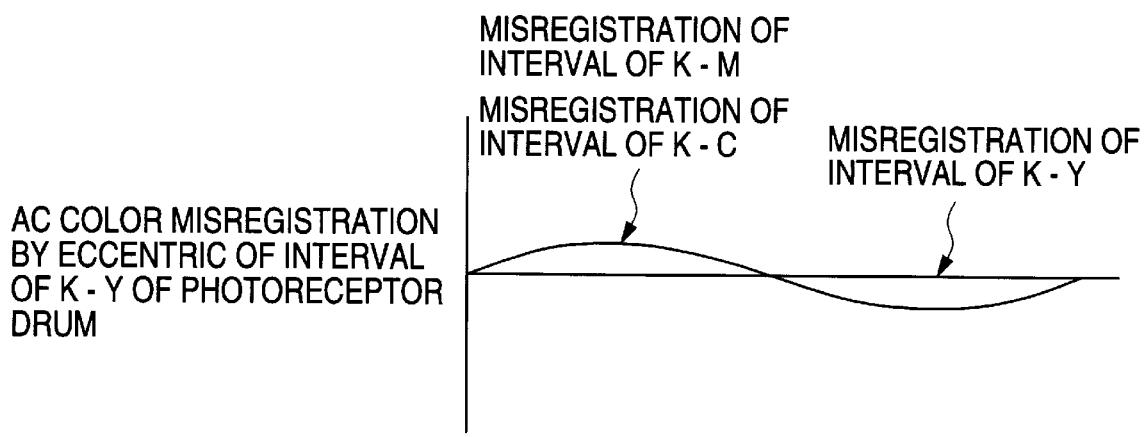

FIGS. 42A to 42C show Embodiment 6 of the present invention. In the embodiment, a control system used in any of Embodiments 1 to 3 is incorporated into an image forming apparatus, for example, a black/white copying machine or printer in which a black/white toner image is formed by a single image forming unit having a single photoreceptor drum 6. In the black/white image forming apparatus using the control system, there is no chance of creating an image distortion resulting from a magnification variation in the slow scan direction caused by a periodical rotation variation. Therefore, the image forming apparatus is cable of copying or printing a quality black/white picture.

The image forming apparatus shown in FIG. 42A transfers a black toner image onto a transfer sheet 14 emanating from the registration roll pair 23, at a transfer point TP on the photoreceptor drum 6. The image forming apparatus shown in FIG. 42B transfers a black toner image onto a transfer sheet 14, which is transported by the paper transport belt 151 while being supported, at a transfer point TP on the photoreceptor drum 6. The image forming apparatus shown in FIG. 42C primarily transfers a black toner image onto an intermediate transfer belt 150 at a transfer point TP on the photoreceptor drum 6, and secondarily transfers the toner image from the intermediate transfer belt onto an image receiving sheet 14 emanating from the registration roll pair 23, in a secondary transfer stage located downstream of the intermediate transfer belt 150 when viewed in the rotation direction.

In FIG. 42A apparatus, an exposure point SP on the photoreceptor drum 6 is disposed while being angularly spaced from the transfer point TP by approximately 180°. An image misregistration detecting pattern, in place of the AC component or color misregistration detecting patterns, is formed on the photoreceptor drum 6. Then, as in Embodiment 1, the detecting patterns are read by the pattern detecting means 70, and sampled. Rotation speed variations of the drive motor 58 of the photoreceptor drum 6 and the drive motor 85 of the registration roll pair 23 are controlled so as to be reduced, by using the sampling results. In this case, those drive motors or the drive motor for the photoreceptor drum 6 is finely adjusted. As a result, the periodical rotation variations of the drum and registration roll pair are suppressed, to thereby prevent the image distortion.

In FIG. 42B apparatus, an exposure point SP on the photoreceptor drum 6 is disposed while being angularly spaced from the transfer point TP by approximately 180°. An image misregistration detecting pattern, in place of the AC component or color misregistration detecting patterns, is formed on the photoreceptor drum 6, and transferred onto the paper transport belt 151. Then, as in Embodiment 1, the detecting patterns are read by the pattern detecting means 70, and sampled. Rotation speed variations of the drive motor 58 of the photoreceptor drum 6 and the drive motor 86 of the paper transport belt 151 are controlled so as to be reduced, by using the sampling results. In this case, those drive motors or the drive motor for the photoreceptor drum 6 is finely adjusted. As a result, the periodical rotation variations of the drum and registration roll pair are suppressed, to thereby prevent the image distortion.

In FIG. 42C apparatus, an exposure point SP on the photoreceptor drum 6 is disposed while being angularly spaced from the transfer point TP by approximately 180°. An image misregistration detecting pattern, in place of the AC component or color misregistration detecting patterns, is formed on the photoreceptor drum 6, and transferred onto the intermediate transfer belt 150. Then, as in Embodiment 1, the detecting patterns are read by the pattern detecting means 70, and sampled. Rotation speed variations of the drive motor 58 of the photoreceptor drum 6 and the drive motor 152 of the intermediate transfer belt 150 are controlled so as to be reduced, by using the sampling results. In this case, those drive motors or the drive motor for the photoreceptor drum 6 is finely adjusted. As a result, the periodical rotation variations of the drum and registration roll pair are suppressed, to thereby prevent the image distortion.

As seen from the foregoing description, in the image forming apparatus of aspect 1 or 2, the rotation speeds of the rotary means, such as the image bearing mean and the endless bearing means, are individually and finely adjusted by using detecting information (amplitudes and phases of an AC vibration component) on the periodical rotation variation, which is obtained through the detection of the component detecting patterns formed on the endless bearing means, for example, so as to individually control the rotation speed of such a rotary means as an endless bearing means for suppressing a periodical rotation variation of the rotary means. Therefore, it is possible to satisfactorily suppress an AC color misregistration (particularly AC color misregistration owing to the amplitude difference of the AC vibration component) of a periodical rotation variation of a rotary means, which is caused by eccentricities of the photoreceptor drum, the transfer drum, the intermediate transfer drum and the like, the eccentricities being caused by the rotary means per se or their mounting portions and clearance errors of the rotary shafts of the rotary means, and caused by the belt thickness variation.

A color image, which is formed by the image forming apparatus having such useful effects, is free from any color misregistration and high in its quality. The image forming apparatus also forms a black/white image of high quality, free from an image distortion. This useful effect of the invention is remarkable particularly for the following color images. The fine line image, which is formed by superimposing a plural number of colors, does not blur. In a character image formed on a colored white (not white of the sheet) ground, voids do not appear around the contour of a character. It does not happen that the edge of a colored image area is slightly colored with a color (e.g., magenta or cyan) different from the color of the image area, and that a seam between the colored image areas looks like a stripe of a different color or a void appears at the seam. In a color ground area, a called banding phenomenon does not occur.

In the image forming apparatus of aspect 3 or 4, a phase difference between the exposure point and the transfer point on the image bearing means is specified, and a specific quantity of the periodical rotation variation obtained through the pattern detection is used as a controlled variable. Therefore, the fine adjustment of a rotation speed of each rotary means can be done in accordance with an actual condition. As a result, the color misregistration and the image distortion are completely removed.

In the image forming apparatus of aspect 5 or 6, a rotation speed of a corresponding rotary means is finely and individually adjusted so as to reduce the amplitude of a vibration component of each rotary means to be zero. Therefore, it is possible to readily and reliably prevent the occurrence of an AC color misregistration component and an image distortion, which are caused by the phases and the amplitudes of an AC vibration component as the source of the periodical rotation variation.

In the image forming apparatus of aspect 7, rotation speeds of a corresponding rotary means are individually and finely are adjusted so as to align the phases and amplitudes of the rotation components of the rotary means with those of a reference rotary means. Therefore, the apparatus can readily prevent the occurrence of an AC color misregistration component that is caused by the phases and amplitudes of the AC vibration component.

In the image forming apparatus of aspect 8, the image bearing means is a photoreceptor drum or a photoreceptor belt, the endless bearing means is either a transfer-medium transport drum or a transfer-medium transport belt or either an intermediate transfer drum or an intermediate transfer belt, and an object to be speed controlled by the drive control means is any one of the drive shaft of the image bearing means and the drive shaft of the endless bearing means. Therefore, the control readily suppresses the AC vibration component.

In the image forming apparatus of aspect 9, a periodical rotation variation of the endless bearing means is suppressed through a control by the drive control means of the image bearing means. Therefore, a periodical rotation variation of the endless bearing means can be removed through only the fine adjustment of the rotation speed of the image bearing means. In this respect, the control of suppressing the periodical rotation variation is efficient. When the endless bearing means is a belt-like bearing means of aspect 1, the above control can suppress the various rotation variations, such as speed variations owing to the thickness difference of the belt like bearing means.

When the image forming apparatus of aspect 11 carries out the control of aspect 9, a specific quantity of a periodical rotation variation of the endless bearing means, obtained through the pattern detection, is superimposed on the control quantity of the drive control means of the image bearing means. Therefore, the periodical rotation variation of the endless bearing means can be suppressed through a proper control.

In this image forming apparatus of aspect 12, when the image bearing means is a photoreceptor drum, and the endless bearing means is either a transfer-medium transport drum or an intermediate transfer belt, the diameter of the drive roll of the transfer-medium transport drum or the intermediate transfer belt is odd number times as large as the diameter of the photoreceptor drum. This ensures a more reliable execution of the control of aspect 9.

In the image forming apparatus of aspect 13, the rotation speed control for suppressing the periodical rotation variation is a feed forward control. Therefore, before an image forming operation, a periodical rotation variation is suppressed by using detecting information on a periodical rotation variation obtained by detecting a color misregistration detecting pattern, and as a result, deterioration of the picture quality owing to an AC color misregistration is minimized.

In the image forming apparatus of aspect 14, the rotation speed control for suppressing the periodical rotation variation may be combined with a feedback control based on the detection of a rotation state of the drive shaft of each of the image bearing means and the endless bearing means. Therefore, an AC vibration component of high frequencies generated in accordance with a rotation state of the rotary means can be removed through the feedback control. The detection and the control of the color misregistration pattern are performed after removal of the high frequency AC vibration component. Therefore, an AC vibration component of low frequencies may be detected easily and precisely, and a proper control based on the detecting information is secured.

In the image forming apparatus of aspect 15, the detection of the color misregistration detecting pattern for suppressing the periodical rotation variation and the control based on the detecting information are executed for the rotary means in the order of the lengths of the rotation periods of the rotary means. Therefore, the AC vibration components of low frequencies, which are dependent on the rotary means, are first removed. Therefore, the detection of the rotary-means dependent AC vibration components of high frequencies which follows the removal of the low frequency AC vibration component is easy and precise.

In the image forming apparatus of aspect 16, a vibration component on a periodical rotation variation based on detecting information of the color misregistration fine adjustment detecting pattern is extracted every time a DC color misregistration correction cycle, to thereby obtain a variation quantity of the vibration component, and when the variation quantity exceeds a predetermined value, a control based on the detecting information of the color misregistration fine adjustment detecting pattern is carried out. In this control, a phenomenon giving rise to the AC vibration component accidentally occurs, if occurs, can be periodically monitored. Further, when a variation quantity of such an AC vibration component reaches a level, not negligible, it can be suppressed properly by executing the control based on the detecting information of the color misregistration fine adjustment detection pattern.

The image forming apparatus of aspect 17 may be constructed such that when the variation quantity exceeds a predetermined value, the control of the rotation speed for suppressing the periodical rotation variation is carried out in accordance with the detecting information of the color misregistration fine adjustment detecting pattern. There is no need of executing the detecting cycle based on the AC component detecting patterns. Further, a quick start of executing the control for suppressing the periodical rotation variation is possible. In the control, the correction of the AC color misregistration is not precise, but the down time is not increased.

In the image forming apparatus of aspect 18, when the variation quantity exceeds a predetermined value, the color misregistration detecting pattern for suppressing the periodical rotation variation is detected and a control based on its detecting information is carried out, and then the control based on a rotation speed for suppressing the periodical rotation variation is carried out again in accordance with the detecting information of the color misregistration fine adjustment detecting pattern. The apparatus takes a longer cycle time for the AC color misregistration correction than the apparatus of aspect 16, but the correction of the AC color misregistration is reliable.

In the image forming apparatus of aspect 19 or 20, a given fine adjustment is performed at a proper time and in a proper manner. Therefore, the apparatus reliably detects generation of a color misregistration and an image distortion, which are caused by the periodical rotation variation.

In the above image forming apparatus of aspect 21, when a plural number of rotatably driven rotary means are used, those rotary means are classified into groups of rotary means using criteria which consists of 1) a condition that the amplitudes of the eccentric components, which are present at both sides of the photoreceptor drums when viewed in the axial direction, are below a predetermined value, and 2) another condition that the eccentric components have the amplitudes within a predetermined value and the same phases. With this, a new rotary means has substantially the same mechanical features as of the old one. The amplitudes or the amplitudes and phases of the eccentric components of those rotary means are coincident with each other. Therefore, the AC color misregistration may be suppressed to a predetermined level or smaller by merely performing the rotation phase adjustment and the control for suppressing the periodical rotation variation in accordance with the known detecting information. The new and assembled rotary means provides an image quality comparable in quality with that by the old rotary means.

What is claimed is:

1. An image forming apparatus which forms a monocolor toner image by an image forming means with a rotatably driven image bearing means, and forms a picture by transferring the monocolor toner image formed by said image forming means onto an image transfer medium transported by a roll pair, an image transfer medium carried on an endless bearing means, or directly onto said endless bearing means, said image forming apparatus wherein a latent image writing position on said image bearing means being angularly spaced by approximately 180° from an image transfer position comprising:

pattern detecting means for detecting an image misregistration detecting pattern formed on said image transfer medium or said endless bearing means; and drive control means for individually controlling a rotation speed of said rotary means, such as said image bearing means or said endless bearing means, so as to suppress a periodical rotation variation of said rotary means by using detecting information of a vibration component on the periodical rotation variation, which is obtained from detecting signals derived from said pattern detecting means.

2. An image forming apparatus which forms toner images of different colors by at least one image forming means with a rotatably driven image bearing means, and forms a picture by transferring the different colored toner images formed by said image forming means onto an image transfer medium supported on a rotatably driven endless bearing means, or directly onto said endless bearing means, said image forming apparatus wherein a latent image writing position on said image bearing means being angularly spaced by approximately 180° from an image transfer position comprising:

pattern detecting means for detecting a color misregistration detecting pattern formed on said endless bearing means; and drive control means for individually controlling rotation speeds of rotary means, such as said image bearing means and said endless bearing means, so as to suppress a periodical rotation variation by using detecting information of a vibration component of the periodical rotation variation, which is obtained from detecting signals derived from said pattern detecting means.

3. The image forming apparatus of claim 2, wherein the phase difference between the latent image writing position and the transfer position on said image bearing means is 180°±45°.

4. The image forming apparatus of claim 2, wherein detecting information of the vibration component of the periodical rotation variation of given rotary means, which is detected by said pattern detecting means, is multiplied by approximately ½ and phased inverted, and a resultant of said multiplication and inversion is superimposed on a control quantity in a drive control means of said rotary means or other rotary means, so as to suppress the periodical rotation variation of said rotary means.

5. The image forming apparatus of claim 4, wherein a periodical rotation variation in an endless bearing means is suppressed through a control by said drive control means of said image bearing means.

6. The image forming apparatus of claim 5, wherein when said endless bearing means is a belt-like bearing means, said periodical rotation variation of said belt-like bearing means includes at least one of:
a vibration caused by an eccentricity of said image bearing means or mounting portion thereof or caused by a drive roll or gear thereof,
a vibration caused by an eccentricity of the drive roll of said belt-like bearing means or drive gear thereof, and
a speed variation caused by the nonuniform thickness of said belt-like bearing means.

7. The image forming apparatus of claim 5, wherein the vibration component on the periodical rotation variation of said endless bearing means, which is detected by said pattern detecting means, is multiplied by approximately ½ and phased inverted, and the resultant is superimposed on a control quantity in said drive control means of said image bearing means, so as to suppress the periodical rotation variation of said endless bearing member.

8. The image forming apparatus of claim 7, wherein when said image bearing means is a photoreceptor drum and said endless bearing means is either a transfer-medium transport drum or an intermediate transfer belt, the diameter of a drive roll of said transfer-medium transport drum or said intermediate transfer belt is 1/(2N−1) (N:natural number) times of the diameter of said photoreceptor drum.

9. The image forming apparatus of claim 2, further comprising:
phase/amplitude detecting means for detecting the phase and amplitude of a vibration component of a periodical rotation variation which is detected by said pattern detecting means, so as to control said drive control means according to the phase and amplitude information of the vibration component derived from said phase/amplitude detecting means.

10. The image forming apparatus of claim 9, wherein said drive control means finely adjusts a rotation speed of said rotary means so as to reduce the amplitude of the vibration component of each said rotary means to zero.

11. The image forming apparatus of claim 9, wherein said drive control means individually and finely adjusts rotation speeds of said rotary means, so as to align the phases and amplitudes of the rotation components of said rotary means with those of a reference rotary means.

12. The image forming apparatus of claim 2, wherein said image bearing means is one of a photoreceptor drum and a photoreceptor belt,
said endless bearing means is either a transfer-medium transport drum or a transfer-medium transport belt, an intermediate transfer drum or an intermediate transfer belt, and
an object to be speed controlled by said drive control means is a drive shaft of any one of said image bearing means and said endless bearing means.

13. The image forming apparatus of claim 2, wherein said rotation speed control for suppressing the periodical rotation variation is a feed forward control.

14. The image forming apparatus of claim 13, wherein said rotation speed control for suppressing the periodical rotation variation is combined with a feedback control based on a detection of a rotation state of the drive shaft of each of said image bearing means and said endless bearing means.

15. The image forming apparatus of claim 2, wherein the detection of the color misregistration detecting pattern for suppressing the periodical rotation variation, and the control based on the detecting information are executed for said rotary means in the order of the lengths of the rotation periods of said rotary means.

16. The image forming apparatus of claim 2, wherein a vibration component on a periodical rotation variation based on detecting information of a color misregistration fine adjustment detecting pattern is extracted every time a DC color misregistration correction cycle is conducted, so as to obtain a variation quantity of said vibration component, and
when the variation quantity exceeds a predetermined value, a control based on the detecting information of the color misregistration fine adjustment detecting pattern is carried out.

17. The image forming apparatus of claim 16, wherein when the variation quantity exceeds a predetermined value, the rotation speed of said rotary means for suppressing said periodical rotation variation is controlled in accordance with the detecting information of the color misregistration fine adjustment detecting pattern.

18. The image forming apparatus of claim 16, wherein when the variation quantity exceeds a predetermined value, the color misregistration detecting pattern for suppressing said periodical rotation variation is detected and a control based on the detecting information is carried out, and then
the rotation speed of said rotary means for suppressing said periodical rotation variation is controlled again in accordance with the detecting information of the color misregistration fine adjustment detecting pattern.

19. The image forming apparatus of claim 2, wherein the fine adjustment of a rotation speed by said drive control means is carried out at least one of the timings of:
when the power switch is turned on,
after the jamming is removed,
when said image bearing means or said endless bearing means and their drive rolls are detached or attached again or after maintenance,
every time a predetermined time elapses,
when a temperature variation exceeds a predetermined value, after said image forming apparatus is moved from an installed location thereof or is vibrated, and
when an image offset of said image forming apparatus exceeds a predetermined value.

20. The image forming apparatus of claim 19, wherein the fine adjustment of a rotation speed by said drive control means is carried out when said image bearing means or said endless bearing means and their drive rolls is exchanged, detached or attached again or after maintenance, a sequence of control operations for the fine adjustment is forcibly started by a manual instruction by a service man, or automatically started when the power switch is turned on.

21. The image forming apparatus of claim 2, wherein when a plural number of rotatably driven rotary means are used, said rotary means are classified into groups of rotary means using criteria including:
1) a condition that amplitudes of eccentric components, which are present at both sides of said photoreceptor drums when viewed in the axial direction, are below a predetermined value, and
2) another condition that the eccentric components have the amplitudes within a predetermined value, and the same phases.

* * * * *